(12) United States Patent
Swenson et al.

(10) Patent No.: US 8,549,404 B2
(45) Date of Patent: Oct. 1, 2013

(54) AUDITIONING TOOLS FOR A MEDIA EDITING APPLICATION

(75) Inventors: Anne Swenson, San Jose, CA (US);
Giovanni Agnoli, San Mateo, CA (US);
Enrique Rodriguez, San Jose, CA (US);
Charles Lyons, San Francisco, CA (US);
Brian Meaney, San Jose, CA (US);
Dave Cerf, San Francisco, CA (US);
Mike Stern, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 276 days.

(21) Appl. No.: 12/892,916

(22) Filed: Sep. 28, 2010

(65) Prior Publication Data
US 2012/0079382 A1  Mar. 29, 2012

Related U.S. Application Data

(63) Continuation-in-part of application No. 12/688,858, filed on Jan. 15, 2010, now Pat. No. 8,522,144, which is a continuation-in-part of application No. 12/433,875, filed on Apr. 30, 2009, and a continuation-in-part of application No. 12/551,557, filed on Aug. 31, 2009, said application No. 12/892,916 is a continuation-in-part of application No. 12/551,559, filed on Aug. 31, 2009, and a continuation-in-part of application No. 12/433,892, filed on Apr. 30, 2009, and a continuation-in-part of application No. 12/433,893, filed on Apr. 30, 2009.

(60) Provisional application No. 61/295,687, filed on Jan. 15, 2010, provisional application No. 61/174,490, filed on Apr. 30, 2009, provisional application No. 61/227,070, filed on Jul. 20, 2009, provisional application No. 61/174,491, filed on Apr. 30, 2009, provisional application No. 61/227,070, filed on Jul. 20, 2009.

(51) Int. Cl.
*G06F 3/00* (2006.01)

(52) U.S. Cl.
USPC .......................... 715/723; 715/716; 715/719

(58) Field of Classification Search
USPC ................. 715/704, 810, 765, 716, 719, 723
See application file for complete search history.

(56) References Cited

U.S. PATENT DOCUMENTS

| | | |
|---|---|---|
| 5,519,828 A | 5/1996 | Rayner |
| 5,659,539 A | 8/1997 | Porter et al. |

(Continued)

FOREIGN PATENT DOCUMENTS

| | | |
|---|---|---|
| WO | WO 2007/120694 | 10/2007 |
| WO | WO 2009/122213 | 10/2009 |
| WO | WO 2010/106586 | 9/2010 |

OTHER PUBLICATIONS

Myers, Brad A., et al., "A Multi-View Intelligent Editor for Digital Video Libraries," The First ACM+IEEE Joint Conference on Digital Libraries (JCDL '01), Jun. 24-28, 2001, pp. 106-115, Roanoke, VA, USA.

(Continued)

*Primary Examiner* — Omar Abdul-Ali
*Assistant Examiner* — Phuong Nguyen
(74) *Attorney, Agent, or Firm* — Adeli & Tollen LLP

(57) ABSTRACT

Some embodiments provide a media editing application. The application places several committed media clips in a composite display area to specify a description of a composite presentation. In response to receiving a request to create a new version for a first media clip placed at a particular location in the composite display area, the application creates an audition set at the particular location in the composite display area. The application creates a second media clip from the first media clip. The application adds the first and second media clips to the audition set. At least one of the first and second media clips is a candidate media clip that is insertable at the location in the composite display area but is not a media clip that has been committed for inclusion in the description of the composite presentation.

29 Claims, 50 Drawing Sheets

(56) References Cited

U.S. PATENT DOCUMENTS

| | | |
|---|---|---|
| 5,659,792 A | 8/1997 | Walmsley |
| 5,659,793 A | 8/1997 | Escobar et al. |
| 5,664,216 A | 9/1997 | Blumenau |
| 5,682,326 A | 10/1997 | Klingler et al. |
| 5,781,188 A | 7/1998 | Amiot et al. |
| 5,826,102 A | 10/1998 | Escobar et al. |
| 5,930,446 A | 7/1999 | Kanda |
| 5,999,173 A | 12/1999 | Ubillos |
| 6,134,380 A | 10/2000 | Kushizaki |
| 6,154,600 A | 11/2000 | Newman et al. |
| 6,154,601 A | 11/2000 | Yaegashi et al. |
| 6,161,115 A * | 12/2000 | Ohanian .................. 715/203 |
| 6,324,335 B1 | 11/2001 | Kanda |
| 6,400,378 B1 | 6/2002 | Snook |
| 6,477,315 B1 | 11/2002 | Ohomori |
| 6,539,163 B1 | 3/2003 | Sheasby et al. |
| 6,546,188 B1 | 4/2003 | Ishii et al. |
| 6,628,303 B1 | 9/2003 | Foreman et al. |
| 6,658,194 B1 | 12/2003 | Omori |
| 6,674,955 B2 | 1/2004 | Matsui et al. |
| 7,073,127 B2 | 7/2006 | Zhao et al. |
| 7,225,405 B1 | 5/2007 | Barrus et al. |
| 7,313,755 B2 | 12/2007 | Rahman et al. |
| 7,325,199 B1 * | 1/2008 | Reid .................. 715/723 |
| 7,356,242 B2 | 4/2008 | Nagasawa |
| 7,383,508 B2 | 6/2008 | Toyama et al. |
| 7,432,940 B2 | 10/2008 | Brook et al. |
| 7,444,593 B1 * | 10/2008 | Reid .................. 715/723 |
| 7,480,864 B2 | 1/2009 | Brook et al. |
| 7,561,160 B2 | 7/2009 | Fukuya |
| 7,614,012 B1 | 11/2009 | Dulaney |
| 7,623,755 B2 | 11/2009 | Kuspa |
| 7,720,349 B2 | 5/2010 | Ogikubo |
| 7,805,678 B1 | 9/2010 | Niles et al. |
| 7,882,258 B1 * | 2/2011 | Sumler et al. .................. 709/231 |
| 2001/0020953 A1 | 9/2001 | Moriwake et al. |
| 2001/0036356 A1 | 11/2001 | Weaver et al. |
| 2002/0023103 A1 | 2/2002 | Gagne |
| 2002/0154140 A1 | 10/2002 | Tazaki |
| 2002/0154156 A1 | 10/2002 | Moriwake et al. |
| 2002/0156805 A1 | 10/2002 | Schriever et al. |
| 2002/0175917 A1 | 11/2002 | Chakravarty et al. |
| 2002/0188628 A1 | 12/2002 | Cooper et al. |
| 2003/0001880 A1 | 1/2003 | Holtz et al. |
| 2003/0018609 A1 | 1/2003 | Phillips et al. |
| 2003/0090504 A1 | 5/2003 | Brook et al. |
| 2003/0117431 A1 | 6/2003 | Moriwake et al. |
| 2003/0234803 A1 | 12/2003 | Toyama et al. |
| 2004/0078761 A1 | 4/2004 | Ohanian |
| 2004/0201609 A1 | 10/2004 | Obrador |
| 2005/0132293 A1 | 6/2005 | Herberger et al. |
| 2005/0257152 A1 | 11/2005 | Shimizu et al. |
| 2006/0008247 A1 | 1/2006 | Minami et al. |
| 2006/0059426 A1 | 3/2006 | Ogikubo |
| 2006/0233514 A1 | 10/2006 | Weng |
| 2006/0265657 A1 * | 11/2006 | Gilley .................. 715/730 |
| 2007/0089152 A1 | 4/2007 | Patten et al. |
| 2007/0189708 A1 | 8/2007 | Lerman et al. |
| 2007/0262995 A1 | 11/2007 | Tran |
| 2008/0044155 A1 | 2/2008 | Kuspa |
| 2008/0111822 A1 * | 5/2008 | Horowitz et al. .................. 345/530 |
| 2008/0152297 A1 | 6/2008 | Ubillos |
| 2008/0152298 A1 | 6/2008 | Ubillos |
| 2008/0155420 A1 | 6/2008 | Ubillos et al. |
| 2008/0155421 A1 | 6/2008 | Ubillos et al. |
| 2008/0253735 A1 | 10/2008 | Kuspa et al. |
| 2009/0131177 A1 | 5/2009 | Pearce |
| 2009/0199251 A1 | 8/2009 | Badoiu et al. |
| 2009/0201316 A1 | 8/2009 | Bhatt et al. |
| 2010/0035682 A1 | 2/2010 | Gentile et al. |
| 2010/0281375 A1 | 11/2010 | Pendergast et al. |
| 2010/0281376 A1 | 11/2010 | Meaney et al. |
| 2010/0281386 A1 | 11/2010 | Lyons et al. |

OTHER PUBLICATIONS

Chisan, James, et al., "Video Bench—Final Report: SEng 480a/CSc 586a," Apr. 11, 2003, University of Victoria.
Author Unknown, "Apple Aperture 3," Month Unknown, 2007, pp. 1-7, USA, available at http://www.apple.com/aperture/what-is.html.
Author Unknown, "Apple Announces Final Cut Pro 4," NAB, Apr. 6, 2003, pp. 1-3, Apple Inc., Las Vegas, NV, USA.
Author Unknown, "iMovie '08 Getting Started," Month Unknown, 2008, pp. 1-50, Apple Inc., USA.
Author Unknown, "Using Adobe Premiere Elements 8 Editor," last updated Aug. 12, 2010, 313 pages, Adobe Systems Incorporated, San Jose, CA, USA.
Author Unknown, "Using Adobe Flash CS4 Professional," last updated Mar. 5, 2009, 474 pages, Adobe Systems Incorporated, San Jose, California, USA.
Author Unknown, "Adobe Director 11: User Guide," Month Unknown, 2008, 498 pages, Adobe Systems Incorporated, San Jose, California, USA.
Author Unknown, "Adobe Premiere Pro CS3: User Guide," Apr. 1, 2008, 455 pages, Adobe Systems Incorporated, San Jose, California, USA.
Brenneis, Lisa, "Final Cut Pro 3 for Macinotsh: Visual QuickPro Guide," Apr. 2002, 288 pages, Peachpit Press, Berkeley, California, USA.
Casares, Juan, et al., "Simplifying Video Editing Using Metadata," Proceedings of Designing Interactive Systems (DIS 2002), Jun. 2002, pp. 157-166, London, United Kingdom.
Wang, Yijin, et al., "My Videos—A System for Home Video Management", Proceedings of the 10th ACM International Conference on Multimedia, Dec. 1-6, 2002, pp. 412-413, Juan-les-Pins, France.

* cited by examiner

AUDITIONING TOOLS FOR A MEDIA EDITING APPLICATION

CLAIM OF BENEFIT TO PRIOR APPLICATIONS

This application claims the benefit of U.S. Provisional Patent Application 61/295,687, filed Jan. 15, 2010. This application is a Continuation-in-Part of U.S. Non-Provisional patent application Ser. No. 12/688,858, filed on Jan. 15, 2010 now U.S. Pat. No. 8,522,144, now published as U.S. Publication 2010/0281386. U.S. patent application Ser. No. 12/688,858 claims the benefit of U.S. Provisional Patent Application 61/174,490, filed Apr. 30, 2009, and U.S. Provisional Patent Application 61/227,070, filed Jul. 20, 2009. U.S. patent application Ser. No. 12/688,858 is a Continuation-in-Part of U.S. Non-Provisional patent application Ser. No. 12/433,875, filed Apr. 30, 2009, now published as U.S. Publication 2010/0281371. U.S. patent application Ser. No. 12/688,858 is also a Continuation-in-Part of U.S. Non-Provisional patent application Ser. No. 12/551,557, filed Aug. 31, 2009, now published as U.S. Publication 2010/0281381. U.S. patent application Ser. No. 12/551,557 claims the benefit of U.S. Provisional Application 61/174,491, filed Apr. 30, 2009, U.S. Provisional Application 61/174,490, filed Apr. 30, 2009, and U.S. Provisional Application 61/227,070, filed Jul. 20, 2009. In addition, this application is a Continuation-in-Part of U.S. Non-Provisional patent application Ser. No. 12/551,559, filed Aug. 31, 2009, now published as U.S. Publication 2010/0281383. U.S. patent application Ser. No. 12/551,559 claims the benefit of U.S. Provisional Application 61/174,491, filed Apr. 30, 2009, U.S. Provisional Application 61/174,490, filed Apr. 30, 2009, and U.S. Provisional Application 61/227,070, filed Jul. 20, 2009. This application is also a Continuation-in-Part of U.S. Non-Provisional patent application Ser. No. 12/433,892, filed Apr. 30, 2009, now published as U.S. Publication 2010/0281375. This application is also a Continuation-in-Part of U.S. Non-Provisional patent application Ser. No. 12/433,893, filed Apr. 30, 2009, now published as U.S. Publication 2010/0281376.

CROSS REFERENCE TO RELATED APPLICATIONS

This Application is related to the following application: U.S. patent application Ser. No. 12/892,914, filed Sep. 28, 2010.

BACKGROUND

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple, Inc. These applications give users the ability to edit, combine, transition, overlay, and piece together different media content in a variety of manners to create a resulting media project. The resulting media project specifies a particular sequenced composition of any number of text, audio, image, and/or video content elements that is used to create a media presentation.

Various media editing applications facilitate such composition through electronic means. Specifically, a computer or other electronic device with a processor and computer readable storage medium executes the media editing application. In doing so, the computer generates a graphical interface whereby designers digitally manipulate graphical representations of the media content to produce a desired result.

One difficulty in media editing is that a user cannot conveniently evaluate different types of media clips (e.g., a video clip, an audio clip, a sequence of media clips, an image, etc.) for a particular section of a presentation. For example, in some instances, a user may wish to evaluate a particular section of the presentation using a video clip with its accompanying sound (e.g., an audio and video clip), the video clip without its accompanying sound (e.g., a video clip), the video clip with an effect applied to it (e.g., sound effects or video effects), the video clip with different in and out points, etc. Moreover, a user may wish to evaluate different sequences of media clips, different scene durations (e.g., a single media clip versus a sequence of media clips), etc.

Typically, if a user wishes to evaluate different types of media clips than those included in the composite presentation, the user must select from a large group of media clips by iteratively accessing various different types of media clips. Thus, there is a need for a flexible media editing application that allows a user to associate different types of media clips with various sections of a composite presentation.

BRIEF SUMMARY

For a media editing application that creates composite presentations, some embodiments of the invention provide a novel auditioning tool that allows a user to examine and maintain several different media clips that are candidates (also referred to as "candidate media clips") for addition at or near a particular location in a composite display area and to select one of the media clips to be included in the composite presentation.

A media clip in some embodiments is a piece of media content. Examples of types of media content include audio data, video data, audio and video data, text data, image/picture data, and/or other media data. In some embodiments, a media clip can be a video clip or an audio clip. In other embodiments, a media clip can be a video clip, an audio clip, an audio and video clip, a sequence of media clips (also referred to as a composed media clip or a media clip sequence), a text clip, a text overlay, a still image or picture, or any other type of media clip that can be used to create a composite presentation.

For some embodiments of the invention, a graphical user interface ("GUI") of a media editing application with an auditioning tool that enables the user to create an audition set that includes several media clips. Typically, an audition set, in some embodiments, includes two or more media clips that are specified as candidates that can be added at a particular location in a composite display area to specify a description of a composite media presentation. In some of these embodiments, all the media clips in an audition are considered candidate media clips (including the "active pick," described below). In other embodiments, an audition set includes one or more media clips that are specified as candidates that can be added at a particular location in the composite display area. For some of these embodiments, the active pick of an audition is not a candidate media clip. In addition, as described below, an audition set of some embodiments can include one media clip.

Some embodiments of a media editing application include a media library through which the application's user can select media clips to add to a presentation that the user is compositing with the media editing application and a composite display area that provides a visual representation of the composite presentation being created by the user. Media clips that are part of the composite presentation are referred to below as "committed media clips." The media editing application of some embodiments allows media clips to be added to the composite display area as candidate media clips. In some embodiments, candidate media clips are media clips that are candidates for adding to the composite presentation as they have not yet been added to the composite presentation.

In some embodiments, the composite display area specifies a description of a composite presentation (also referred to as a "composite media presentation" or a "composite representation"). The composite display area of some embodiments includes a central compositing lane that spans a timeline and displays a graphical representation of the composite presentation by displaying media clips that form the composite presentation. One or more media clips can be placed on the central compositing lane. In some embodiments, no two committed media clips can overlap on the central compositing lane.

Furthermore, media clips can be placed ("anchored") off of media clips placed in the central compositing lane in regions above and below (not shown) the central compositing lane. Media clips placed in such regions are referred to as "anchored media clips." In some embodiments, several horizontal areas that span the timeline form quasi-tracks that are also referred to as "anchor lanes." In some of these embodiments, media clips can be placed in these anchor lanes to anchor off of media clips in the central compositing lane. Instead of, or in conjunction with, having several levels of media clips that anchor off the central compositing lane, some embodiments allow media clips to be placed in these anchor lands and to be anchored off of other anchored media clips placed in these anchor lanes.

Media clips may be displayed with different appearances in different areas of the GUI. For instance, the media clips in the media library can be represented using a thumbnail view (i.e., media clips are represented using a set equally-sized images) while the media clips in the composite display area can be represented using a timeline view (i.e., media clips are represented using a set of rectangular representations where the horizontal length of the rectangle provides a visual indicator of the length or duration of the associated media clip).

In some embodiments, one of the media clips in an audition set is selected as the "active pick" of the audition set. An active pick is a media clip in an audition set that is specified to interact with the media editing application. As such, the characteristics and attributes (e.g., graphical representation, effects, associated keywords, markers, etc.) of the active pick are used when the audition set interacts with the media editing application. For instance, when an audition set is placed at a particular location in the composite display area, the active pick is the media clip that is committed at the particular location in the composite display area. Similarly, the graphical representation of the active pick is used as the graphical representation of the audition set (e.g., a thumbnail view in the media library or a media clip view in the composite display area) in some of these embodiments. As another example, the media content of the active pick is displayed when a playback or skim operation is performed on the audition set. In yet another example, the keywords associated with the active pick are used to determine whether the audition set should be returned as part of a result of a keyword search performed on media clips. In some embodiments, when an edit operation is performed on the audition set, the operation is performed on only the active pick. In some embodiments, however, some or all of the edit operations that can be performed on the audition set are performed on all of the media clips in the audition set.

Different embodiments provide different methods for selecting an active pick when an audition set is initially created. For example, some embodiments select a random media clip in the audition set as the active pick. Other embodiments select a media clip in the audition set based on some criteria, such as media clip duration, media clip creation time, order of media clip selection (e.g., first selected, last selected) when creating the audition set, location of media clips (e.g., set the media clip in the composite display area as the active pick), etc. Other methods for determining which media clip to select as the active pick are possible.

In some embodiments, a user selectable user interface ("UI") item is displayed on an audition set displayed in the composite display area to visually indicate that it is an audition set. The user selectable UI item of some embodiments enables the opening and closing of a selection area. In some embodiments, a selection area displays all the media clips that are in an audition set. Some embodiments display the media clips in the selection area in a carousel-like view (also referred to as a cover flow view). Other embodiments, however, may display the media clips differently in the selection area. In addition, the media editing application of some embodiments allows the user to scroll through the media clips displayed in the selection area.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a media editing application that creates composite presentations, some embodiments of the invention provide a novel auditioning tool that allows a user to examine and maintain several different media clips that are candidates for addition at or near a particular location in a composite display area (also referred to as "candidate media clips") and to select one of the media clips to be included in the composite presentation.

A media clip in some embodiments is a piece of media content. Examples of types of media content include audio data, video data, audio and video data, text data, image/picture data, and/or other media data. In some embodiments, a media clip can be a video clip or an audio clip. In other embodiments, a media clip can be a video clip, an audio clip, an audio and video clip, a sequence of media clips (also referred to as a composed media clip or a media clip sequence), a text clip, a text overlay, a still image or picture, or any other type of media clip that can be used to create a composite presentation. In this application, a media clip may also refer to the graphical representation of the media clip in the GUI of a media editing application of some embodiments.

For media content that have a temporal component (e.g., audio media clips, video media clips, audio and video media clips, etc.), the media content is further defined by an in point and an out point with respect to a source media file. In some such embodiments, the source media file is stored on the computing device on which the media editing application executes or on a computing device to which the media editing application has access. A media clip's in and out points define its start and end point with respect to the source media file.

The in and out points of a media clip can be defined to be an entire source media file or a portion of the source media file in some embodiments. Several media clips can define in and out points with respect to the same source media file with each of the media clips having different media content. For instance, the in and out points of a media clip can be defined to be the first half of a source media file while the in and out points of another media clip can be defined to be the latter half of the source media file.

Figure 1:
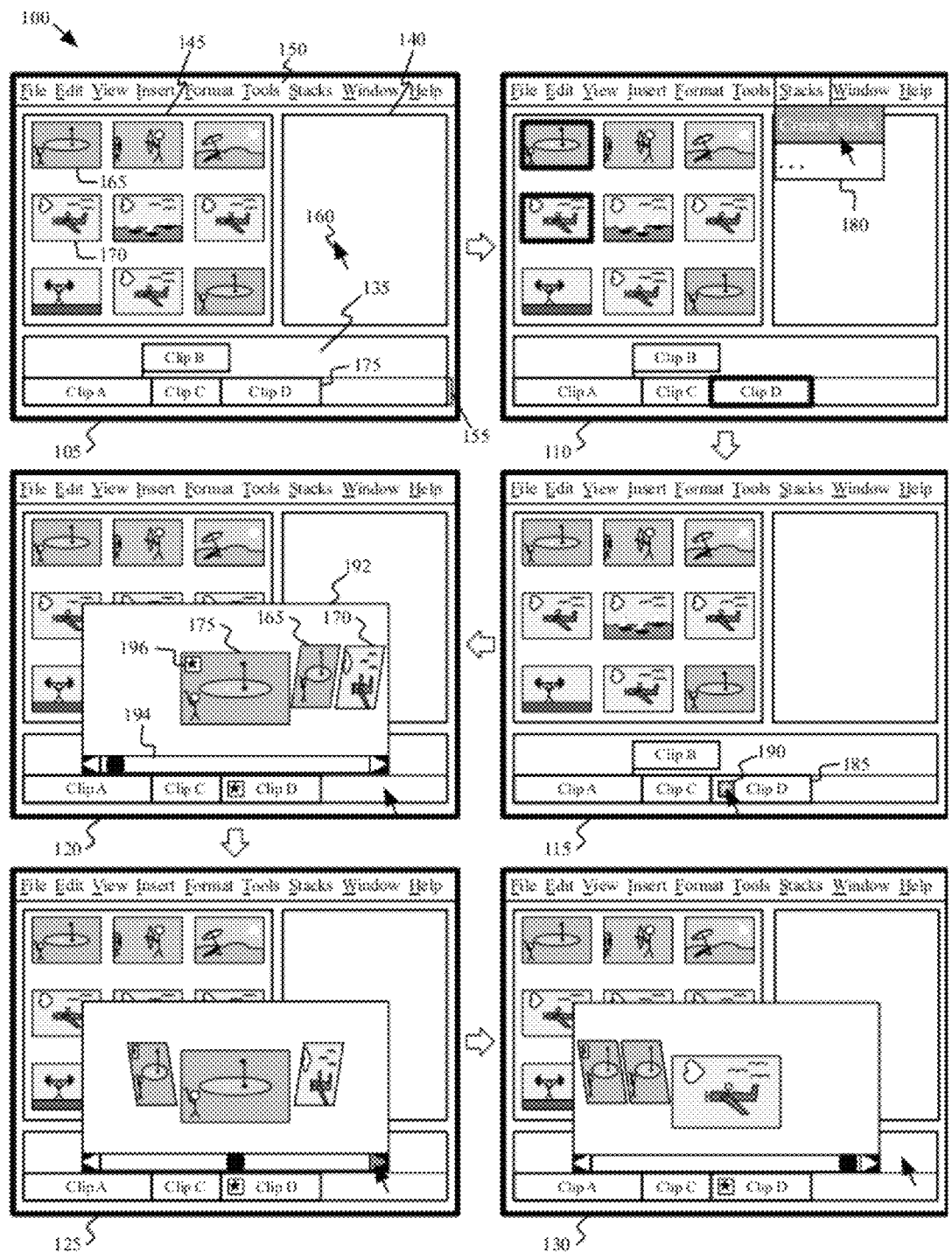
FIG. 1 illustrates a graphical user interface ("GUI") of a media editing application with an auditioning tool of some embodiments.

For some embodiments of the invention, FIG. 1 conceptually illustrates a graphical user interface ("GUI") 100 of a media editing application with an auditioning tool of some embodiments. Specifically, this figure illustrates the GUI 100 at six different stages 105-130 in order to show the creation of an audition set that includes three media clips. An audition set, in some embodiments, includes two or more media clips that are specified as candidates for addition at a particular location in a composite display area to specify a description of a composite media presentation. In some embodiments, an audition set is also referred to as a "stack" or an "audition stack." Each of these stages will be further described below after an introduction of the elements of the GUI 100.

As shown in FIG. 1, the GUI 100 includes a media library 145, a composite display area 135, a preview display area 140, and a menu bar 150. The preview display area 140 displays a preview of a composite presentation that the application creates by compositing several media clips. The menu bar 150 provides several grouped sets of menu commands and options for the media editing application. In addition, this figure illustrates a cursor 160 for providing feedback to a user and operating various selection buttons and other controls included in the GUI 100. The cursor 160 also allows a user to select or manipulate various objects (e.g., representations of media content) that are included in the GUI 100. One of ordinary skill will recognize that, while a cursor is shown in FIG. 1 as well as many of the figures below, some embodiments display the GUI on a touchscreen device that enables the user to control the GUI items without a cursor. Thus, when a selection operation is referred to as a "click operation" below, while shown using a cursor, such selection operations may also be performed through a touch or "tap" of a touchscreen. Similarly, drag operations (e.g., click-and-drag, drag-and-drop) can be performed through dragging a finger along a touchscreen in addition to the illustrated operations involving a cursor. In addition, some embodiments displayed on a touchscreen will also display the cursor.

The media library 145 (also referred to as an "organizer display area") is an area in the GUI 100 through which the application's user can select media clips to add to a presentation that the user is compositing with the media editing application. In addition, the media library 145 of some embodiments is also used for other purposes, such as organizing media clips and/or compositing media clips, as described in further detail below. In the example of FIG. 1, the media clips in the media library 145 are represented as thumbnails that can be selected and added to the composite display area 135 (e.g., through a drag-and-drop operation or a menu selection operation). The clips in the media library 145 may also be represented as a list, a set of icons, or some other representation that allows a user to view and select the various media clips in the media library 145. In some embodiments, the media library 145 may include audio clips, video clips, audio and video clips, text overlays, pictures, sequences of media clips, and/or other media clips.

The composite display area 135 provides a visual representation of the composite presentation being created by the user. Specifically, it displays one or more geometric shapes that represent one or more media clips that are part of the composite presentation. Media clips that are part of the composite presentation are referred to below as "committed media clips." As further described below, the media editing application of some embodiments allows media clips to be added to the composite display area as candidate media clips. In some embodiments, candidate media clips are media clips that are candidates for adding to the composite presentation as they have not yet been added to the composite presentation.

In some embodiments, the composite display area 135 specifies a description of a composite presentation (also referred to as a "composite media presentation" or a "composite representation"). As shown in FIG. 1, the composite display area 135 includes a central compositing lane 155 that spans a timeline and displays a graphical representation of the composite presentation (also referred to as a "composite representation") by displaying media clips that form the composite presentation. One or more media clips can be placed on the central compositing lane 155. In some embodiments, no two committed media clips can overlap on the central compositing lane 155.

Furthermore, media clips can be placed ("anchored") off of media clips placed in the central compositing lane 155 in regions above and below (not shown) the central compositing lane 155. Media clips placed in such regions are referred to as "anchored media clips." As an example, FIG. 1 shows a media clip ("Clip B") that is anchored off of another media clip ("Clip A") in the composite display area 135. In some embodiments, several horizontal areas that span the timeline form quasi-tracks that are also referred to as "anchor lanes." In some of these embodiments, media clips can be placed in these anchor lanes to anchor off of media clips in the central compositing lane 155. Instead of, or in conjunction with, having several levels of media clips that anchor off the central compositing lane 155, some embodiments allow media clips to be placed in these anchor lands and to be anchored off of other anchored media clips placed in these anchor lanes.

As shown, media clips may be displayed with different appearances in different areas of the GUI 100. For instance, the media clips in the media library 145 in this example are represented using a thumbnail view (i.e., media clips are represented using a set equally-sized images) while the media clips in the composite display area 135 are represented using a timeline view (i.e., media clips are represented using a set of rectangular representations where the horizontal length of the rectangle provides a visual indicator of the length or duration of the associated media clip).

As mentioned above, an audition set includes two or more media clips that are specified as candidates for addition at a particular location in a composite display area in some embodiments. In some embodiments, one of the media clips in an audition set is selected as the "active pick" of the audition set. An active pick is a media clip in an audition set that is specified to interact with the media editing application. As such, the characteristics and attributes (e.g., graphical representation, effects, associated keywords, markers, etc.) of the active pick are used when the audition set interacts with the media editing application. For instance, the graphical representation of the active pick is used as the graphical representation of the audition set (e.g., a thumbnail view in the media library 145 or a media clip view in the composite display area 135). As another example, the media content of the active pick is displayed when a playback or skim operation is performed on the audition set. In yet another example, the keywords associated with the active pick are used to determine whether the audition set should be returned as part of a result of a keyword search performed on media clips. In some embodiments, when an edit operation is performed on the audition set, the operation is performed on only the active pick. In some embodiments, however, some or all of the edit operations that can be performed on the audition set are performed on all of the media clips in the audition set.

Different embodiments provide different methods for selecting an active pick when an audition set is initially created. For example, some embodiments select a random media clip in the audition set as the active pick. Other embodiments select a media clip in the audition set based on some criteria, such as media clip duration, media clip creation time, order of media clip selection (e.g., first selected, last selected) when creating the audition set, location of media clips (e.g., set the media clip in the composite display area 135 as the active pick), etc. Other methods for determining which media clip to select as the active pick are possible.

The operation of the GUI 100 will now be described by reference to the state of this GUI during the six stages 105-130 that are illustrated in FIG. 1. In the first stage 105, the composite display area 135 displays a composite presentation that includes media clips that span along a timeline. A user might have added these media clips to the composite presentation in a current editing session or by opening a composite project (also referred to as a "project") that was defined in a previous editing session.

The second stage 110 of the GUI 100 shows several media clips selected. As shown, the media clips 165 and 170 in the media library 145 and media clip 175 in the composite display area 135 have been selected (e.g., through a cursor click, a touch click), as indicated by the bolding of the borders of the media clips. In some embodiments, the selections are performed individually while an input, such a hotkey or keystroke, is pressed and held.

The second stage 110 of the GUI 100 also displays a menu 180 that includes a user selectable "Create Stack" option and other user selectable options (not shown). The "Create Stack" option of some embodiments that is included in the menu 180 is for invoking the creation of an audition set that includes the media clips that are selected (the media clips 165-175 in this example) when the "Create Stack" option is selected. Different embodiments of the menu 180 may include different numbers of different user selectable options for performing different functions. In some embodiments, the menu 180 is invoked by selecting the "Stacks" option in the menu bar 150 through a cursor click operation using the cursor 160. Some embodiments provide other ways to invoke the menu 180 as well. For instance, some of these embodiments allow the user to invoke the menu 180 using a hotkey, a keystroke, a series of keystrokes, a combination of keystrokes, a touch operation for a touchscreen device, or any other method to invoke the menu 180. The second stage 110 also illustrates the "Create Stack" option being selected through a cursor click operation using the cursor 160.

The third stage 115 illustrates the GUI 100 after the creation of an audition set 185 that includes the media clips 165-175. As shown, a user selectable user interface ("UI") item 190 is displayed on the audition set 185 to visually indicate that the audition set 185 displayed in the composite display area 135 is an audition set. The user selectable UI item 190 of some embodiments enables the opening and closing of a selection area, as described in further detail below. Different embodiments use different representations of the user selectable UI item 190 to visually indicate that the audition set 185 is an audition set. For example, some embodiments may display a different geometric shape, text, or any other appropriate visual indicator. The third stage 115 illustrates the selection of the UI item 190 through a cursor click operation using the cursor 160. In some embodiments, a touch operation can be used for a touchscreen device.

The fourth stage 120 illustrates the GUI 100 at a stage after the selection of the user selectable UI item 190. As shown, a selection area 192 (also referred to as a "selection display area") that includes a scroll bar 194 is displayed (e.g., opened) in the GUI 100. In some embodiments, the selection area 192 is displayed in the GUI 100 shortly after the selection of the user selectable UI item 190. Some embodiments provide other mechanisms for invoking the display of the selection area 192. For example, some of these embodiments allow the user to invoke the selection area 192 using a hotkey, a keystroke, a series of keystrokes, a combination of keystrokes, an option selected from a pop-up or pull-down menu, a touch operation for a touchscreen device, or any other appropriate method to invoke the display of the selection area 192.

In some embodiments, the selection area 192 displays all the media clips that are in an audition set. For example, since the audition set 185 includes the media clips 165-175, the selection area 192 displays those media clips in the selection area 192. Some embodiments display the media clips in the selection area 192 in a carousel-like view (also referred to as a cover flow view) as illustrated in this example. Other embodiments, however, may display the media clips differently in the selection area 192. For instance, some embodiments may display the media clips as text, icons, or any other visual representation of the media clips. Further, some embodiments may display the media clips in different views, such as a horizontal view, a vertical view, or other types of views that allow a user to scroll through the media clips.

The scroll bar 194 of some embodiments allows the user to scroll through the media clips displayed in the selection area 192. As shown, the user selectable left arrow UI item displayed in the scroll bar 194 is for scrolling the media clips displayed in the selection area 192 from left to right. The user selectable right arrow UI item is similar to the left arrow except it is for scrolling the media clips displayed in the selection area 192 from right to left. Also, the scroll bar 194 includes a position indicator to indicate the relative position of the media clip that is displayed at or near the middle of the selection area 192 among the other media clips. In some embodiments, the user can also select and drag (e.g., through a click-and-drag operation using the cursor 160) the indicator along the scroll bar 194 to scroll through the media clips displayed in the selection area 192. Other embodiments provide other ways of scrolling through the media clips, such as using a hotkey, a keystroke, a series of keystrokes, a combination of keystrokes, an option selected from a pop-up menu or pull-down menu, a touch operation for a touchscreen device, or any other appropriate way to invoke a scrolling operation.

As shown in the fourth stage 120 of FIG. 1, an indicator 196 (e.g., a badge) for indicating that a media clip is an active pick (and thus a committed media clip in some embodiments) is displayed on the thumbnail representation of the media clip 175. As mentioned above, different embodiments provide different methods for selecting an active pick when an audition set is created. In this example, the media clip that is part of the composite presentation (the media clip 175 in this example) is selected as the active pick, as illustrated by the indicator 196 displayed in the thumbnail representation of the media clip 175. Some embodiments set the last media clip selected before creating the audition set as the active pick while other embodiments set the first media clip selected as the active pick. Although this figure illustrates one way of indicating that a media clip in the audition set is the active pick, different embodiments indicate that a media clip is an active pick differently, such as highlighting the border of the media clip, displaying a label on the media clip, etc.

At the fifth stage 125, the GUI 100 shows the media clips are being scrolled through the selection area 192. This stage shows a selection of the right arrow of the scroll bar 194 being selected through a cursor click operation using the cursor 160, as illustrated by a change in the appearance of the right arrow. As shown in the selection area 192, the media clips 165 and 175 have scrolled right to left and the indicator in the scroll bar 194 has also changed positions accordingly. Although this example illustrates scrolling through the media clips displayed in the selection area 192 using the arrows of the scroll bar 194, the indicator of the scroll bar 194 can be used to scroll through the media clips displayed in the selection area 192 in some embodiments, as previously mentioned above.

The sixth stage 130 of the GUI 100 shows the media clips 165-175 displayed in the selection area 192 after they have been scrolled through from right to left. At this stage, the media clip 170 is displayed in the middle of the selection area 192.

Several more detailed embodiments of the invention are described in the sections below. Section I provides a conceptual description of an audition set of some embodiments and its attributes. In addition, Section I describes several techniques for creating an audition set and the types of media clips that can be included in an audition set. Next, Section II describes different methods for previewing media clips in an audition set. Section III follows this with a description of editing operations that can be performed on an audition set. Next, Section IV describes the software architecture of a media editing application that employs auditioning tool of some embodiments. Finally, Section V describes a computer system that implements some embodiments of the invention.

I. Creating an Audition Set

As mentioned above, an audition set of some embodiments is defined as two or more media clips that are specified as candidates for addition at a particular location in a composite display area. An audition set of some embodiments can include several of the same type of media clips or several different types of media clips. The following FIGS. 2-4 conceptually illustrate several different examples of such audition sets.

Figure 2:
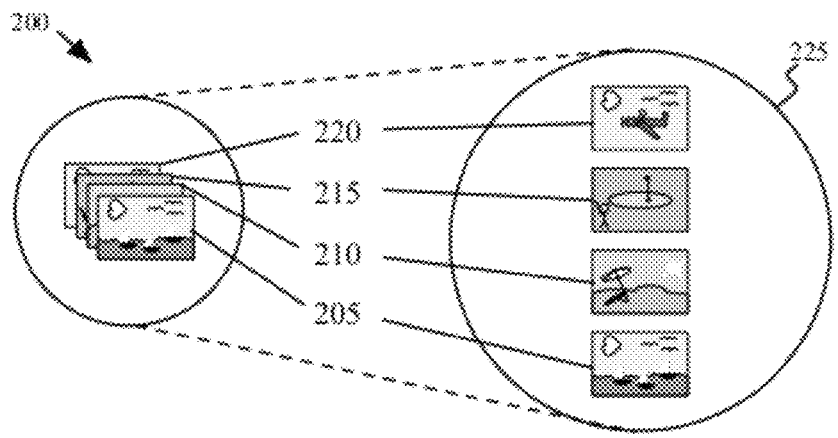
FIG. 2 conceptually illustrates an example audition set that includes several video clips.

FIG. 2 illustrates an example audition set 200 that includes several video clips. For this example, the audition set 200 includes four video clips 205-220. As shown, the graphical representation of the audition set 200 is the thumbnails of each of the four video clips 205-220 stacked on top of each other in an offset manner. This graphical representation is just one of many possible representations. For example, some embodiments may graphically represent the audition set 200 as a single thumbnail (e.g., the thumbnail of the active pick) with an indicator displayed on the thumbnail to indicate that it is an audition set.

This figure also shows an exploded view 225 of the individual media clips in the audition set 200. As illustrated by their thumbnail representations, the video clip 205 includes video content of boats sailing on the ocean, the video clip 210 includes video content of an umbrella under the sun, the video clip 215 includes video content of a golfer hitting a golf ball towards a hole, and video clip 220 includes video content of a person flying an airplane in the sky. Each of the video clips 205-220 is a candidate video clip for inclusion at a particular location in the composite display area 135. For instance, the video clips 205-220 might be different introductory scenes of a movie presentation.

Figure 3:
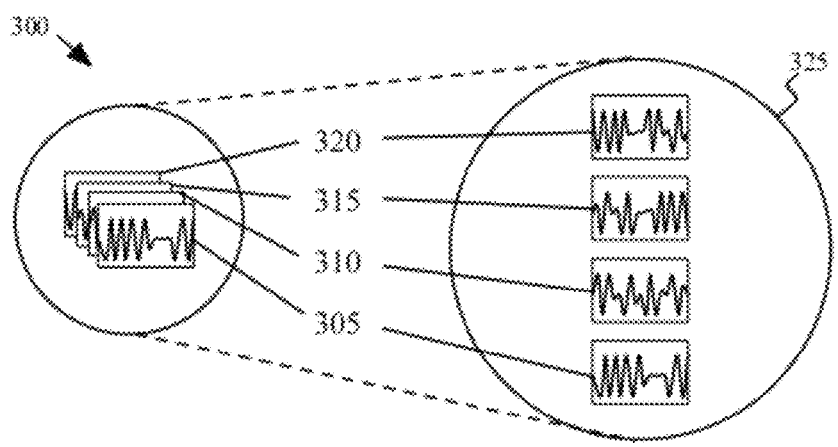
FIG. 3 conceptually illustrates an example audition set that includes several audio clips.

FIG. 3 illustrates an example audition set 300 that includes several audio clips. Specifically, the audition set 300 includes four audio clips 305-320. Similar to the audition set 200, the graphical representation of the audition set 300 is the thumbnails of each of the four audio clips 305-320 stacked on top of each other in an offset fashion.

In an exploded view 325 of the audition set 300, the thumbnail representation of each of the audio clips 305-320 is individually shown. For this example, the thumbnail representation of each of the audio clips 305-320 is of a waveform of a portion or all of the audio clip's audio content. Other embodiments may use different graphical representations for the audio clips 305-320, such as an image that indicates the audio file format (e.g., ACC, ALAC, MP3, WAV, etc.) of the audio content. Accordingly, the audio clips 305-320 are candidate audio clips for inclusion at a particular location in a composite display area. For example, the audio clips 305-320 might be different sound background music for a scene in a movie presentation.

Figure 4:
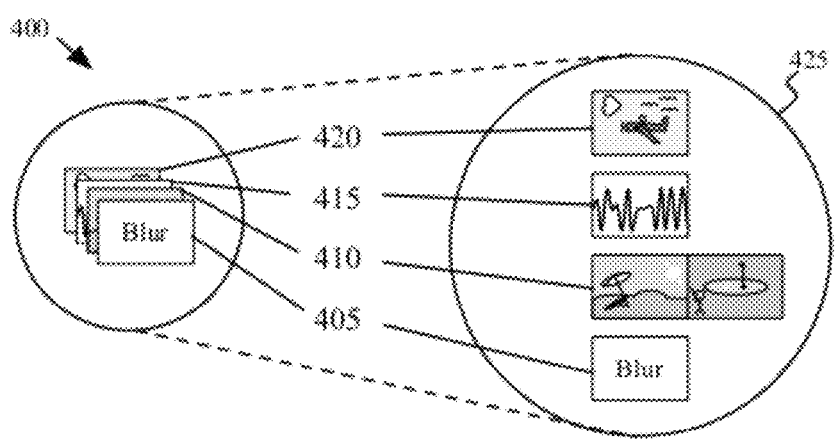
FIG. 4 conceptually illustrates an example audition set that includes several different types of media clips.

The audition sets described by reference to FIGS. 2 and 3 include the same type of media clip. An audition set in some embodiments can include different types of media clips. FIG. 4 illustrates an example of such an audition set. This figure shows an audition set 400 that includes four media clips 405-420. Like the audition sets 200 and 300, the graphical representation of the audition set 400 is the thumbnails of each of the media clips 405-420 stacked on top of each other in an offset manner.

An exploded view 425 of the audition set 400 individually illustrates each of the media clips 405-420. As shown, the media clip 405 is an effect clip that is graphically represented by the name of the effect ("Blur" in this example). As mentioned above, a media clip can be a sequence of media clips in some embodiments. In this example, the media clip 410 is a sequence of two video clips. Furthermore, the media clip 415 is an audio clip and the media clip 420 is a video clip. Thus, the media clips 405-420 of the audition set 400 are each candidate media clips for inclusion at a particular location in a composite display area.

The above described FIGS. 2-4 show examples of an audition set of four video clips, an audition set of four audio clips, and an audition set of four different types of media clips. However, one of ordinary skill in the art will realize that an audition set can include a different number of media clips that can each be any number of different types of media clips. For instance, an audition set can include a sequence of video clips, a sequence of audio clips, a sequence of effect clips, a sequence that includes audio and video clips, among other media clips.

Moreover, although many of the examples described above and below illustrate an audition set that includes two or more media clips, some embodiments provide the ability to create an audition set that includes one media clip (e.g., an audio clip, a video clip, etc.). For instance, a user might have a scene of a composite presentation that the user does not like, but the user has not re-shot the scene. In these instances, the user can create an audition set (e.g., by selecting the media clip of the scene in the composite display area and selecting the "Create Stack" option illustrated in FIG. 1) that includes just the media clip of the scene that the user does not like, with the intention of later reshooting the scene and adding those reshoots to the audition set to evaluate and examine which one the user likes. In this manner, the user can user the audition set to hold the place in the composite presentation even though the user does not like the scene.

Continuing with the example, after reshooting the scene, the user can add those reshoots to the audition set. The user might like one of the reshoots of the scene, but the user might change the scene to a different one. Here, the user can remove all the media clips from the audition set except the one the user likes, resulting in an audition set that includes one media clip. However, the user might not delete the audition set so that the user can later add the different scene to the audition set in case the user wants to change the scene.

In another example, the user may want to add a scene to a composite presentation, but the user may not have the source files for the scene (e.g., the scene has not been shot). In such cases, the user might create an audition set that includes a "blank" media clip (also referred to as a placeholder clip) to hold a location in the composite display area for the scene. The placeholder clips of some embodiments can have a thumbnail representation that consists of an image that indicates to the user the scene or shot that is desired or planned. For example, a placeholder clip for a landscape scene might have a landscape still image as its thumbnail representation, a placeholder clip for a fight scene might have an image of boxing gloves as its thumbnail representation, etc.

A. Operations to Create an Audition Set

Figure 5:
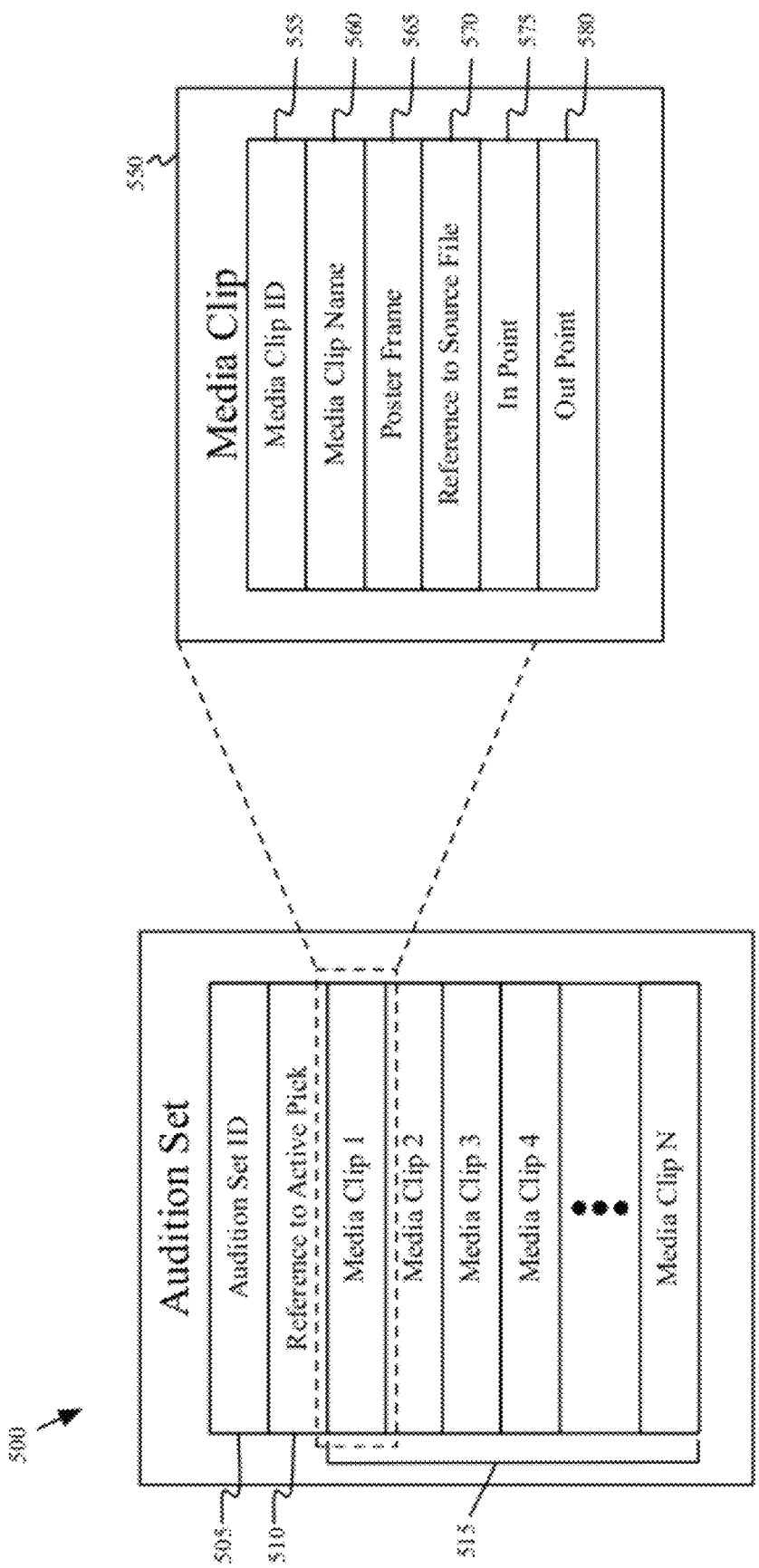
FIG. 5 conceptually illustrates a data structure of some embodiments for an audition set.

FIG. 5 conceptually illustrates a data structure 500 of some embodiments that is stored for an audition set. As shown, the audition set data structure 500 includes an audition set ID 505, a reference to active pick 510, and a set of media clip information 515.

The audition set ID 505 is a unique identification of the audition set. In some embodiments, the audition set ID 505 is unique within each functional area (e.g., the media library 145 and the composite display area 135 described above by reference to FIG. 6) of a media editing application. In other embodiments, the audition set ID 505 is unique to a media project, or all projects edited by the media editing application.

The reference to active pick 510 points to information about one media clip in the set of media clip information 515. An example of a reference to active pick 510 is a memory address (e.g., a memory address of a location at which information about a media clip in the set of media clip information 515 is stored).

The media clip information 515 stores information about any media clips that have been added to the audition set. As shown, FIG. 5 also conceptually illustrates a data structure 550 of some embodiments that is stored in the media clip information 515 for each media clip in the audition set. In some embodiments, rather than storing the media clip information 515 directly in the audition set data structure 500, the media editing application stores a reference to a media clip data structure 550. As shown in this figure, the media clip data structure 550 includes a media clip ID 555, a media clip name 560, a poster frame 565, a reference to source file 570, and in and out points 575 and 580 within the source file.

The media clip ID 555 is a unique identification of the media clip. Similar to the audition set ID 505 mentioned above, the media clip ID 555 in some embodiments is unique within each functional area of a media editing application while in other embodiments, it is unique to the media project or all projects within the media editing application.

The media clip name 560 is a secondary identification of the media clip. In some embodiments, it is the file name of a media source file (e.g., "movie1.mov", "movie2.avi", etc.). When a media clip is duplicated in a display area in some such embodiments, the duplicate copies of the two media clips have the same clip name but have different media clip IDs.

The poster frame data element 565 stores the location of the poster frame (i.e., the representative thumbnail that is displayed in the media library 145 to represent the media clip) when the media clip is a video clip, an audio video clip, or a sequence of video and/or audio and video clips. In some embodiments, the poster frame of a media clip is the first frame of the media clip by default. For audio clips, some embodiments store a portion of the clip for which the media editing application displays a waveform in the thumbnail representation of the clip.

The reference to source file 570 points to a location (e.g., on a local or network storage) at which the media source file (e.g., an audio file, video file, an audio and video file, etc.) is stored. An example of a reference to source file is a memory address or a file directory structure location and a file name. The in and out points 575 and 580 refer to points (e.g., timecodes) within the source file at which the media clip starts and stops. The in and out points could define the media clip as the entirety of the source media file, or only a portion of the source media file (e.g., three seconds of a ten second video file).

As mentioned above, the media clips of some embodiments include audio clips, video clips, audio and video clips, sequences of media clips, and effect clips, among other types of media clips. The media clip data structure for a sequence of media clips is different in some embodiments. For example, the media clip data structure of some of these embodiments includes references to multiple source files and the positions of the media clips in the sequence. The media clip data structure of other of these embodiments may include additional information to define the sequence. In addition, although an audition set of some embodiments has several attributes as described above, the audition set of other embodiments may have more, fewer, or different attributes.

As described above by reference to FIG. 1, an audition set of some embodiments may be created by selecting media clips in the media library 145 and the composite display area 135 and selecting an option from a pull-down menu. However, other techniques for creating an audition set are possible. The following figures illustrate different techniques for creating an audition set in some embodiments.

Figure 6:
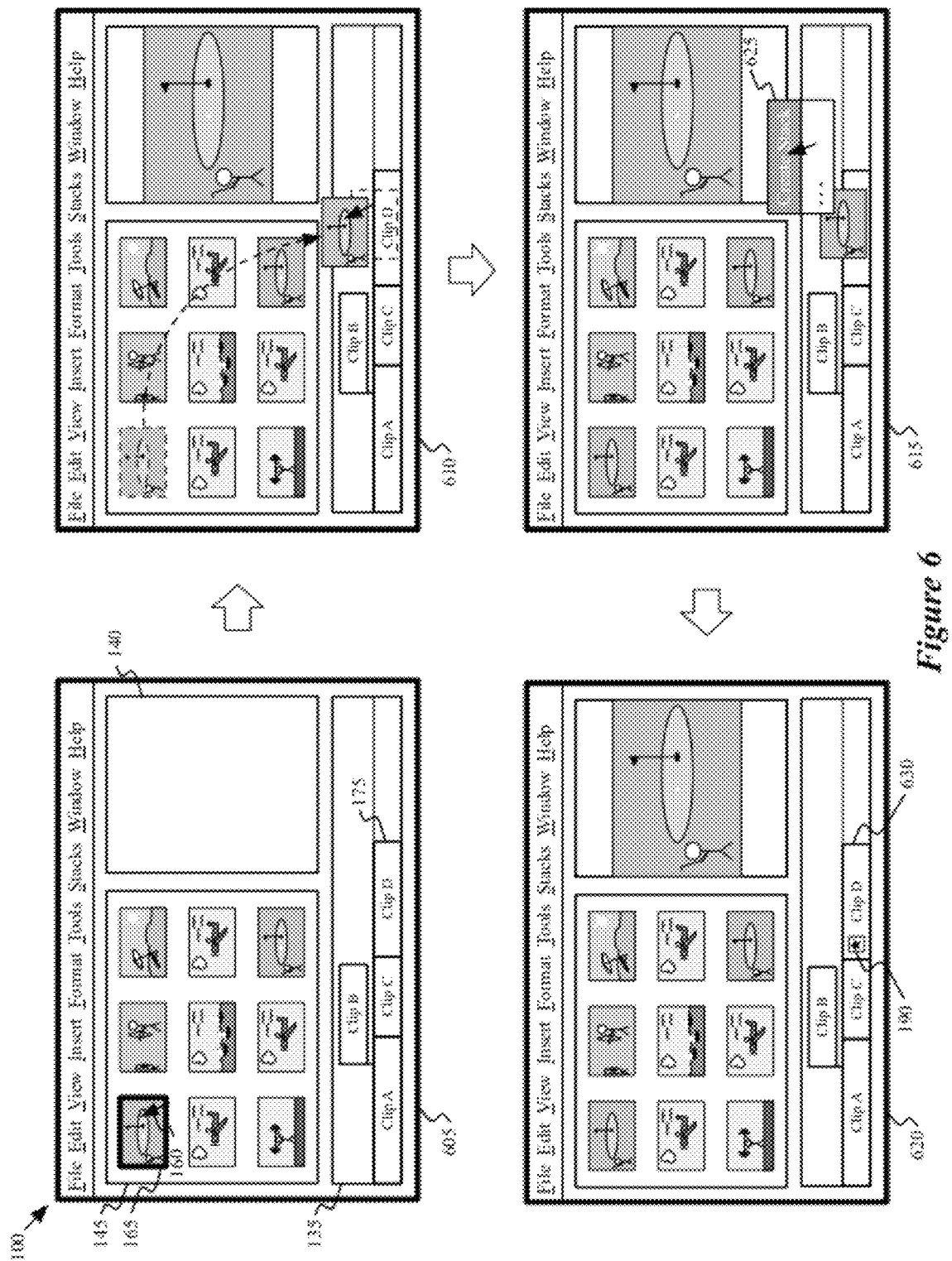
FIG. 6 illustrates creating an audition set using the GUI of FIG. 1 according to some embodiments of the invention.

FIG. 6 conceptually illustrates another method of creating an audition set using the GUI 100 of some embodiments. Specifically, FIG. 6 illustrates the GUI 100 at four different stages 605-620 that show the creation of an audition set by dragging a media clip from the media library onto a clip in the timeline.

In the first stage 605, the GUI 100 shows a selection of the media clip 165 through a click operation using the cursor 160. Similar to FIG. 1, described above, the composite display area 135 displays a composite presentation that includes media items that span along a timeline that a user might have added to the composite presentation in a current editing session or by opening a composite project that was defined in a previous editing session.

The second stage 610 displays the GUI 100 after the media clip 165 in the media library 145 has been selected and dragged (e.g., through a drag-and-drop operation using the cursor 160) towards a media clip 175 displayed in the composite display area 135, as indicated by a dotted arrow. In this example, the media clip 175 is a committed item. This stage illustrates a dotted rectangle in the composite display area 135 that indicates a location in the composite display area 135 to which the user drags the media clip 165. When the media clip 165 is selected in the second stage 605, the preview display area 140 displays the thumbnail image that represents the media clip 165. However, in some embodiments, the thumbnail representation of the media clip 165 is not displayed in the preview display area 140 when the media clip 165 is selected in the media library 145.

The third stage 615 shows the GUI 100 after the user has finished dragging the media clip 165 from the media library 145 to the media clip 175 in the composite display area 135. When the user finishes dragging the media clip 165 into the composite display area 135, the media editing application automatically displays a menu 625 shortly thereafter in some embodiments. The menu 625 includes a user selectable "Create Stack" option as well as other user selectable options (not shown). Different embodiments of the menu 625 may include different numbers of different user selectable options for performing different functions. The "Create Stack" option invokes a command to create an audition set that includes the media clip(s) that was selected and dragged into the composite display area 135 (the media clip 165 in this example) and the media clip in the composite display area 135 on which the former was dragged (the media clip 175 in this example). The third stage 615 also illustrates the selection of the "Create Stack" option through a click operation using the cursor 160.

The fourth stage 620 illustrates the GUI 100 after the creation of an audition set 630 that includes the media clips 165 and 175. As shown, a user selectable user interface ("UI") item 190 is displayed on the audition set 630 to visually indicate that the audition set 630 displayed in the composite display area 135 is an audition set. The user selectable UI item 190 enables the opening and closing of a selection area, which is described in further detail below, in some embodiments. Different embodiments use different representations of the user selectable UI item 190 to visually indicate that the audition set 630 is an audition set. For example, some embodiments may display a different geometric shape, text, or any other appropriate visual indicator. As illustrated in this stage, the GUI 100 displays content of the active pick of the audition set 630 in the preview display area 140 when the creation of the audition set 630 is completed. In other embodiments, the creation of the audition set does not affect the preview display area.

In some instances, a user of a media editing application may wish to audition different versions of the same media clip. For example, the user may wish to evaluate and examine how a media clip with different in and out points, durations, effects, etc., appears in a particular part of a composite presentation. The following FIGS. 7 and 8 illustrate example techniques for creating audition sets with multiple versions of a media clip.

Figure 7:
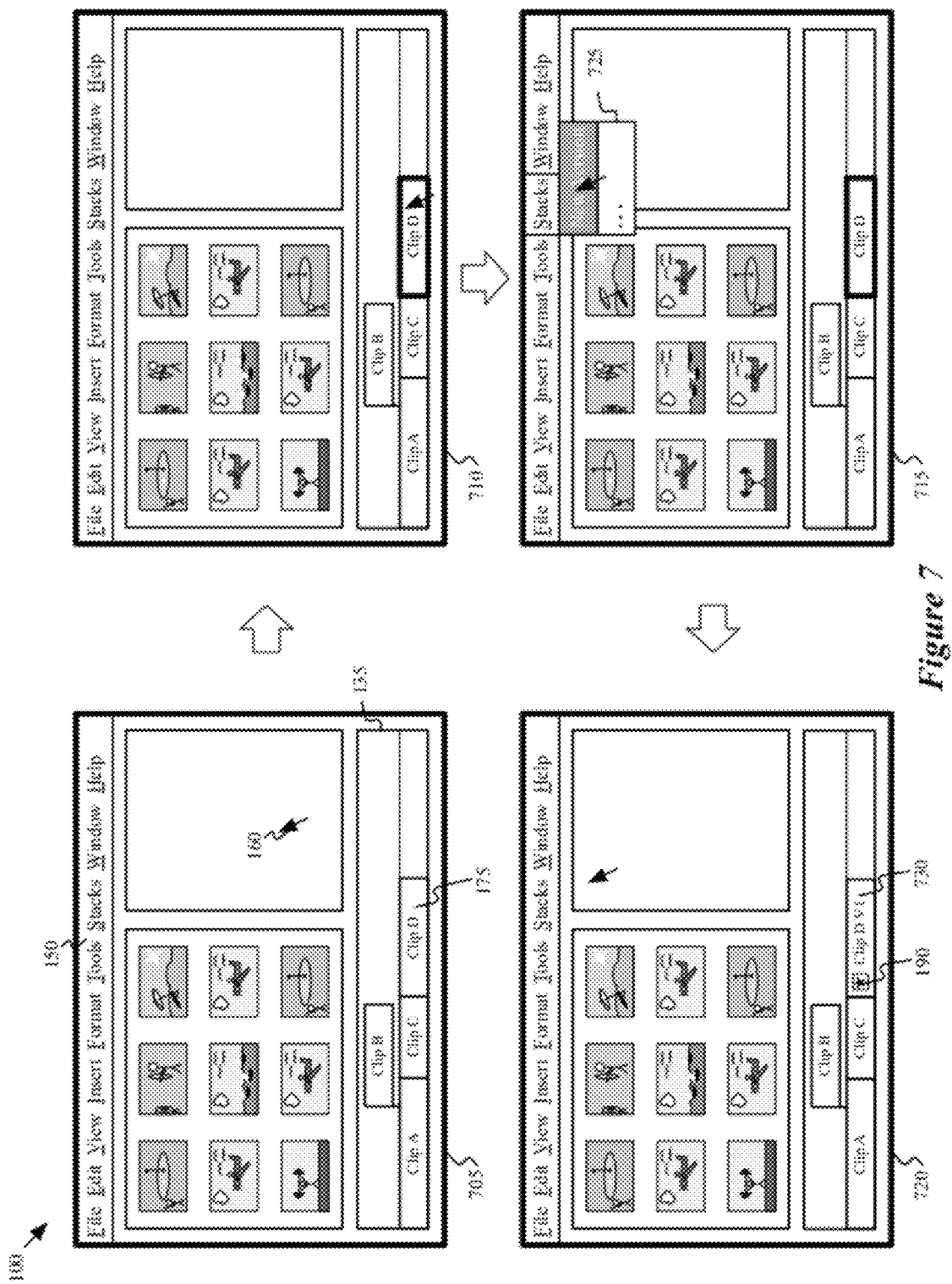
FIG. 7 illustrates creating an audition set using the GUI of FIG. 1 according to some embodiments of the invention.
Figure 8:
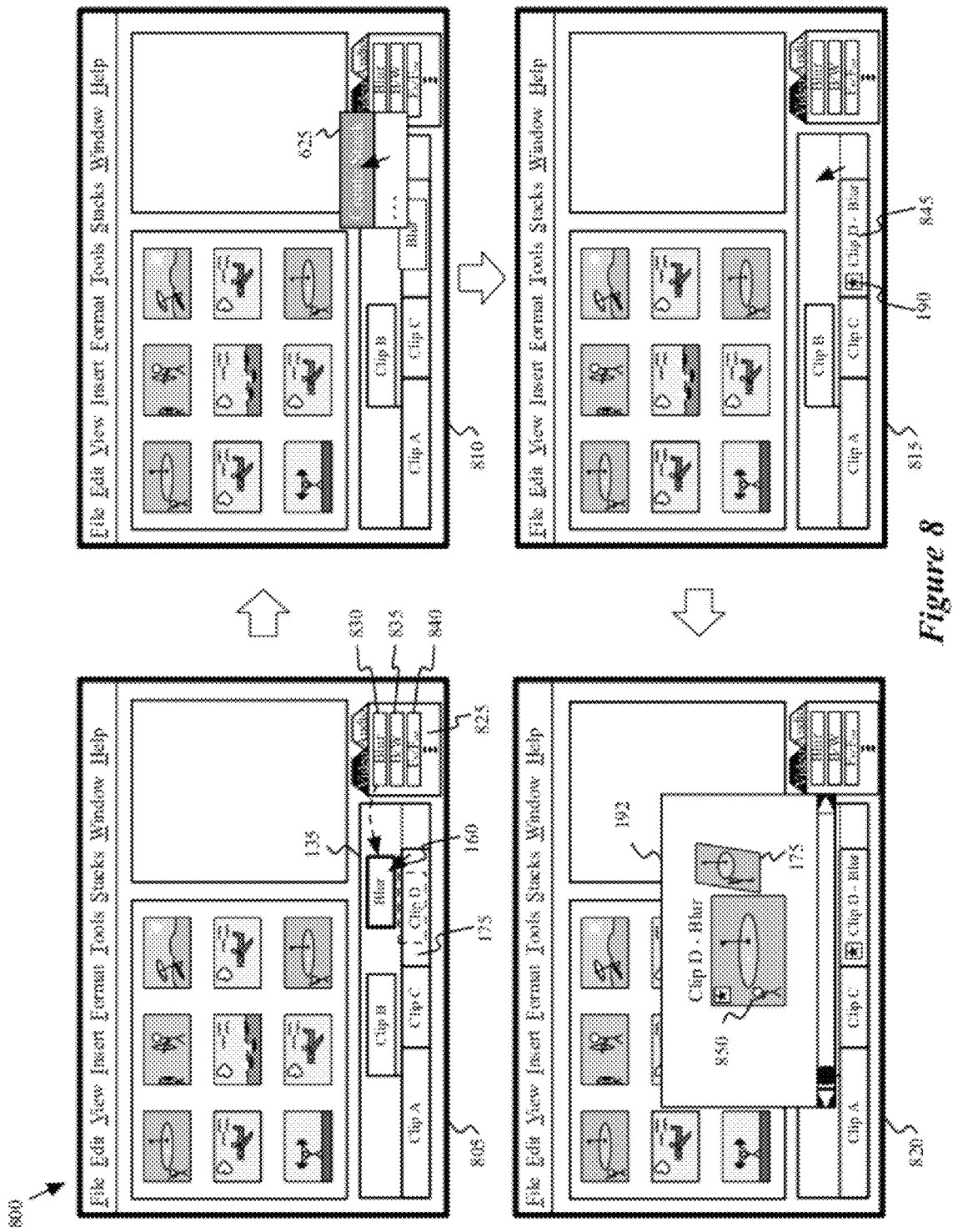
FIG. 8 illustrates creating an audition set using the GUI of FIG. 1 according to some embodiments of the invention.

FIG. 7 conceptually illustrates creating an audition set using the GUI 100 according to some embodiments of the invention. In particular, this figure illustrates the GUI 100 at four different stages 705-720 that show the creation of an audition set that includes a media clip and a new version (i.e., a duplicate) of that media clip. The first stage 705 is the same as the first stage 605 shown in FIG. 6.

At the second stage 710, the GUI 100 illustrates a selection of a media clip in the composite display area 135. As shown, the media clip 175 is selected through a click operation using the cursor 160. The GUI indicates this selection by bolding the border of the representation of media clip 175.

The third stage 715 illustrates the GUI 100 during the initiation of the creation of an audition set. As shown, the GUI 100 at this stage displays a menu 725 that includes a user selectable "New Version" option as well as other user selectable options (not shown). The "New Version" option of some embodiments invokes a command to create a new version of a selected media clip (media clip 175 in this example) and an audition set that includes the selected media clip and the new version of it. In some embodiments, the menu 725 is invoked by selecting the "Stacks" option in the menu bar 150 through a click operation using the cursor 160. Some embodiments also provide other methods for invoking the menu 725. For instance, some of these embodiments allow the menu 725 to be invoked using a hotkey, a keystroke, a series of keystrokes, a combination of keystrokes, or any other method to invoke a menu. The third stage 715 illustrates the "New Version" option being selected through a click operation using the cursor 160.

The fourth stage 720 shows the GUI 100 after the creation of an audition set 730 that includes the media clip 175 and a new, separate version of the media clip. As shown, the user selectable item 190 is displayed on the audition set 730 to visually indicate that the audition set 730 is an audition set. In this example, the media editing application sets the new version of the media clip 175 as the active pick when the audition set 730 is created. Some embodiments define a new data structure for the new version that has a different identifier but the same defining information (i.e., poster frame, source file, in and out points, etc.). The user can then edit one of the versions of the media clip (e.g., modify the in and out points) while leaving the other version unchanged.

As the new version of the media clip 175 is the first such new version of this media clip, the media editing application names the new version using the name of the media clip 175 appended with a label indicating the version number ("V1" in this example), as shown by the display of "Clip D V1" in the audition set 730. Subsequent versions of the media clip 175 are named with sequential version numbers (e.g., "Clip D V2," "Clip D V3," etc.) in some embodiments. Other embodiments may provide other ways of naming a new version of a media clip. Although this example illustrates that the newly created version is set as the active pick of the audition set 730, some embodiments set the original media clip 175 as the active pick of the audition set 730 (and the name displayed in the audition set 730 would remain as "Clip D").

FIG. 8 illustrates an example of creating an audition set that includes a media clip and a version of the media clip with an effect applied. As shown, FIG. 8 illustrates the GUI 800 at four different stages 805-820 that show the creation of such an audition set. The GUI 800 is similar to the GUI 100 except the GUI 800 also includes an effects panel 825. As shown, the effects panel 825 includes a "Video" tab for displaying an effects panel for video effects and an "Audio" tab for displaying an effects panel for audio effects. For this example, the "Video" tab is selected and the effects panel thus displays video effects. In particular, the effects panel 825 includes user selectable effect items 830-840 and other user selectable effects (not shown). Each of the user selectable effects in the effects panel 825 causes the application of one or more video effects to a media clip when selected. For instance, the effect item 830 applies a blur video effect, the effect item 835 applies a black and white video effect, and the effect item 840 applies a fade-in/fade-out video effect.

The first stage 805 illustrates the GUI 800 at the beginning of the creation of an audition set. Specifically, a user has selected the effect item 830 and drags the item (e.g., through a drag-and-drop operation) using the cursor 160 towards the media clip 175 in the composite display area 135.

In the second stage 810, the user has finished dragging the effect item 830 from the effects panel 825 to the media clip 175. When the user finishes dragging the effect item 830 onto the media clip 175, the media editing application automatically displays a menu 625 shortly thereafter. The second stage 810 shows the selection of the "Create Stack" option through a click operation using the cursor 160. This selection invokes a command to create an audition set 845 that includes the media clip 175 and a new version of the media clip 175 with the effect of the effect item 830 (i.e., a blur effect) applied to it.

The third stage 815 illustrates the GUI 800 after the creation of the audition set 845 is completed. As shown, the media editing application displays a user selectable UI item 190 in the audition set 845 to visually indicate that the audition set 845 displayed in the composite display area 135 is an audition set. In this example, the media editing application sets the new version of the media clip 175 that includes the blur effect as the active pick when creating the audition set 845. Some embodiments define a new data structure for the new version that has a different identifier but the same defining information (i.e., poster frame, source file, in and out points, etc.). Some embodiments also store the blur effect or a reference to the blur effect in the data structure for the newly created media clip.

At the fourth stage 820, a user has selected the UI item 190 (e.g., through a click operation using the cursor 160). As mentioned above, the UI item 190 enables the opening and closing of a selection area that displays the media clips included in the associated audition set. As such, the GUI 800 now displays selection area 192. The selection area 192 displays the media clip 175 and a media clip 850, which is the newly created version of the media clip 175 with the blur effect applied. In this example, the selection area 192 displays a label specifying the name of the media clip displayed at or near the center of the selection area 192. Because the media clip 850 is currently displayed in the center region of the selection area 192, a label displayed above the media clip 850 specifies the name of the media clip 850 as "Clip D—Blur," which is the name of the media clip 175 along with the effect applied in clip 850.

FIG. 8 shows the creation of the audition set 845 by dragging and dropping a user selectable effect item from the effects panel 825 onto a media clip in the composite display area 135. Some embodiments may provide other ways for the user to create the audition set 845. For instance, some embodiments allow the user to select the media clip 175 in the composite display area 135 and invoke the creation of the audition set 845 using a hotkey, a keystroke, a series of keystrokes, a combination of keystrokes, or any other appropriate way of invoking a command.

Moreover, FIG. 8 shows the effects panel 825 with a user selectable "Video" tab and a user selectable "Audio" tab for displaying an effects panel for video effects and an effects panel for audio effect, respectively. However, some embodiments of the effects panel 825 include additional and/or different user selectable tabs for displaying different effects panels for different types of effects. In addition, while the effects included in the effects panel for the "Video" include a particular set of video effects, these example effects are only provided for purposes of explanation; one of ordinary skill in the art would recognize that any number of different video effects can be included in the "Video" effects panel, such as a Gaussian blur effect, a border effect, a direction blur effect, etc.

Figure 9:
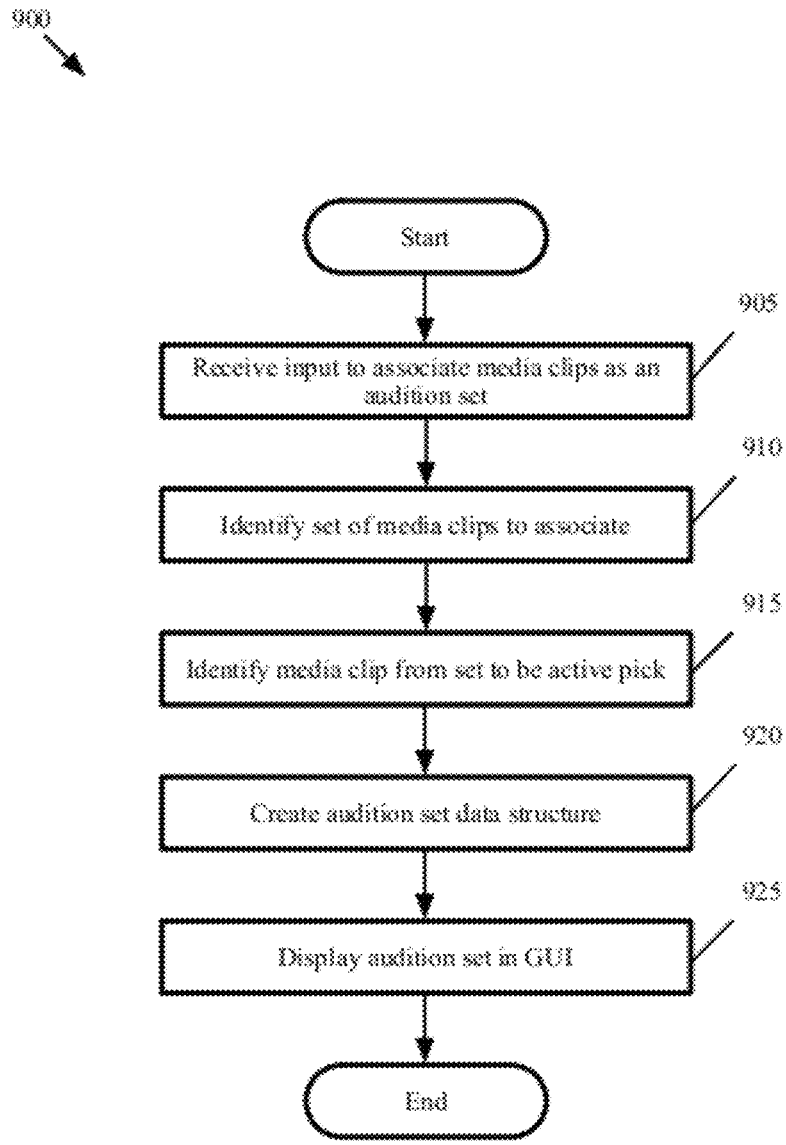
FIG. 9 conceptually illustrates a process for creating an audition set in some embodiments.

The above figures illustrated various different ways to create a new audition set. FIG. 9 conceptually illustrates a process 900 of some embodiments for creating a new audition set. The process 900 begins by receiving (at 905) input to associate media clips as an audition set. This input may be received from a selection of a drop-down menu in some embodiments, as shown in FIG. 1 or FIG. 7. The selection input may be from a cursor controller (e.g., a click input), through a touchscreen (e.g., touching a menu option), from a keyboard, etc. Some embodiments receive the input from a pop-up menu that appears automatically when a media clip or an effect is dragged and dropped (e.g., with a cursor controller, through a touchscreen, etc.) onto another media clip, as shown in FIG. 6 or FIG. 8. In some embodiments, the input consists of a user dragging and dropping media clips within the media library, as shown below by reference to FIG. 27.

The process then identifies (at 910) a set of media clips to associate as the audition set. The media clips may include video clips (as in FIGS. 1, 6, etc.) as well as other clips such as audio clips, effects clips, or sequences of video clips, which are described in further detail below. Some embodiments associate all selected clips at the time the user input is received. In some cases, when a clip is dragged onto another clip, these two clips are associated. Some situations (e.g., as shown in FIG. 7) associate a media clip with a duplicate of itself as an audition set.

Next, the process 900 identifies (at 915) a media clip from the audition set to set as the active pick. As mentioned above, the active pick of an audition set is the media clip that interacts with the composite presentation. As examples, when a user adds an audition set to the composite presentation, the media editing application adds the active pick to the composite project. When edits (e.g., trim edits) are performed on the audition set, the editing application applies the edits to the active pick. When one of the media clips being associated is already in the composite display area and the rest are clips from the media library, some embodiments automatically set the clip in the composite display area as the active pick. When the creation of the audition set involves the creation of a duplicate of a clip (or of a portion of a clip, or a duplicate with an effect), some embodiments set the new clip as the active pick while other embodiments set the original clip as the active pick.

The process then creates (at 920) a data structure for the audition set. FIG. 5 illustrates an example of such a data structure 500. As described above, the data structure includes at least a reference to each media clip in the data structure and an indication of the active pick. Some embodiments include more information about the audition set, such as its location in the timeline of the composite display area.

The process also displays (at 925) the audition set in the GUI. In the examples shown in the figures above, the media editing application displays an indicator within the media clip in the composite display area to indicate that the media clip is the active pick of an audition set. In some embodiments, as shown below by reference to FIG. 27, when a user associates clips in the media library as an audition set, the clips are displayed as a stack with an audition set indicator. After creating the data structure and displaying the audition set, the process ends.

B. Adding a Clip to an Audition Set

Figure 10:
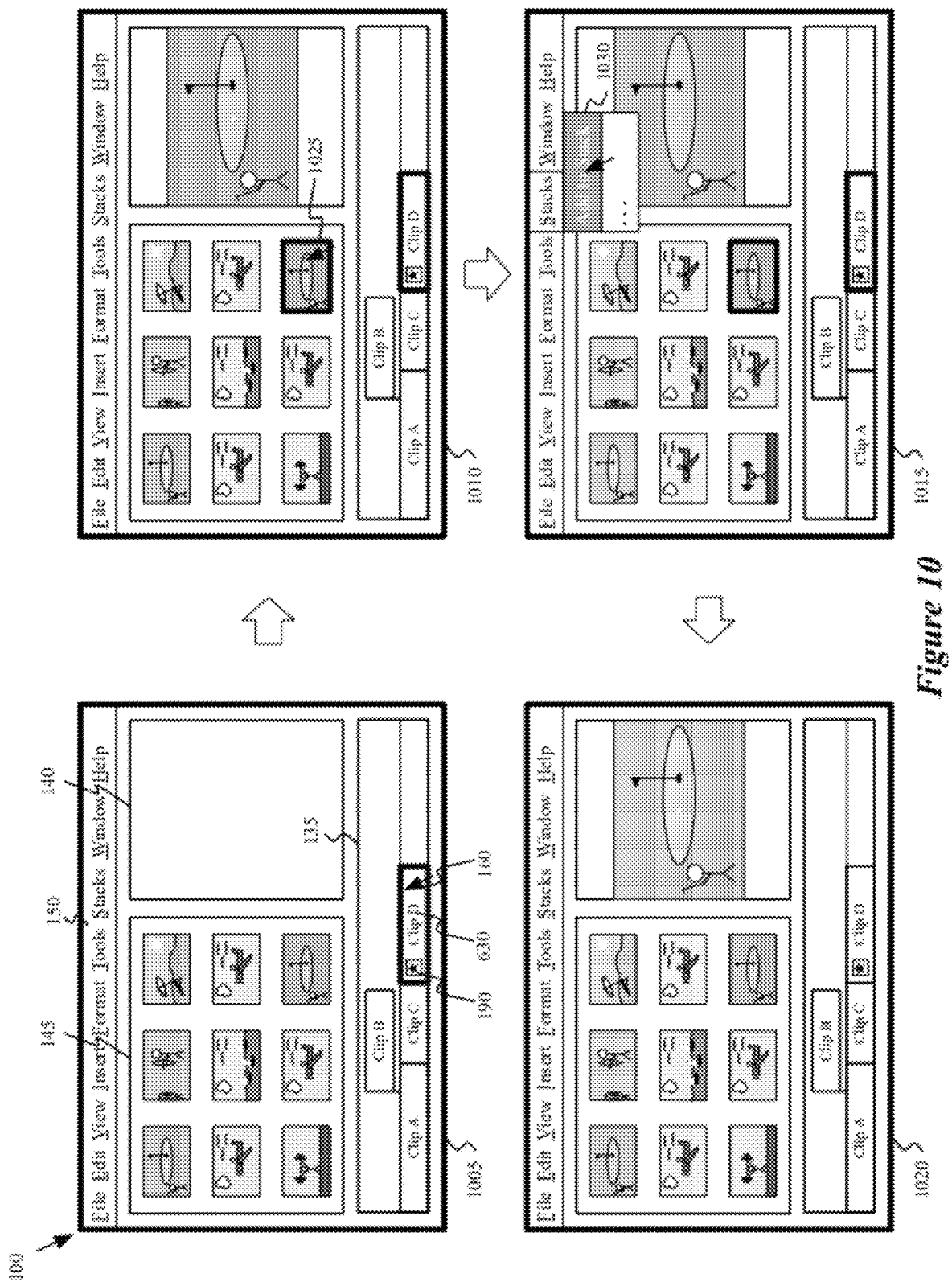
FIG. 10 illustrates adding a media clip to an audition set using the GUI of FIG. 1 according to some embodiments of the invention.

Once an audition set is created, users can add additional media clips to the audition set. FIG. 10 illustrates the addition of a media clip to an audition set using the GUI 100 of some embodiments. In particular, this figure illustrates the GUI 100 at four different stages 1005-1020 that show the addition of a media clip to an audition set displayed in the composite display area 135 of some embodiments. The GUI 100 in this figure continues from the last stage 620 illustrated in FIG. 6, at which point an audition set 630 is created. The first stage 1005 shows the selection of the audition set 630, displayed in the composite display area 135, through a cursor control operation using the cursor 160.

The second stage 1010 of the GUI 100 shows a selection of a media clip 1025 in the media library 145 through a click operation (e.g., a control-cursor-click operation) using the cursor 160. When the user selects media clip 1025, the preview display area 140 displays the thumbnail image that represents the media clip 1025. In some embodiments, such a selection of a media clip from the media library does not affect the preview display area.

At the third stage 1015, the GUI 100 displays a menu 1030 that includes a user selectable "Add to Stack" option and other options (not shown). In this example, the user selectable "Add to Stack" option invokes an operation to add a selected media clip(s) to a selected audition set (the media clip 1025 and the audition set 630 in this example). In some embodiments, the user invokes menu 1030 by selecting the "Stacks" option in the menu bar 150 through a click operation (e.g., cursor click operation, touch operation, etc.). Other embodiments provide other ways to invoke the menu 1030. For instance, some embodiments allow the user to invoke the menu 1030 using a hotkey, a keystroke, a series of keystrokes, a combination of keystrokes, or any other appropriate method to invoke a menu.

The fourth stage 1020 shows the GUI 100 after the completion of the addition operation. As shown, the display of the audition set 630 in the composite display area remains unchanged. The audition set 630 still displays the user selectable UI item 190 to visually indicate that the media clip is an audition set. However, the media editing application modifies the data structure for the audition set 630 to include the media clip 1025.

Figure 11:
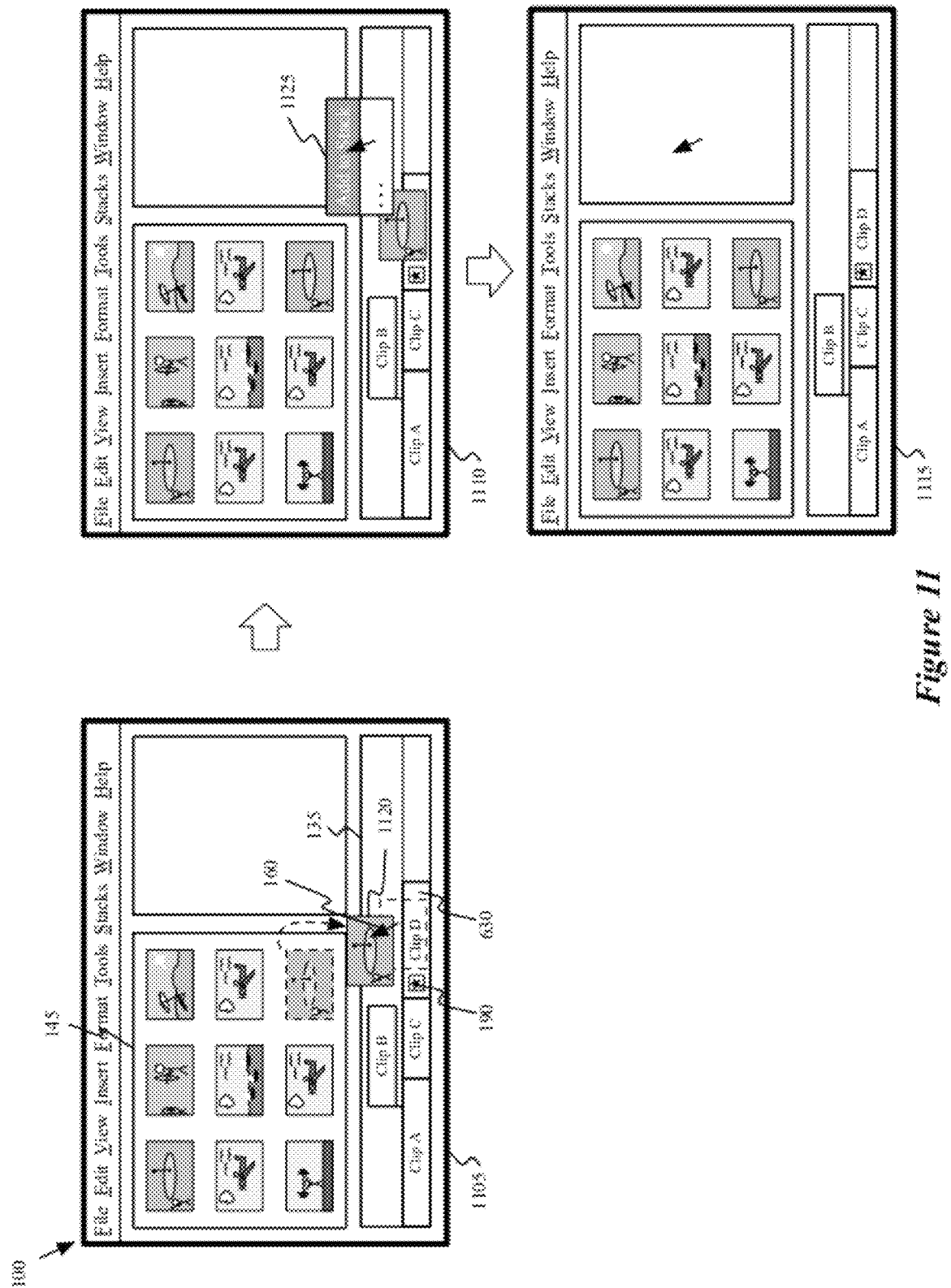
FIG. 11 illustrates adding a media clip to an audition set using the GUI of FIG. 1 according to some embodiments of the invention.

FIG. 11 illustrates an alternative method of adding an item to an audition set using the GUI 100 of some embodiments. Specifically, FIG. 11 illustrates the GUI 100 at three different stages 1105-1115 that show the addition of a media clip to an audition set displayed in the composite display area 135 according to some embodiments. Similar to FIG. 10, the GUI 100 in this figure continues from the last stage 620 of FIG. 6. The first stage 1105 of the GUI 100 shows the selection and dragging of media clip 1120 (e.g., through a drag-and-drop operation) from the media library 145 towards the audition set 630 in the composite display area 135, as indicated by a dotted arrow.

The second stage 1110 shows the GUI 100 after the media clip 1120 has been dragged and dropped on top of the audition set 630. At this stage, the GUI 100 also displays a menu 1125. When the user finishes dragging the media clip 1120 into the composite display area 135, the media editing application automatically displays a menu 1125 shortly thereafter. As shown, the menu 1125 includes a user selectable "Add to Stack" option and other user selectable options (not shown). Different embodiments of the menu 1125 may include different numbers of different user selectable options for performing different functions. In this example, the "Add to Stack" option invokes a command to add the media clip(s) that was selected and dragged into the composite display area 135 (the media clip 1120 in this example) and to the audition set in the composite display area 135 on which the former was dragged (the audition set 630 in this example). The second stage 1110 also illustrates the selection of the "Add to Stack" option through a click operation using the cursor 160.

The third stage 1115 shows the GUI 100 after the completion of the addition operation. As shown, the display of the audition set 630 in the composite display area remains unchanged. The audition set 630 still displays the user selectable UI item 190 to visually indicate that the media clip is an audition set. However, the media editing application modifies the data structure for the audition set 630 to include the media clip 1120.

Figure 13:
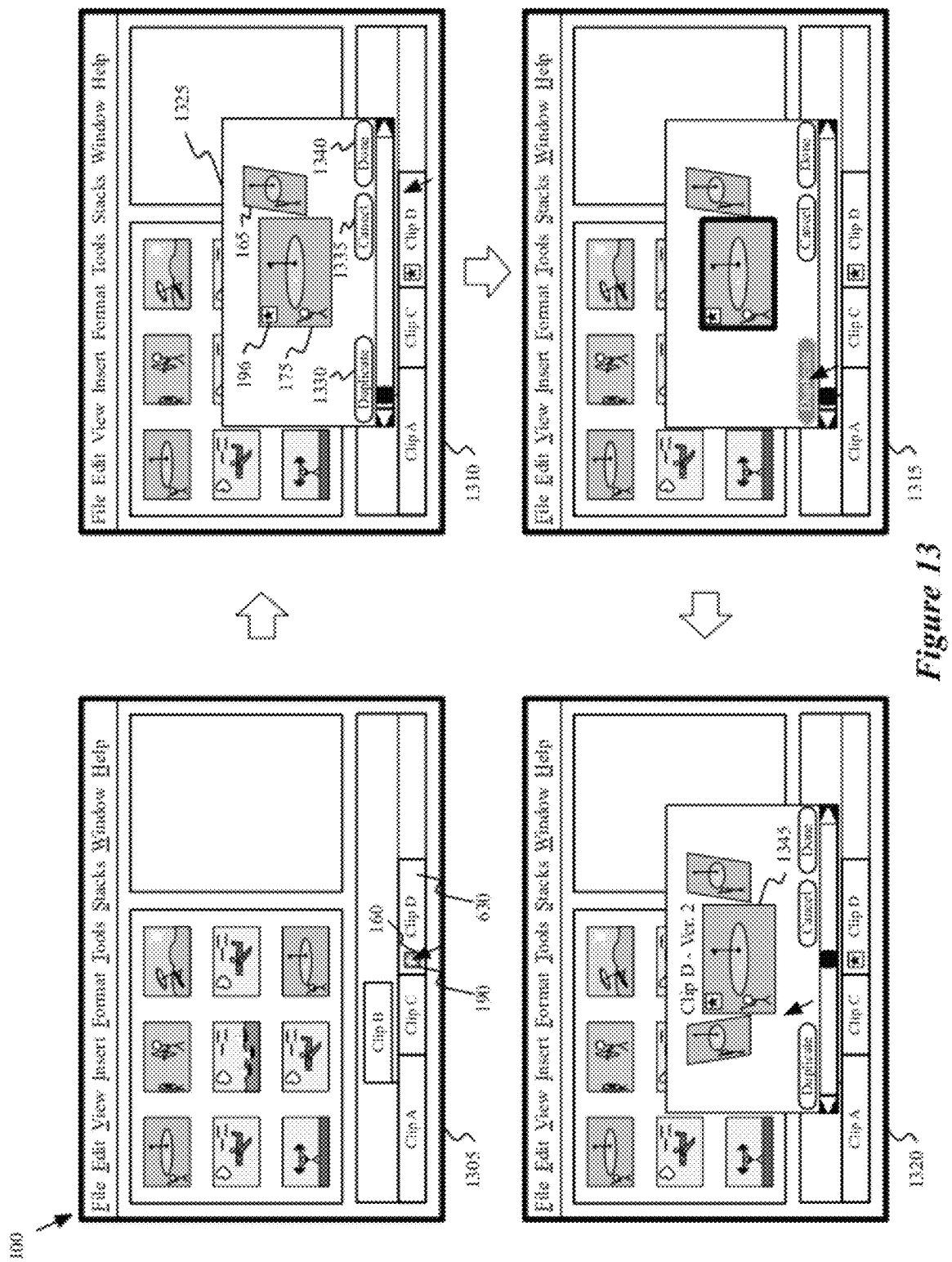
FIG. 13 illustrates adding a media clip to an audition set using the GUI of FIG. 1 according to some embodiments of the invention.
Figure 14:
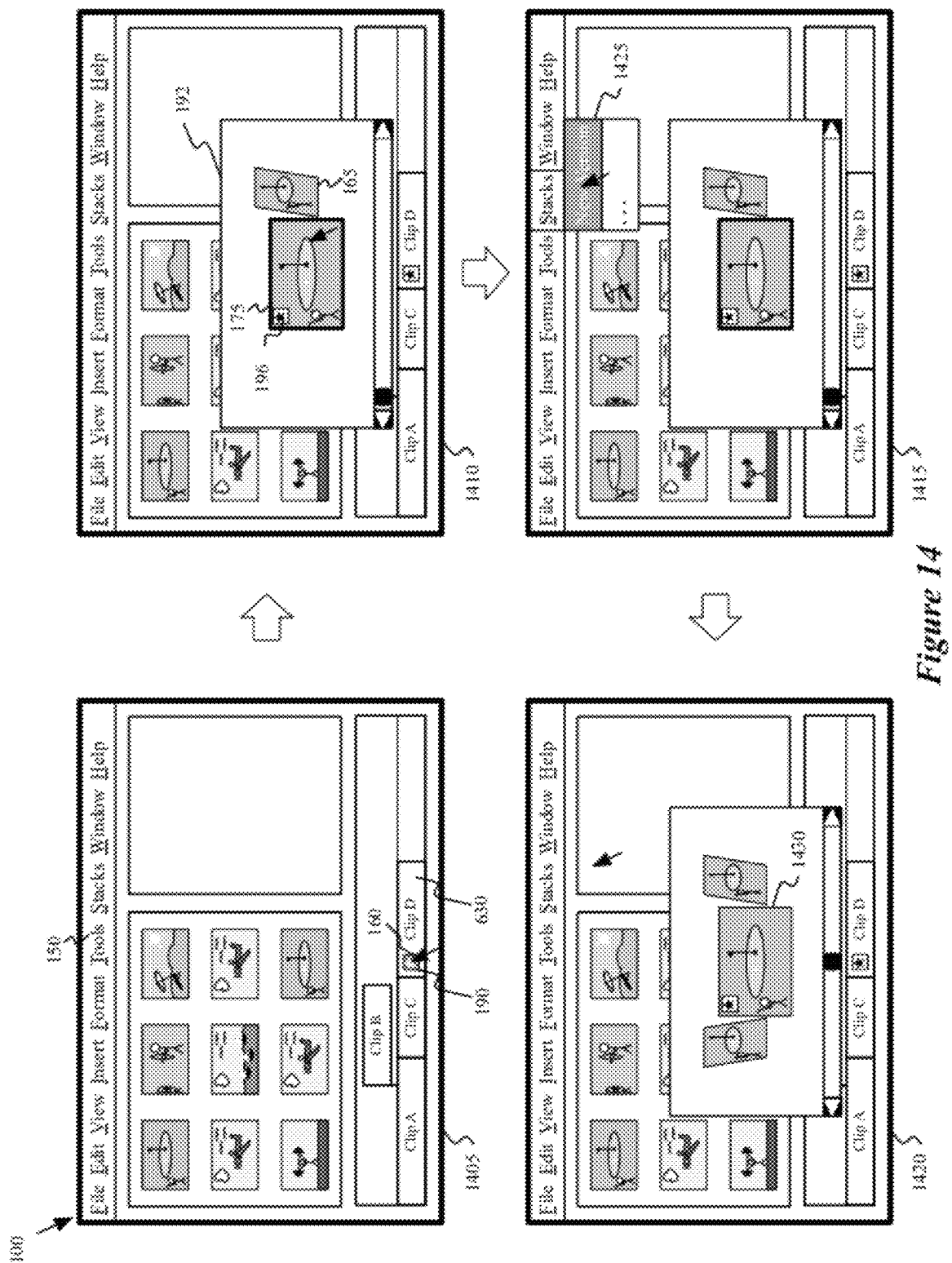
FIG. 14 illustrates adding a media clip to an audition set using the GUI of FIG. 1 according to some embodiments of the invention.

FIGS. 10 and 11 illustrate two different ways to add a media clip to an audition set through the composite display area 135. Other embodiments allow a media clip to be added to an audition set through other elements of the GUI 100 of some embodiments. For example, the following FIGS. 12-14 illustrates several different ways to add a media clip to an audition set through the selection area 192.

Figure 12:
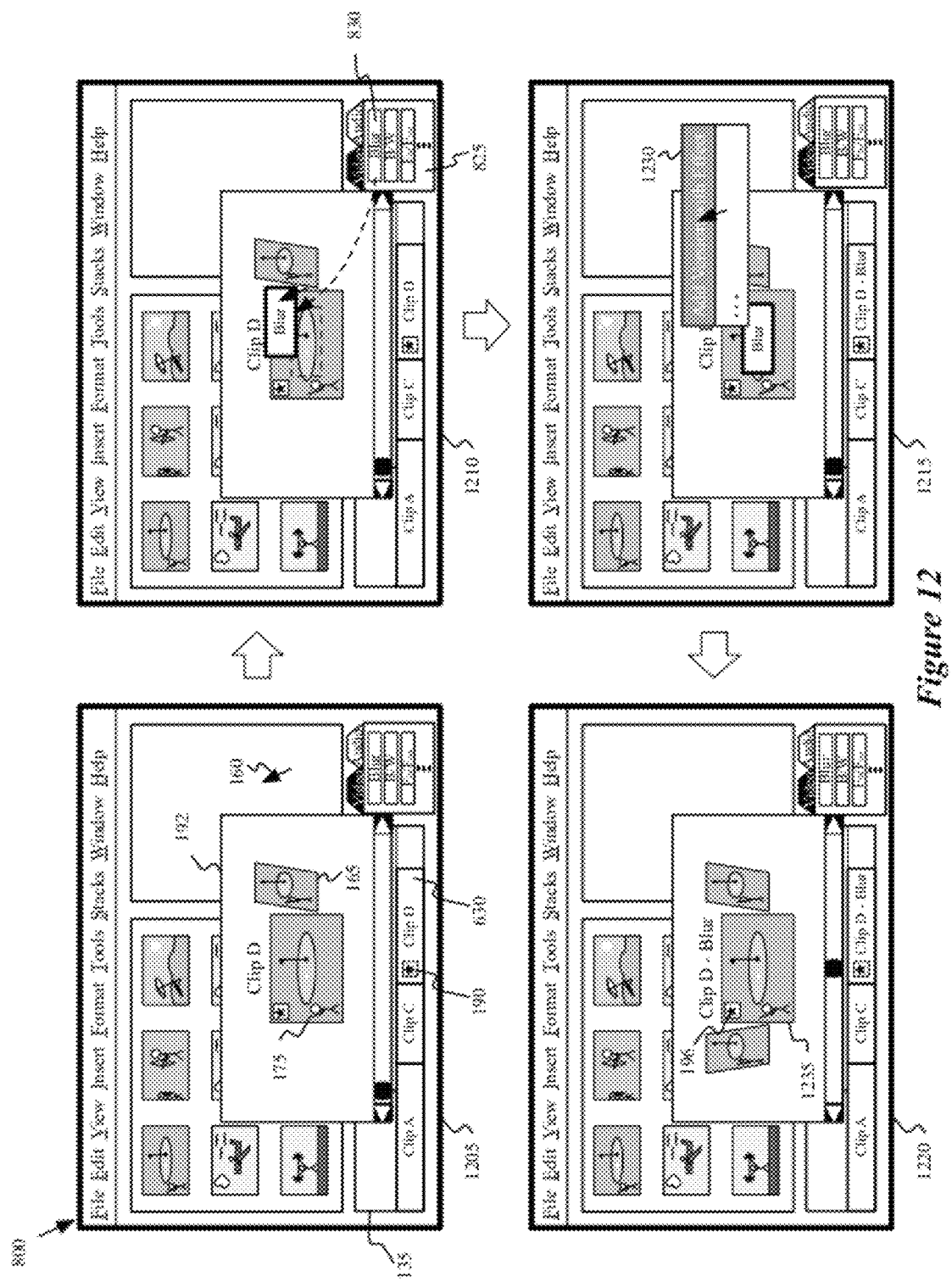
FIG. 12 illustrates adding a media clip to an audition set using a GUI of a FIG. 8 according to some embodiments of the invention.

FIG. 12 illustrates another method of adding a media clip to an audition set using the GUI 800 of a media editing application of some embodiments. This figure illustrates the GUI 800 at four different stages 1205-1220 of the addition operation. In this example, the GUI 800 includes the audition set 630 in the composite display area 135. The audition set 630 includes the media clips 165 and 175, as shown in FIG. 6.

At the first stage 1205, the GUI 800 displays the selection area 192. The selection area 192 may have been invoked using methods such as performing a click operation (e.g., cursor click operation, touch click operation, etc.) on the user selectable UI item 190, a hotkey, a keystroke, a series of keystrokes, a combination or keystrokes, etc., as described above. As shown, the selection area 192 displays the media clips 175 and 165, which are part of the audition set 630. For this example, the selection area 192 displays a label that specifies the name of the media clip displayed at or near the center of the selection area 192. As the selection area currently displays media clip 175 in this center region at this stage, a label that specifies the name of the media clip 175, "Clip D," is displayed above the media clip 175 in the selection area 192.

The second stage 1210 of the GUI 800 illustrates the selection and dragging of user selectable effect item 830 from the effects panel 825 (e.g., through a drag-and-drop operation) towards the media clip 175 using the cursor 160, as indicated by the dotted arrow. As described previously, the effect item 830 applies a blur effect to a video clip.

The third stage 1215 shows the GUI 800 after the user has finished dragging the effect item 830 onto the media clip 175 displayed in the selection area 192. When the user finishes dragging the effects item 830 onto the media clip 175, the media editing application automatically displays a menu 1230 shortly thereafter in some embodiments. As shown, the menu 1230 includes a user selectable "Add Version with Effect" option along with other user selectable options (not shown). The third stage 1215 also illustrates the selection of the "Add Version with Effect" through a cursor click operation using the cursor 160. This selection invokes a command to add to the audition set a new version of the media clip 175 with the effect item 830 (i.e., a blur effect) applied.

The fourth stage 1220 shows the GUI 800 after the addition of a new media clip 1235. In this stage, the selection area 192 displays the new media clip 1235 at or near its center, the media clip 175 to the left side of the selection area 192, and the media clip 165 on the right side of the selection area 192. In other embodiments, the media clips of the audition set 630 are displayed in the selection area 192 differently. For instance, some of these embodiments display the newly added media clip 1235 at one end (the left or the right) of the other media clips (the media clips 165 and 175 in this example).

Moreover, the media clip 1235 displays the indicator 196 that indicates that the media clip 1235 is the active pick of the audition set 630. As illustrated in this example, the newly added media clip 1235 is automatically set as the active pick of the audition set 630 upon its addition to the audition set 630. In some embodiments, the media editing application does not change the active pick when adding the media clip 1235 is added to the audition set 630. In addition, a label specifying the name of the media clip 1235 is displayed above the media clip 1235 in the selection area 192. Similar to the naming convention described above by reference to FIG. 8, the name used for the new media clip 1235, "Clip D—Blur," is the name of the effect (i.e., a blur effect) appended to the name of the media clip 175.

Although FIG. 12 shows a blur effect applied to the media clip 175 of the audition set 630 through the selection area 192, one of ordinary skill will realize that this figure merely illustrates one example and any other effect can be applied to any media clip of the audition set 630 using the same or similar technique illustrated by FIG. 12.

FIG. 13 illustrates another addition of a media clip to an audition set using the GUI 100 of some embodiments. This figure illustrates the GUI 100 at four different stages 1305-1320 that show the addition of a media clip to an audition set through a selection area 1325 of some embodiments. For this example, the GUI 100 continues from the last stage 620 illustrated in FIG. 6, at which the audition set 630 is created. The first stage 1305 of the GUI 100 illustrates the selection of user selectable UI item 190 through a click operation using the cursor 160, which causes a change in the appearance of the UI item 190.

The second stage 1310 illustrates the GUI 100 after the selection of the UI item 190. The GUI 100 now displays a selection area 1325 that is similar to the selection area 192 except that the selection area 1325 includes user selectable UI items 1330-1340. That is, the selection area 1325 displays an active pick 175 (indicated by the indicator 196) and a candidate media clip 165. In this example, the user selectable UI item 1330 (e.g., "Duplicate" button 1330) invokes the addition of a new version (i.e., duplicate) of a selected media clip displayed in the selection area 1325, the user selectable UI item 1335 (e.g., "Cancel" button 1335) cancels any operations performed in the selection area 1325, and the user selectable UI item 1340 (e.g., "Done" button 1340) saves any operations performed in the selection area 1325.

The third stage 1315 illustrates the GUI 100 at the start of the duplicate media clip addition operation. As shown, the user selects the user selectable UI item 1330 ("Duplicate") through a click operation using the cursor 160. Some embodiments allow the user to invoke the operation using other methods. For instance, in some such embodiments, the user can invoke the duplication operation using a hotkey, a keystroke, a series of keystrokes, or a combination of keystrokes. Other methods are also possible.

The fourth stage 1320 shows the GUI 100 after the completion of the addition operation. In this example, the addition operation adds a new media clip 1345 to the audition set 630 and displays the new clip in the selection area 1325. The new media clip 1345 has the same parameters (i.e., source file, in and out points, poster frame, etc.) as the media clip 175. As shown, the media editing application displays the newly created duplicate media clip 1345 in the middle of the selection area 1325, and the media clip 175 on the left side of the selection area 1325. The GUI adjusts the scroll bar indicator to the middle of the scroll bar accordingly.

In addition, the media editing application sets the new media clip 1345 as the active pick for the audition set 630, as shown by the indicator 196 displayed in representation of the media clip 1345. However, different embodiments handle the addition of a duplicate media clip to an audition set differently. For example, some embodiments designate the new media clip as the active pick but move and display the previously centered media clip to the right side of the selection area. Other embodiments may not change the active pick of the audition set, and display the duplicated media clip on the left side of the selection area.

FIG. 14 illustrates the addition of a media clip to an audition set using the GUI 100 according to some embodiments of the invention. Like FIG. 13, FIG. 14 illustrates the addition of a new version of a media clip to the audition set. This figure shows the GUI 100 at four different stages 1405-1420 that show the addition of a media clip to an audition set through the selection area 192. In this example, the GUI 100 continues from the last stage 620 shown in FIG. 6, at which the audition set 630 is created. The first stage 1405 of the GUI 100 is the same as the first stage 1305, described above.

The second stage 1410 illustrates the GUI 100 after the selection of the UI item 190. The GUI 100 now displays the selection area 192. As shown, the selection area 192 displays the media clips 165 and 175. In addition, the indicator 196 is displayed in the media clip 175 to indicate that the media clip 175 is the active pick of the audition set 630. In addition, this stage illustrates the selection of media clip 175 through a cursor click operation using the cursor 160.

The third stage 1415 shows the GUI 100 displaying a menu 1425 that includes a user selectable "New Version" option in addition to other user selectable options (not shown). The "New Version" option of some embodiments invokes a command to create a new version of a media clip (media clip 175 in this example) selected in the selection area 192 and to add the newly created clip to the audition set shown in the selection area (audition set 630 in this example). In some embodiments, the menu 1425 is invoked by selection of the "Stacks" option in the menu bar 150 through a click operation (e.g., a cursor click operation, touch click operation, etc.). However, some embodiments provide other ways to invoke the menu 1425. For example, some such embodiments allow the user to invoke the menu 1425 using a hotkey, a keystroke, a series of keystrokes, a combination of keystrokes, or any other appropriate method to invoke a menu. The third stage 1415 shows the selection of the "New Version" option through a click operation using the cursor 160.

The fourth stage 1420 illustrates the GUI 100 after the addition of a media clip 1430, which is a new version of the media clip 175, to the audition set 630. As shown, the GUI 100 displays the new media clip 1430 at or near the center of the selection area 192, the media clip 175 on the left side of the selection area 192, and the media clip 165 on the right side of the selection area 192. Also, the media editing application displays indicator 196 on the media clip 1430 to indicate that the new media clip is now the active pick of the audition set 630. As mentioned above, when a media clip is added to an audition set, some embodiments do not change the active pick to the newly added media clip.

Figure 15:
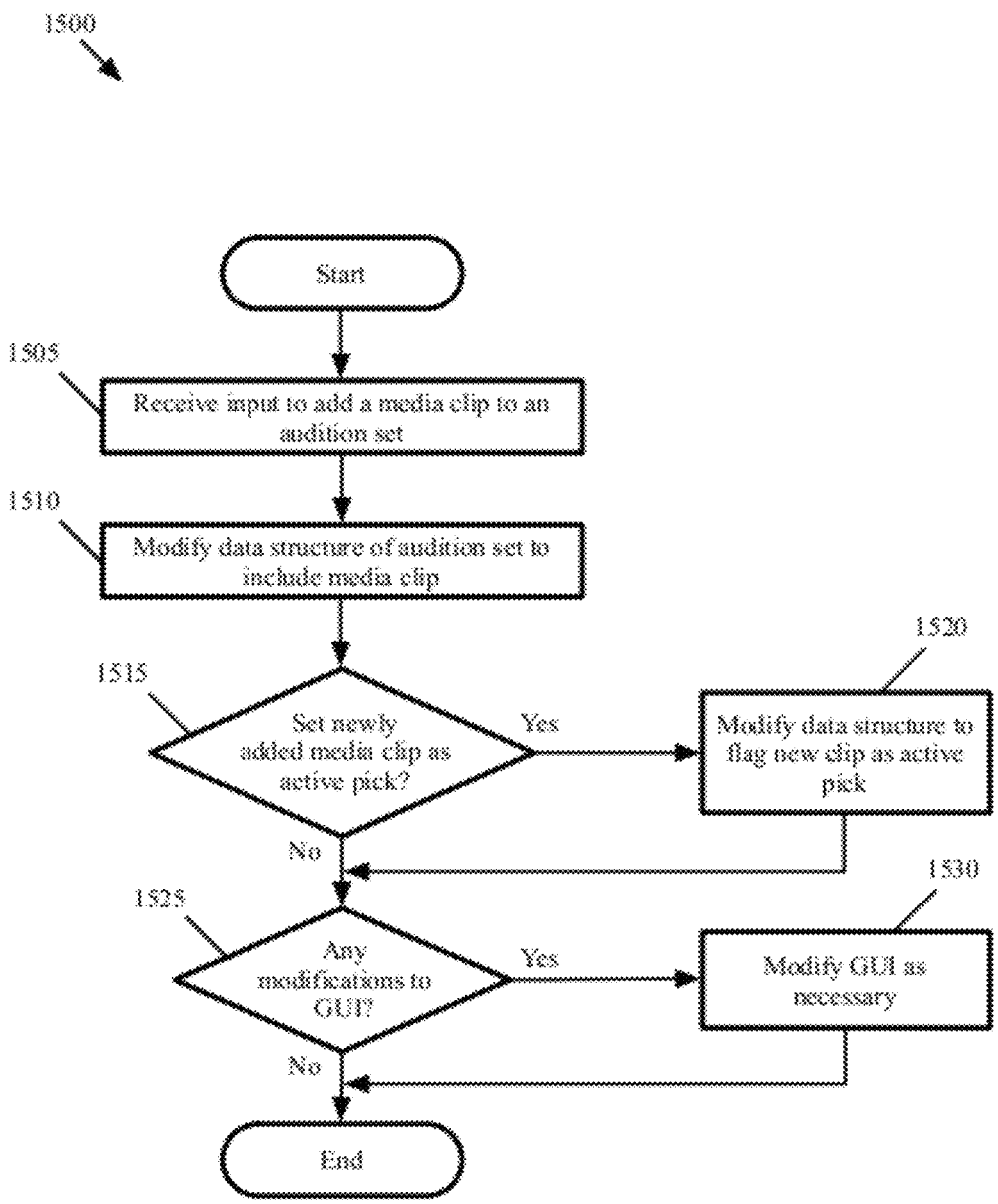
FIG. 15 conceptually illustrates a process for adding a media clip to an audition set in some embodiments.

The above figures illustrated a variety of different ways to add a media clip to an already-created audition set. FIG. 15 conceptually illustrates a process 1500 of some embodiments for adding a media clip to an audition set. The process 1500 begins by receiving (at 1505) input to add a media clip to an audition set. As illustrated in the various figures above, this input may be received in a variety of different ways. For instance, the input may be received through a selection of an item in a drop-down menu (e.g., as shown in FIG. 10 or FIG. 14), a selection of an item in a pop-up menu that appears automatically as a result of a drag-and-drop operation (e.g., as shown in FIG. 11 or 12), a selection of a UI button (e.g., as shown in FIG. 13), or other user input. The selection input may be received through a cursor controller (e.g., as click input or drag-and-drop input followed by click input), through a touchscreen (e.g., touching a menu option or dragging and dropping an item followed by touching a menu option), from a keyboard, etc.

The media clip added to the set may be any sort of media clip in some embodiments. While the examples above show video clips (that may include effects), some embodiments allow the user to create a heterogeneous audition set that includes audio clips, sequences of media clips, effects clips, still images, text, etc.

The process then modifies (at 1510) the data structure of the audition set to include the media clip. In some embodiments, this simply involves adding a reference to a data structure of the media clip that already exists. Some embodiments write the information describing the media clip into the data structure for the audition set. Additionally, in some cases, a new media clip is created and thus a new data structure for the media clip must also be created (e.g., in the example shown in FIG. 14).

Next, the process determines (at 1515) whether to set the newly added media clip as the active pick of the set. In some embodiments, when an already-existing media clip is added to an already-existing audition set, the audition set retains its current active pick. On the other hand, when a new version of a media clip is added to an already-existing audition set (e.g., a portion of the clip, the clip with an effect applied, a duplicate of the clip), some embodiments set the new version as the active pick for the audition set. When the newly added media clip should be the new active pick for the audition set, the process modifies (at 1520) the data structure for the audition set to set the newly added media clip as the active pick. In some embodiments, this simply involves modifying a reference to refer to one media clip instead of another.

The process then determines (at 1525) whether any modifications to the GUI are required by the change. When modifications are required, the process modifies (at 1530) the GUI as necessary. When the audition set is in the composite display area and the addition does not change the active pick, some embodiments do not require any GUI modifications. However, when displaying the selection area of some embodiments, a new media clip appears in the selection area. The process may also need to move the active pick indicator from one clip to another. The process then ends.

C. Removal of a Clip from an Audition Set

The FIGS. 10-14 illustrate a variety of different ways to add a media clip to an audition set. In addition, some embodiments enable the user to remove one or more media clips from an audition set. The following FIGS. 16 and 17 will describe examples of some such embodiments.

Figure 16:
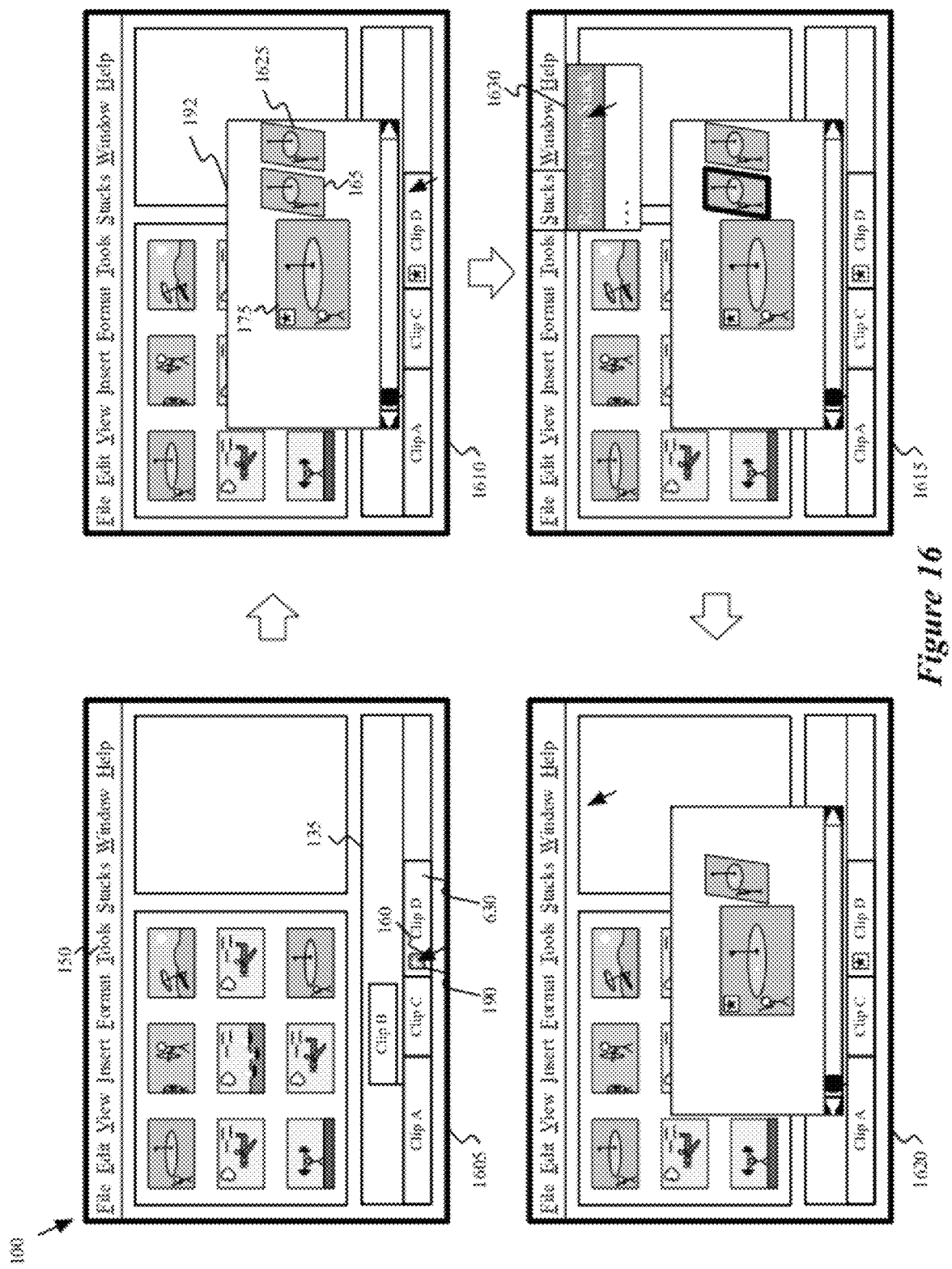
FIG. 16 illustrates removing a media clip from an audition set using the GUI of FIG. 1 according to some embodiments of the invention.

FIG. 16 illustrates the removal of a media clip from an audition set using the GUI 100 of some embodiments. This figure illustrates the GUI 100 at four different stages 1605-1620 that illustrate the removal of a media clip from an audition set displayed in the composite display area 135 of some embodiments. In this example, the GUI 100 displays the audition set 185, which was created as illustrated in FIG. 6, in the composite display area 135. However, for purposes of explanation of the removal operation, the audition set 185 represents a grouping of three media clips instead of two. The first stage 1605 of the GUI 100 illustrates the selection of a user selectable UI item 190 through a click operation using the cursor 160, as indicated by a change in the appearance of the UI item 190.

The second stage 1610 illustrates the GUI 100 after the selection of the UI item 190. The GUI now displays the selection area 192 displaying an audition set 185. As mentioned, the audition set 185 in this example represents a logical grouping of three media clips: clips 175, 165, and 1625. The media clip 175 is the active pick for this audition set.

At the third stage 1615, the media clip 165 displayed in the selection area 192 has been selected (e.g., through a click operation such as a cursor click operation, a touch click operation, etc.). The GUI 100 indicates this selection through the bolded border of the thumbnail representing media clip 165. The GUI 100 also displays a menu 1630 that includes a user selectable "Remove from Stack" option and other options (not shown) as well. The user selectable "Remove from Stack" option invokes an operation to remove one or more selected media clips (the single media clip 165 in this example) from the audition set displayed in the selection area 192. In some embodiments, the user invokes menu 1630 by selecting the "Stacks" option in the menu bar 150 through a click operation. Some embodiments provide other ways to invoke the menu 1630. For example, some such embodiments allow the user to invoke the menu 1630 using a hotkey, a keystroke, a series of keystrokes, a combination of keystrokes, or any other appropriate method to invoke a menu.

The fourth stage 1620 illustrates the GUI 100 after the media editing application removes the media clip 165 from the audition set 185. At this stage, the audition set 185 represents a logical grouping of only the media clips 175 and 1625. As shown, the audition set 185 displayed in the composite display area 135 still displays the user selectable UI item 190 to visually indicate that the media clip is an audition set, as more than one media clip remains. When a user removes all but one media clip from an audition set, the audition set no longer exists as an associated set of media clips, and media editing application removes the data structure for the audition set, leaving only a standard media clip data structure.

Figure 17:
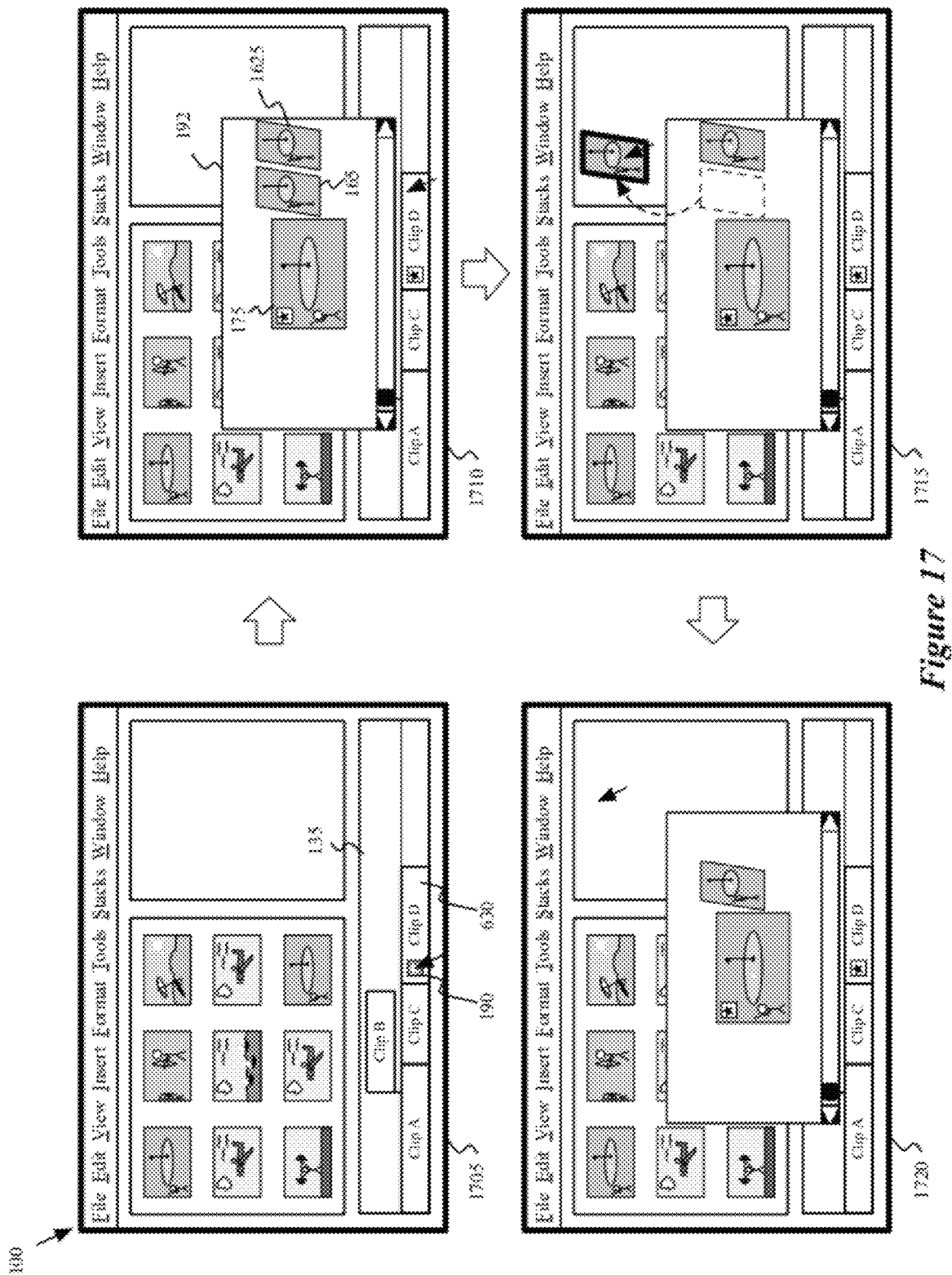
FIG. 17 illustrates removing a media clip from an audition set using the GUI of FIG. 1 according to some embodiments of the invention.

FIG. 17 illustrates another audition set removal operation using the GUI 100 of some embodiments. FIG. 17 illustrates the GUI 100 at four different stages 1705-1720 that also show the removal from an audition set displayed in the composite display area 135 of some embodiments. Similar to FIG. 16, the GUI 100 displays the audition set 185, which was created as illustrated in FIG. 6, in the composite display area 135. The first and second stages 1705 and 1710 of the GUI 100 are the same as the first and second stages 1605 and 1610, respectively, described above by reference to FIG. 16. In these stages, the user selects item 190 in order to open selection area 192 with the three media clips 175, 165, and 1625.

The third stage 1715 of the GUI 100 shows the user interaction resulting in the removal operation. Like the third stage 1615 illustrated in FIG. 16, the media clip 165 is also selected for removal in this example. As shown at this stage, the user selects and drags media clip 165 (e.g., through a drag-and-drop operation) to an area in the GUI 100 outside of the selection area 192. While this stage illustrates the media clip 165 dragged to a particular area outside of the selection area 192, some embodiments allow the user to drag the media clip 165 to any area outside of the selection area 192 to invoke its removal from the audition set 185 in some embodiments.

At the fourth stage 1720, the media editing application has removed the media clip 165 from the audition set 185. That is, the media clip 165 is no longer included in the logical grouping represented by the audition set 185. Accordingly, at the fourth stage 1720, the GUI 100 no longer displays the media clip 165 in the selection area 192.

The examples illustrated in FIGS. 16 and 17 show different methods for removing the media clip 165 from the audition set 185. One of ordinary skill in the art will recognize that other media clips in the audition set 185 can be removed in the same or similar fashion. Furthermore, these figures illustrate the removal of a single media clip from an audition set. Some embodiments allow the user to select multiple media clips in the selection area 192 and remove all of the selected media clips from the audition set through a single invocation of a removal operation.

Although not shown in FIGS. 16 and 17, some embodiments allow the removal of the active pick of an audition. Different embodiments handle the removal of the active pick in an audition set differently. For instance, some embodiments designate the next media clip displayed in the selection area 192 as the active pick. Some embodiments randomly select a new media clip from the audition set as the active pick. Other methods for determining the active pick for the audition set are also possible.

Figure 18:
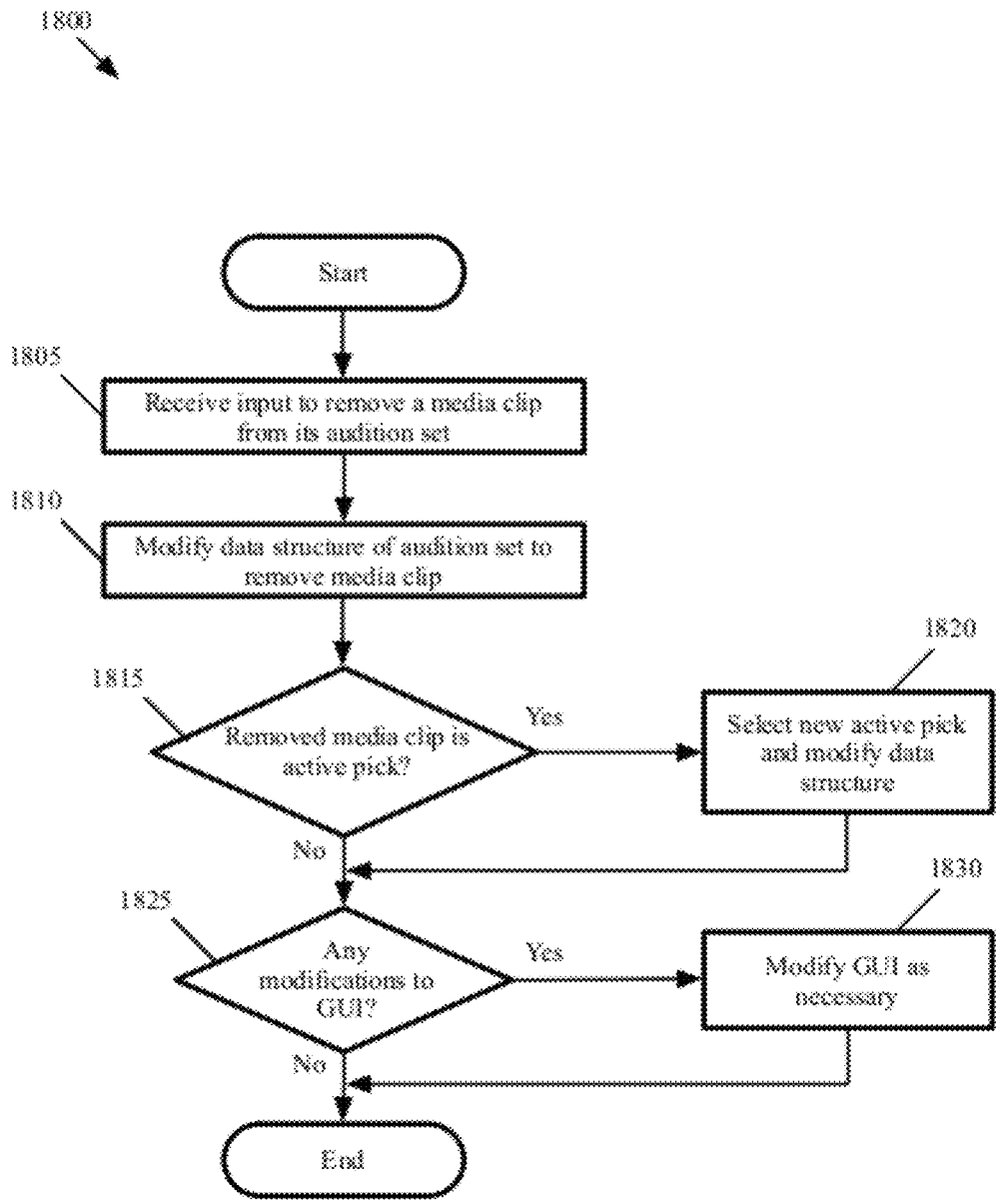
FIG. 18 conceptually illustrates a process for removing a media clip from an audition set in some embodiments.

FIG. 18 conceptually illustrates a process 1800 of some embodiments for removing a media clip from an audition set. As shown, the process 1800 begins by receiving (at 1805) input to remove a media clip from an audition set. As illustrated in the figures above, this input may be received in a variety of different ways. For instance, the input may be received through selection of an item in a menu (e.g., as shown in FIG. 16), a drag-and-drop operation (e.g., as shown in FIG. 17), selection of a UI button, or other user input. The selection input may be received through a cursor controller (e.g., as click input or drag-and-drop input), through a touchscreen (e.g., touching a menu option or dragging and dropping an item), from a keyboard, etc.

The process then modifies (at 1810) the data structure of the audition set to remove the media clip. In some embodiments, this simply involves removing a reference to a data structure for the media clip. When the media clip data is part of the audition set data structure, some embodiments rewrite this information to a new location in the project data as a sole media clip and remove the information from the audition set data structure.

The process then determines (at 1815) whether the removed media clip was the active pick. When this is the case, the process selects (at 1820) a new active pick and modifies the data structure for the audition set to refer to the new active pick. Some embodiments designate a media clip as an active pick based on an order of media clips within the audition set (e.g., the order in which the clips were added to the audition set), designate a random media clip from the audition set, or use other methods.

Next, the process 1800 determines (at 1825) whether any modifications to the GUI are required by the change. When modifications are required, the process modifies (at 1830) the GUI as necessary. When displaying the audition set in the selection area, the media editing application no longer displays the representation of the removed media clip after its removal. In some embodiments, a new media clip is brought to the center of the selection area as well.

D. Creation of Audition Sets with Different Types of Media Clips

The examples described above illustrate different operations (creation, addition, and removal) applied to audition sets composed entirely of video clips. However, as shown in FIG. 4, an audition set may include audio clips, effects clips, sequences, etc., in some embodiments. Moreover, many of the examples described above illustrate the creation of an audition set in the central compositing lane 155 of the composite display area 135. Some embodiments also allow the user to create an audition set in other areas of the composite display area 135, such as an anchor lane of the composite display area 135. The following figures illustrate the creation of sequences involving additional types of media clips and through different areas of the GUI.

Figure 19:
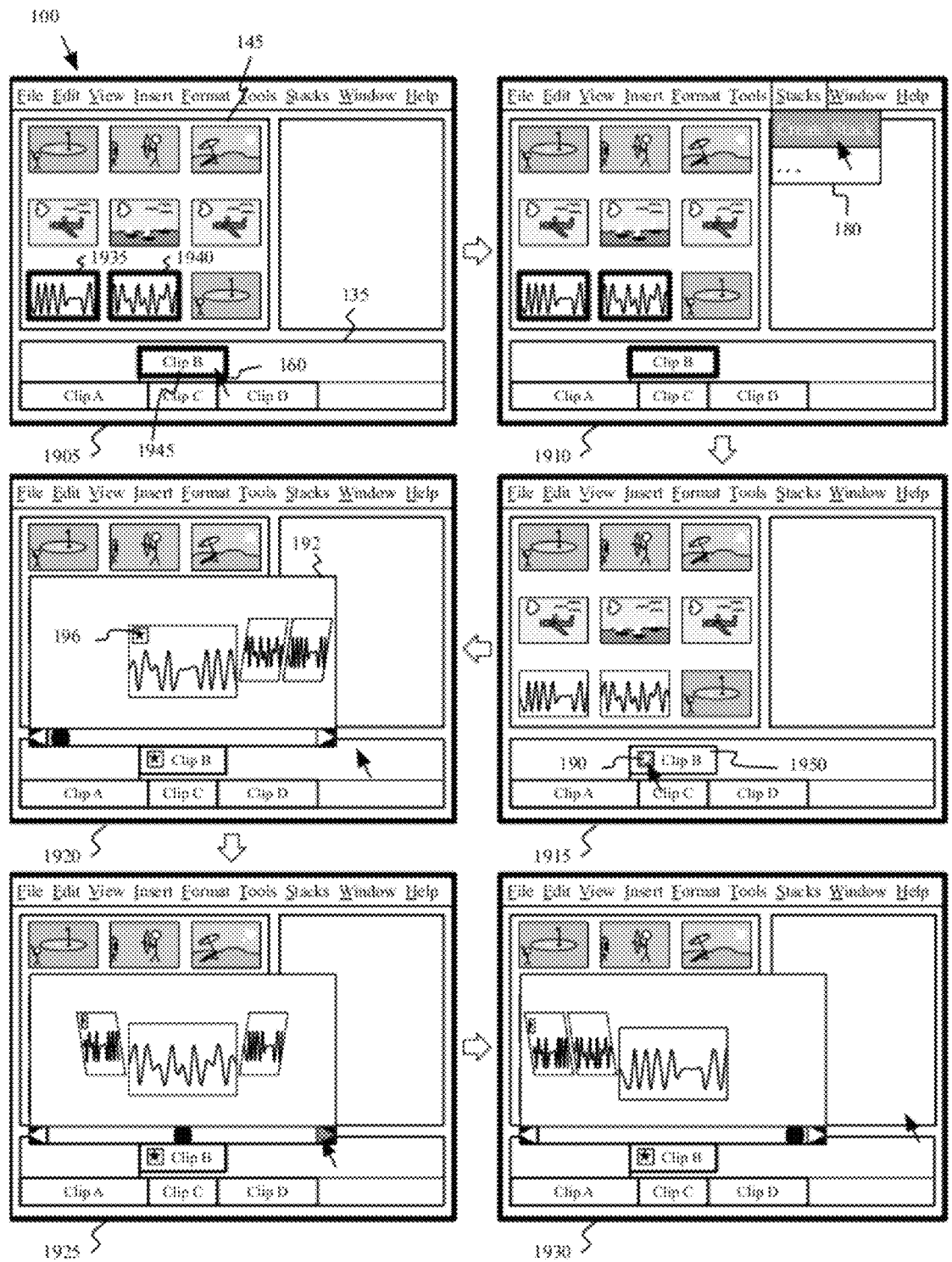
FIG. 19 conceptually illustrates creating an audition set that includes audio clips using the GUI of FIG. 1 according to some embodiments of the invention.

FIG. 19 illustrates the creation of an audition set that includes audio clips in an anchor lane of the composite display area 135 of GUI 100 according to some embodiments. In this figure, the GUI 100 is illustrated at six different stages 1905-1930 that show the creation of an audition set 1950. As shown, the media library 145 includes two audio clips 1935 and 1940, as indicated by the waveforms used for the graphical representation of these clips. In this example, the media clip 1945 displayed in the composite display area 135 is also an audio clip.

The first stage 1905 illustrates the selection of several media clips—specifically, audio clips 1935 and 1940 are selected, as indicated by a bolding of the borders of the thumbnail representations of these audio clips 1935 and 1940. These audio clips have previously been selected (e.g., through click operations such as cursor click operations, touch click operations, etc.). Further, this stage shows the selection of the media clip 1945, also indicated by a bolding of the border of its graphical representation, in the composite display area 135 through a click operation using the cursor 160.

Similar to the second stage 110 described above, the second stage 1910 displays the menu 180. This stage also illustrates the selection of the "Create Stack" option through a cursor click operation using the cursor 160. As mentioned above, the "Create Stack" option of some embodiments invokes the creation of an audition set with the selected media clips. As such, in this example, the selection of the "Create Stack" option causes the media editing application to create an audition set 1950 having the media clips 1935, 1940, and 1945.

The third stage 1915 illustrates the GUI 100 after the creation of the audition set 1950. As shown, the user selectable UI item 190 is displayed on the audition set 1950 to indicate that it is an audition set. This stage also illustrates the selection of this UI item to invoke the display of selection area 192.

The fourth stage 1920 of the GUI 100 displays the selection area 192. As shown, the selection area 192 displays the media clips 1935-1945. As described above by reference to FIG. 1, some embodiments set the selected media clip in the composite display area 135 as the active pick of an audition set upon creation of the audition set. Similarly, in this example, the media editing application sets the media clip 1945 as the active pick of the audition set 1950 because it is the selected media clip in the composite display area 135. Accordingly, the indicator 196 is displayed on the media clips 1945 to indicate that it is the active pick of the audition set 1950.

At the fifth stage 1925, the GUI 100 shows the media clips in the selection area 192 as a user scrolls through the clips in the same or a similar manner as previously described above by reference to FIG. 1. As shown, the user selects the right arrow through a click operation using the cursor 160 in order to scroll through the media clips 1935-1945 from right to left. The sixth stage 1930 illustrates the GUI 100 after all the media clips 1935-1945 have been scrolled through from right to left. As shown, the media clip 1935 is now displayed at or near the middle of the selection area 192.

Figure 20A:
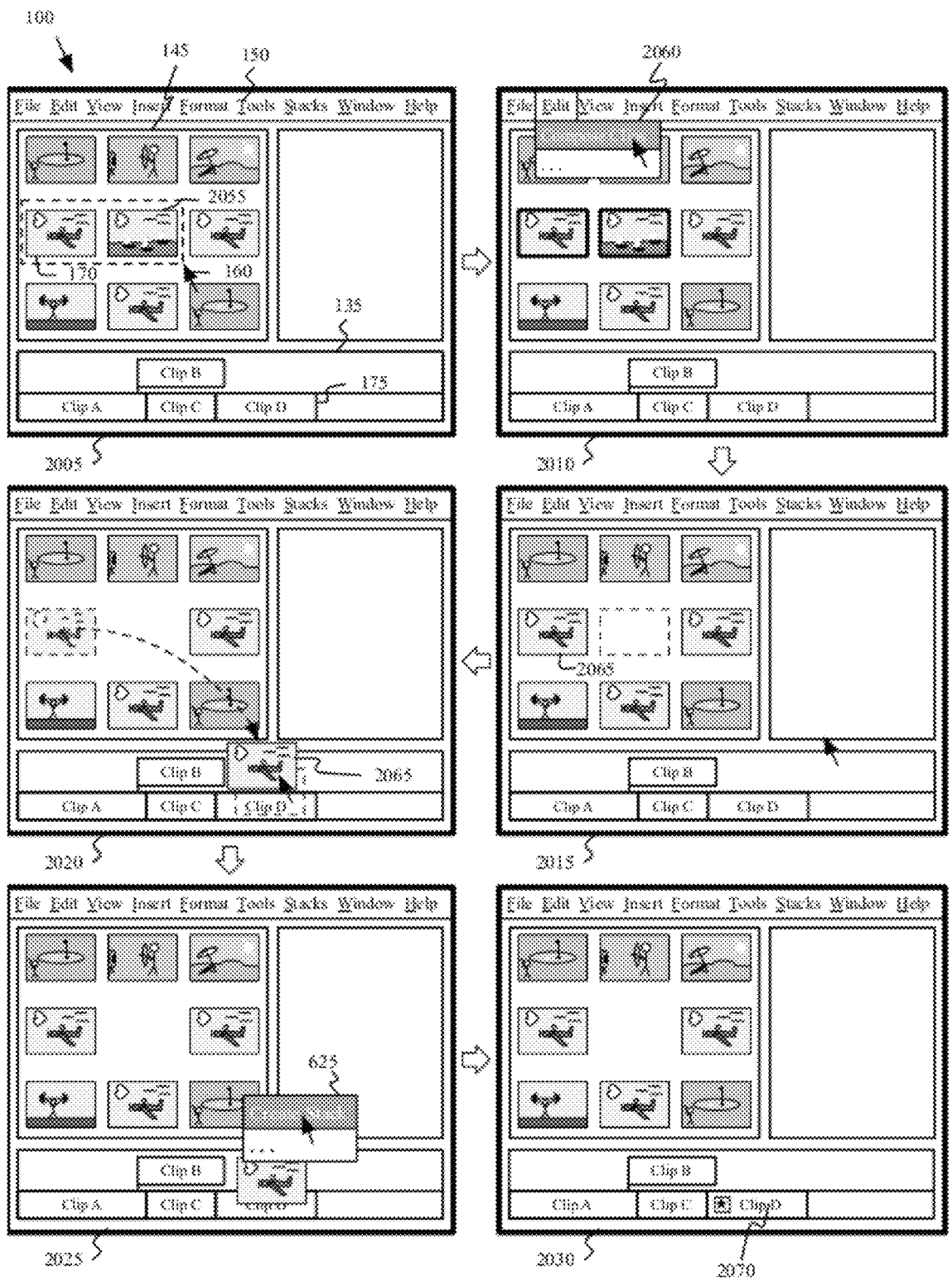
FIGS. 20A and 20B illustrate creating a sequence and creating an audition set that includes the sequence using the GUI of FIG. 1 according to some embodiments of the invention.
Figure 20B:
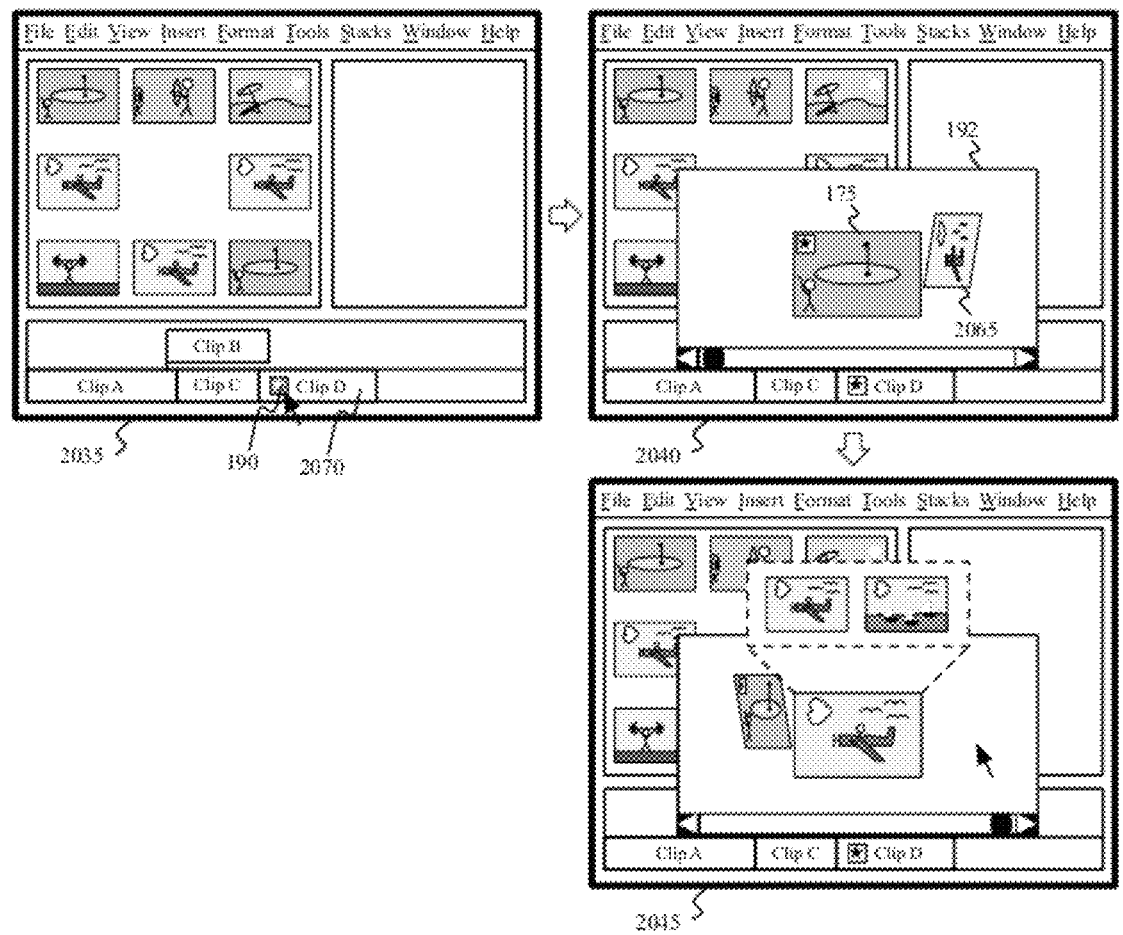

As mentioned above, some embodiments can also include sequences of media clips in an audition set. While the composite display area is used to composite media clips in some embodiments, the media library of some such embodiments can also be used as a secondary area to composite media clips. For example, a user of the media editing application may wish to create sequences of media clips without having to select a particular location in the composite display area in which to place the sequence of media clips. In this way, the user can create sequences of media clips and then add them to the composite display area at a later time. FIGS. 20A and 20B illustrate the creation of a sequence and subsequent creation of an audition set that includes the sequence through the GUI 100. As shown, these figures illustrate the GUI 100 at nine different stages 2005-2045 that show the creation of a sequence and the creation of an audition set that includes the created sequence.

The first stage 2005 of the GUI 100 shows a selection of several media clips. In particular, this stage shows the selection of media clips 170 and 2055 through a selection box operation using the cursor 160, as illustrated by the dotted box enclosing the media clips 170 and 2055. One of ordinary skill in the art will recognize that similar operations may be performed using a touchscreen or other input devices in order to select multiple media clips.

At the second stage 2010, the GUI 100 displays a menu 2060 that includes a user selectable "Compose Clips" option along with other user selectable options (not shown). The "Compose Clips" option invokes the creation of a sequence with selected media clips (the media clips 170 and 2055 in this example). Similar to the menu 180 described above, the menu 2060 of different embodiments may include different numbers of different user selectable options for performing different functions. A user can invoke the menu 2060 of some embodiments by selecting the "Edit" option in the menu bar 150 through a click operation (e.g., a cursor click operation, a touch click operation, etc.). Other embodiments provide other ways to invoke the menu 2060. For example, some such embodiments enable the user to invoke the menu 2060 using a hotkey, a keystroke, a series of keystrokes, a combination of keystrokes, or any other method to invoke a menu. The second stage 2010 illustrates the selection of the "Compose Clips" option through a click operation using the cursor 2060.

The third stage 2015 shows the GUI 100 after the creation of a media clip sequence 2065. Since the media clips 170 and 2055 were selected when the user invoked the sequence creation operation, the media clip sequence 2065 includes these two media clips. Different embodiments specify the order of the media clips in the sequence differently. For instance, some embodiments determine the order based on the position of the media clips in the media library, such as left to right, right to left, top to bottom, bottom to top, etc. Some embodiments determine the order within the sequence based on the order in which the media clips are selected. In this example, the media editing application determines the order of the media clips in the media clip sequence 2065 based on their positions in the media library 145 on a left to right basis. Since the media clip 170 is positioned left of the media clip 2055 in media library 145, the media clip 2055 comes after the media clip 170 in the media clip sequence 2065.

The fourth through sixth stages 2020-2030 illustrate the creation of an audition set 2070 in a similar manner as the creation of the audition set 630 described above by reference to FIG. 6. In these stages 2020-2030, a user selects and drags the media clip sequence 2065 onto the media clip 175 in the composite display area 135 and subsequently selects the "Create Stack" option in the menu 625 that automatically pops up in order to create audition set 2070. In this example, the media editing application sets media clip 175 as the active pick of the audition set 2070 as it is the clip located in the composite display area 135.

The seventh through ninth stages 2035-2045 illustrated in FIG. 20B show the display of the selection area 192 after its invocation through selectable item 190 and scrolling through media clips of the audition set 2070 in a similar fashion as described above by reference to the stages 115-130 of FIG. 1. These stages 2035-2045 illustrate the media clips that are part of the audition set 2070. Specifically, the eighth stage 2040 shows the media clip 175, which is the active pick, and the ninth stage 2045 shows the media clip sequence 2065. As shown, the media editing application displays an expanded view of the media clip sequence in some embodiments that includes thumbnail representations for the media clips that make up the sequence. When the sequence is too large (i.e., has too many clips), some embodiments only display a portion of the media clips that make up the sequence, or shrink the size of the thumbnails used to represent the media clips in the sequence.

Figure 21:
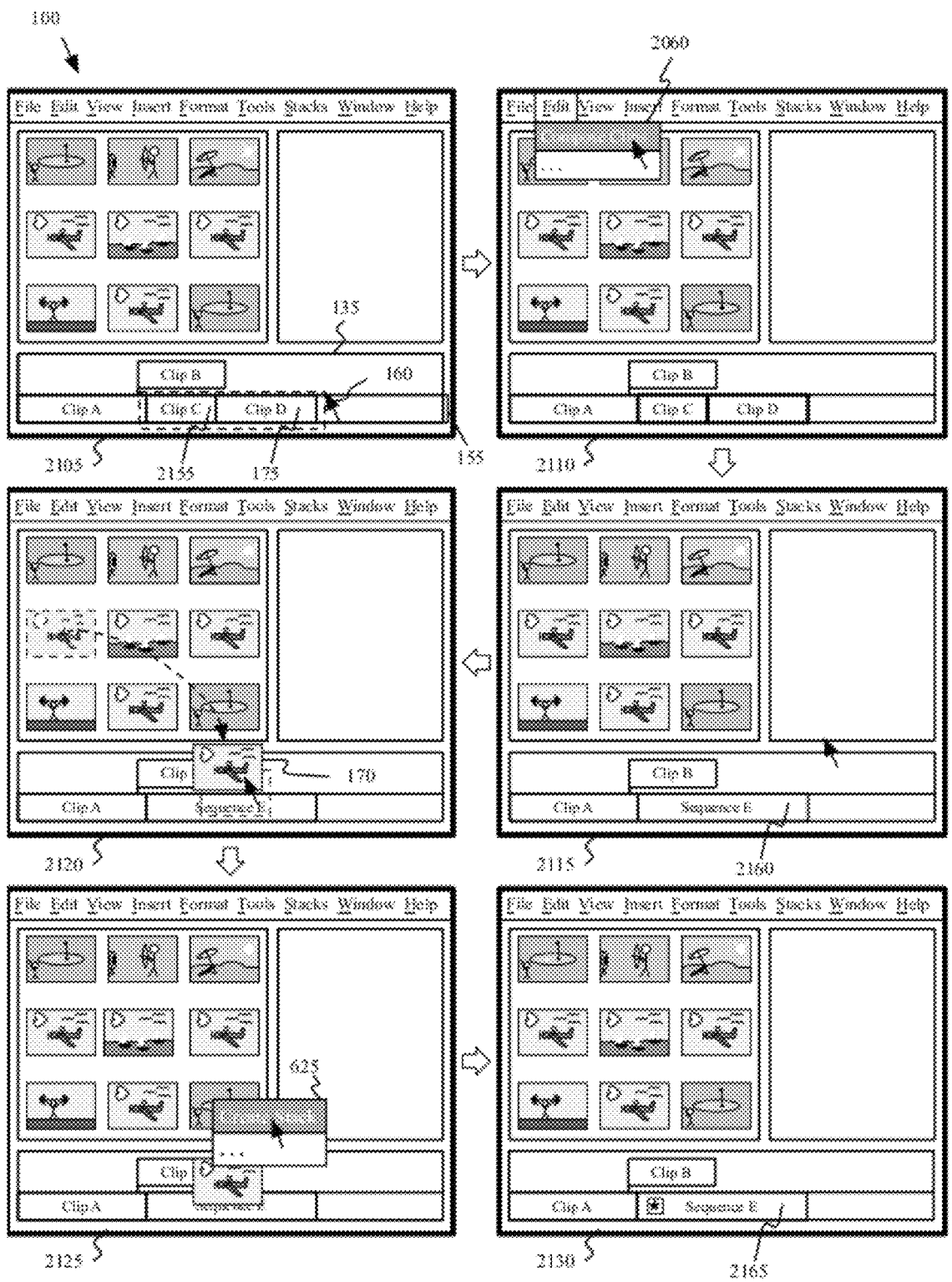
FIGS. 21 and 22 illustrate creating a sequence and creating an audition set that includes the sequence using the GUI of FIG. 1 according to some embodiments of the invention.
Figure 22:
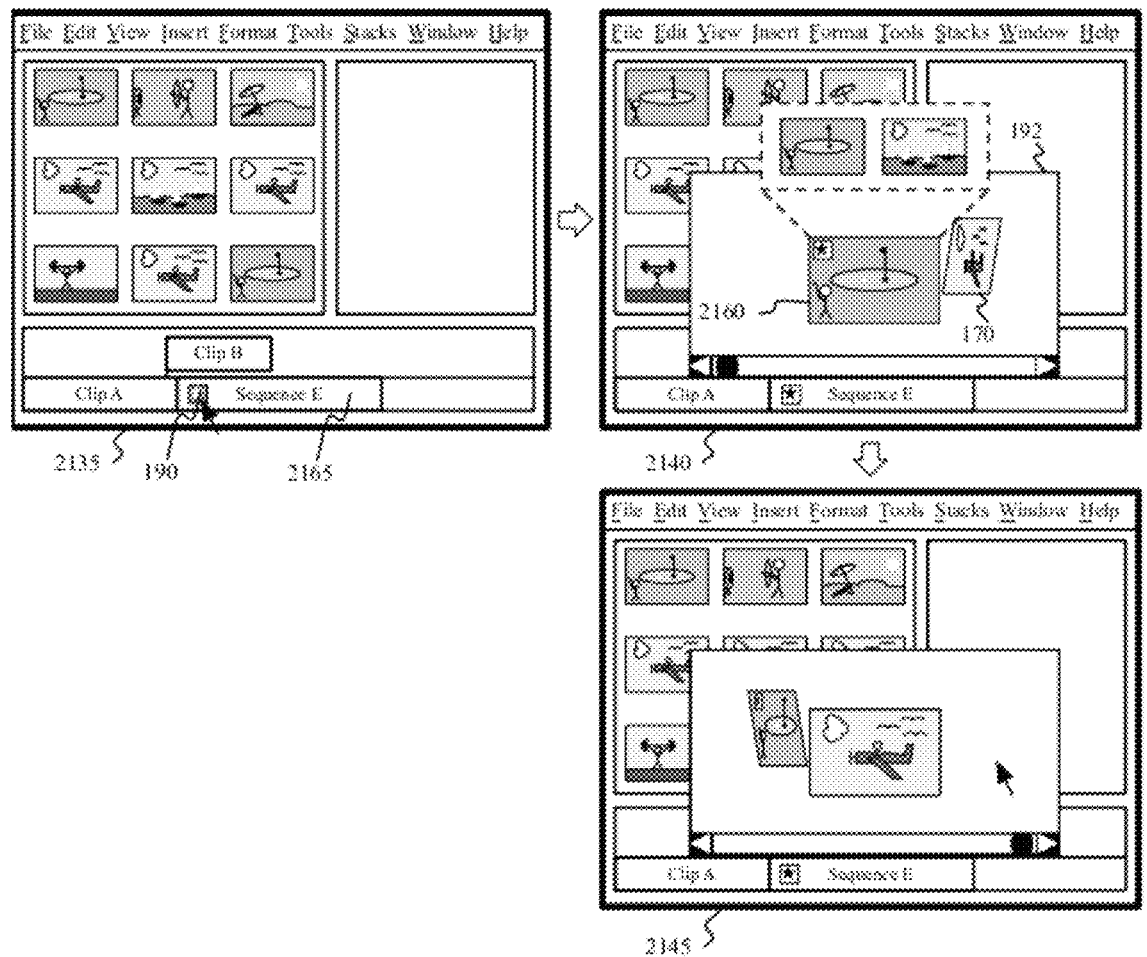

FIGS. 21 and 22 illustrate an alternative method to create a sequence and create an audition set that includes the sequence through the GUI 100 according to some embodiments of the invention. As shown, these figures illustrate the GUI 100 at nine different stages 2105-2145 that show the creation of a sequence of media clips in the composite display area 135 and the creation of an audition set that includes the created sequence.

Similar to the first stage of FIG. 20A, the first stage 2105 of the GUI 100 illustrates a selection of several media clips (specifically, media clips 2155 and 175) through a selection box operation using the cursor 160. However, in this example, the selected media clips are located in the central compositing lane 155 of composite display area 135.

At the second stage 2110, the GUI 100 displays menu 2060 in the GUI 100. The user can invoke the display of the menu 2060 in the same or a similar way to that described above by reference to stage 2010 of FIG. 20A (i.e., through a cursor click operation, touchscreen click operation, etc.). This stage also illustrates the selection of the "Compose Clips" option through a click operation using the cursor 160.

The third stage 2115 illustrates the GUI 100 after the creation of media clip sequence 2160 from media clips 2155 and 175. In this example, media editing application determines the order of the media clips 2155 and 175 in the media clip sequence 2160 by their chronological order in the timeline of the composite display area 135. Thus, the media clip 175 follows the media clip 2155 in the media clip sequence 2160.

As described above, the media editing application represents media clips in the composite display area 135 using a timeline view. Since the media clip sequence 2160 includes the media clip 2155 and the media clip 175, the duration of the sequence 2160 is the combined duration of these two media clips. Accordingly, the horizontal length of the media clip sequence 2160 displayed in the composite display area 135 equals the combined horizontal length of media clips 2155 and 175 as previously displayed in the composite display area 135.

The fourth through sixth stages 2120-2130 of the GUI 100 illustrate the creation of an audition set 2165 in a manner similar to the creation of the audition set 630 described above by reference to FIG. 6. In the stages 2120-2130, the user creates the audition set 2165 by selecting and dragging the media clip 170 onto the media clip sequence 2160 (e.g., with a drag-and-drop operation) and then selecting the "Create Stack" option in the menu 625. In this example, the media editing application sets media clip sequence 2160 as the active pick of the audition set 2165 as it is the media clip in the composite display area 135.

The seventh through ninth stages 2135-2145 illustrated in FIG. 22 show the display of the selection area 192 after its invocation through selectable item 190 and scrolling through media clips of the audition set 2165 in a similar manner as described above by reference to the stages 115-130 of FIG. 1. In short, these stages 2135-2145 illustrate the media clips that are part of the audition set 2165. In particular, the eighth stage 2040 shows the media clip sequence 2160, which is the active pick, and the ninth stage 2045 shows the media clip 170.

Although FIGS. 21 and 22 show a sequence in the composite display area 135 displayed as a single graphical representation of the sequence, some embodiments display each media clip in the sequence when the sequence is displayed in the composite display area 135.

As described above, several embodiments allow a user to create a sequence of video clips in the media library 145 and then create an audition set using this sequence in the composite display area 135. Some embodiments further allow the addition of such a sequence to the composite display area without adding it to an audition set. Specifically, the media editing application of some embodiments allows a user to create a sequence of video clips in the media library 145 in any one of the manners described above by reference to stages 2005-2015 of FIG. 20A.

Figure 23:
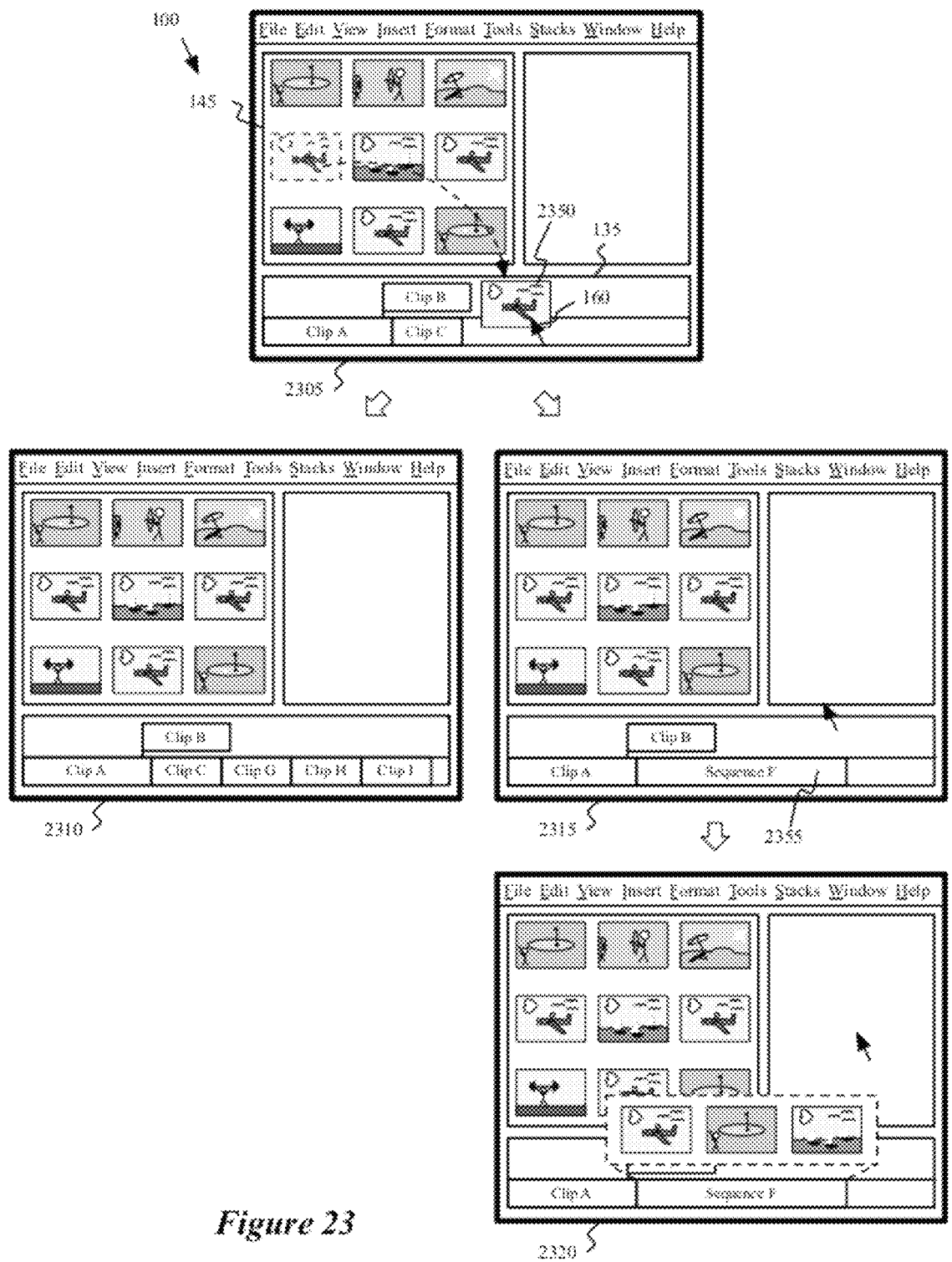
FIG. 23 illustrates adding a sequence created in a media library to a composite display area using the GUI of FIG. 1 according to some embodiments of the invention.

The media editing application then allows a user to add the sequence created in the media library to the composite display area, e.g., through a menu command (e.g., a pop-up or pull-down menu command), through a drag operation, through a hot key command, etc. FIG. 23 illustrates an example of adding a sequence 2350 that is created in the media library to the composite display area through a drag operation. This example is illustrated in terms of four stages 2305-2320, which are further explained below.

In the example illustrated in FIG. 23, the sequence 2350 is created in the media library by compositing three media clips, which are media clips G, H, and I in this example. The first stage 2305 shows the sequence 2350 being dragged from the media library 145 to the composite display area 135. When the composite display area 135 receives the dragged sequence, the composite display area adds it to the graphical representation of the composite presentation that it is displaying. FIG. 23 shows that different embodiments add the composed sequence differently to the composite display area.

Specifically, stage 2310 of this figure shows that some embodiments add the sequence by unfolding the sequence into its constituting individual media clips G, H and I, and then adding the individual clips to the composite display area 135. Stages 2315 and 2320 show an alternative way of adding the sequence to the composite display area. In particular, stage 2315 shows that some embodiments add the sequence by adding a sequence clip representation 2355 to the composite display area. Stage 2320 then illustrates that some embodiments allow an editor to open the sequence clip representation to examine and edit the constituting individual clips G, H, and I.

Figure 24:
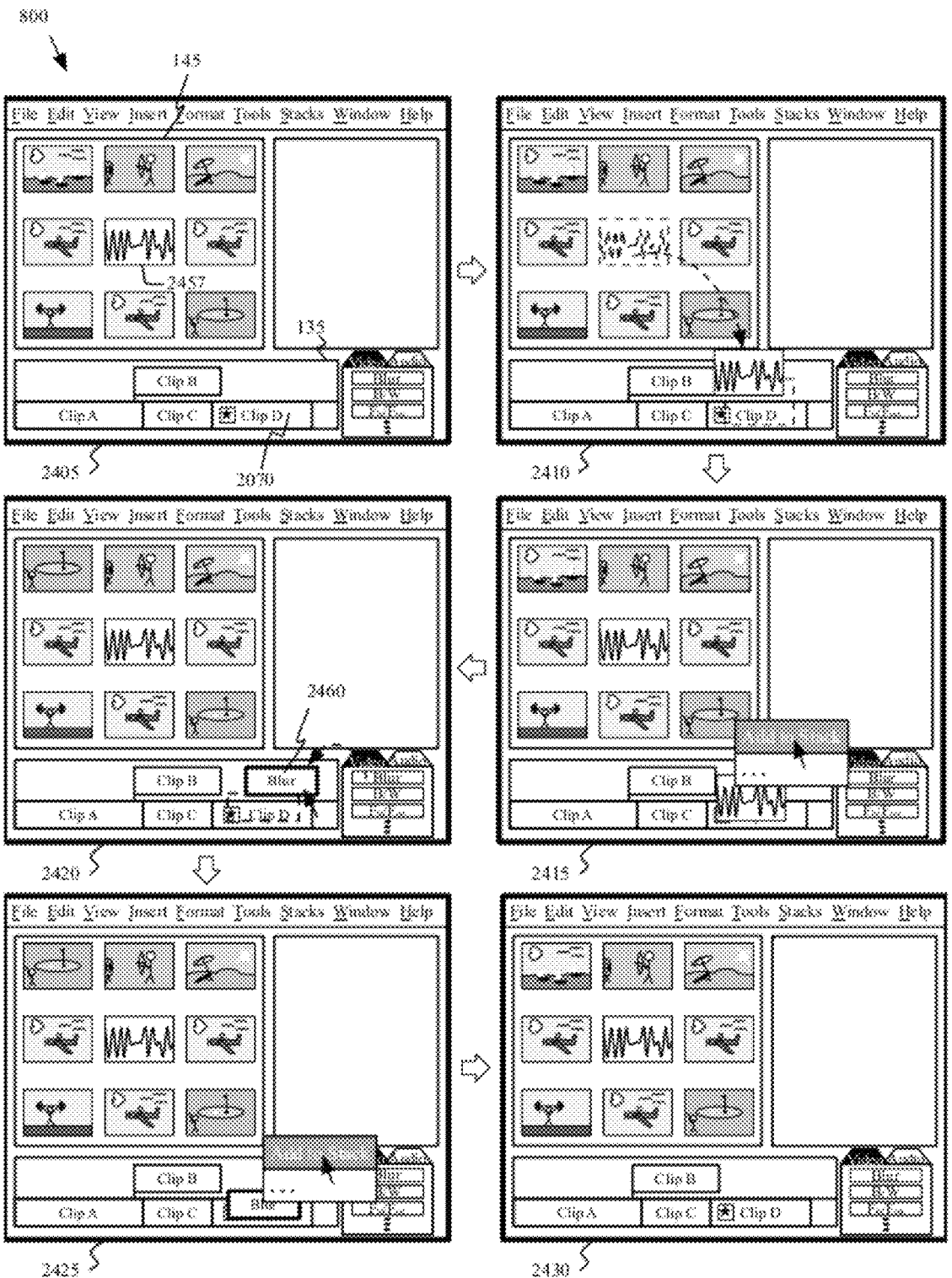
FIGS. 24 and 25 illustrate adding media clips to an audition set using the GUI of FIG. 1 according to some embodiments of the invention.
Figure 25:
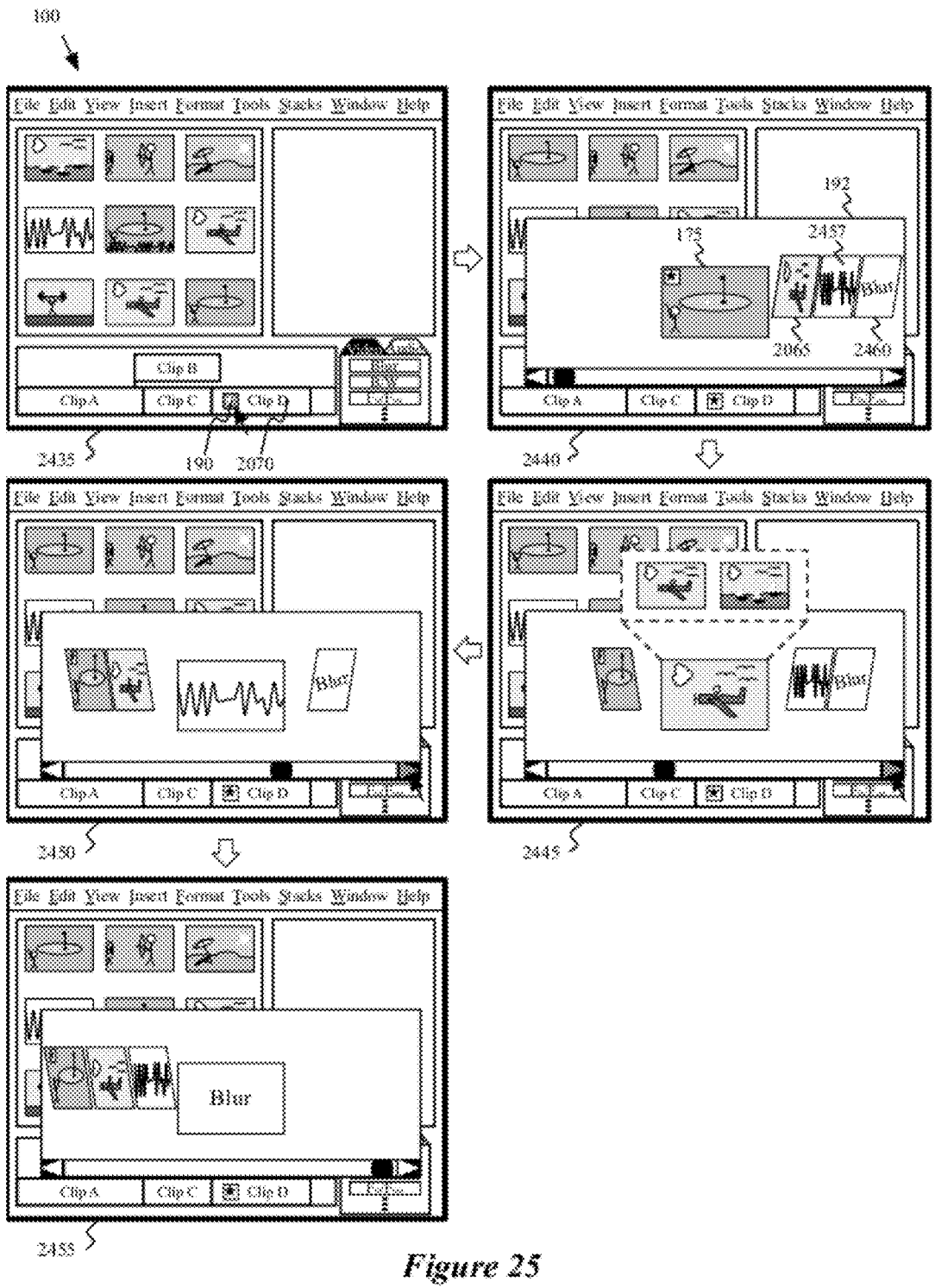

FIGS. 20-22 illustrate examples of audition sets that each include a video clip and a sequence of video clips. However, as mentioned above, an audition set of some embodiments can include a variety of different types of media clips. FIGS. 24 and 25 illustrate the creation of such an audition set through the GUI 800. These figures illustrate the GUI 800 at eleven different stages 2405-2455 that show the addition of different types of media clips to the audition set 2070.

At the first stage 2405, the audition set 2070 is displayed in the composite display area 135 and an audio clip 2457 is displayed in the media library 145. The second and third stages 2410 and 2415 illustrate the addition of media clip 2457 to the audition set 2070. The user adds media clip 2457 to the audition set 2070 in a similar manner as described above by reference to stages 1105 and 1110 of FIG. 11, by dragging the clip to the audition set in the composite display area and selecting an "Add to Stack" option from a menu that automatically appears.

The fourth and fifth stages 2420 and 2425 illustrate the addition of an effect clip to the audition set 2070. As with the media clip 2457, the user adds the media clip 2460 to the audition set 2070 by dragging the effect to the audition set in the composite display area and selecting the "Add to Stack" option from the menu that automatically appears, as described above by reference to the stage 1105 and 1110.

The sixth stage 2430 illustrates the GUI 800 after the addition of the media clips 2457 and 2460 to the audition set 2070. At this stage, the audition set 2070 includes four media clips: the media clip 175, the media clip sequence 2065, and media clip 2457, and the media clip 2460. While the GUI 800 has the same appearance as at stage 2405, the media editing application has modified the data structure for audition set 2070 to include the additional media clips.

The seventh through eleventh stages 2435-2455 illustrated in FIG. 25 show the display of the selection area 192 after its invocation through selectable item 190 and scrolling through media clips of the audition set 2070 in a similar fashion as described above by reference to the stages 115-130 of FIG. 1. These stages 2435-2455 illustrate the media clips that are part of the audition set 2070. Specifically, the eighth stage 2440 shows the video clip 175, which is the active pick, the ninth stage 2445 shows the media clip sequence 2065, the tenth stage 2450 shows the audio clip 2457, and the eleventh stage 2455 shows the media clip 2460. As shown, the media editing application displays the same waveform for audio clip 2457 as used in the thumbnail representation of the audio clip in some embodiments. For the effects clip 2460, some embodiments simply use the name of the effect, as shown.

E. Creation of Audition Set in Media Library

Many of the examples described above illustrate the creation of an audition set in the composite display area of the GUI of some embodiments. However, some embodiments allow the user to create audition sets in other areas of the GUI (e.g., in the media library). For instance, the user may wish to organize media clips in the media library that are similar and/or that are intended to be different shots of a particular scene in a movie without having to add any of the media clips to the composite display area. In this manner, the user can create audition sets of media clips that the user would like to associate together even though the user does not know where to place the audition set in the composite display area. Thus, the user can add the audition set to the composite display area at a later time.

Figure 26:
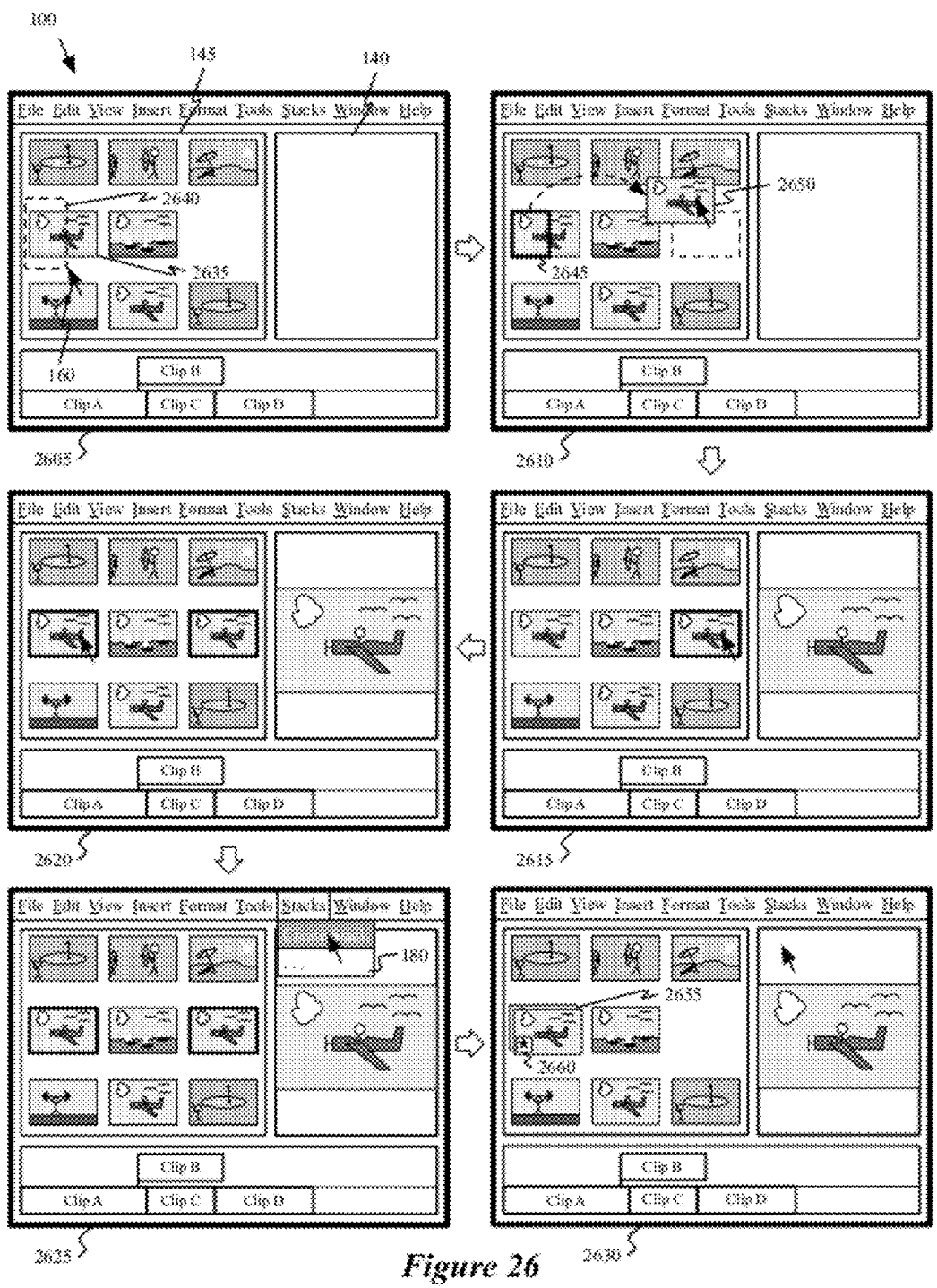
FIG. 26 illustrates creating an audition set in a media library of the GUI of FIG. 1 according to some embodiments of the invention.
Figure 27:
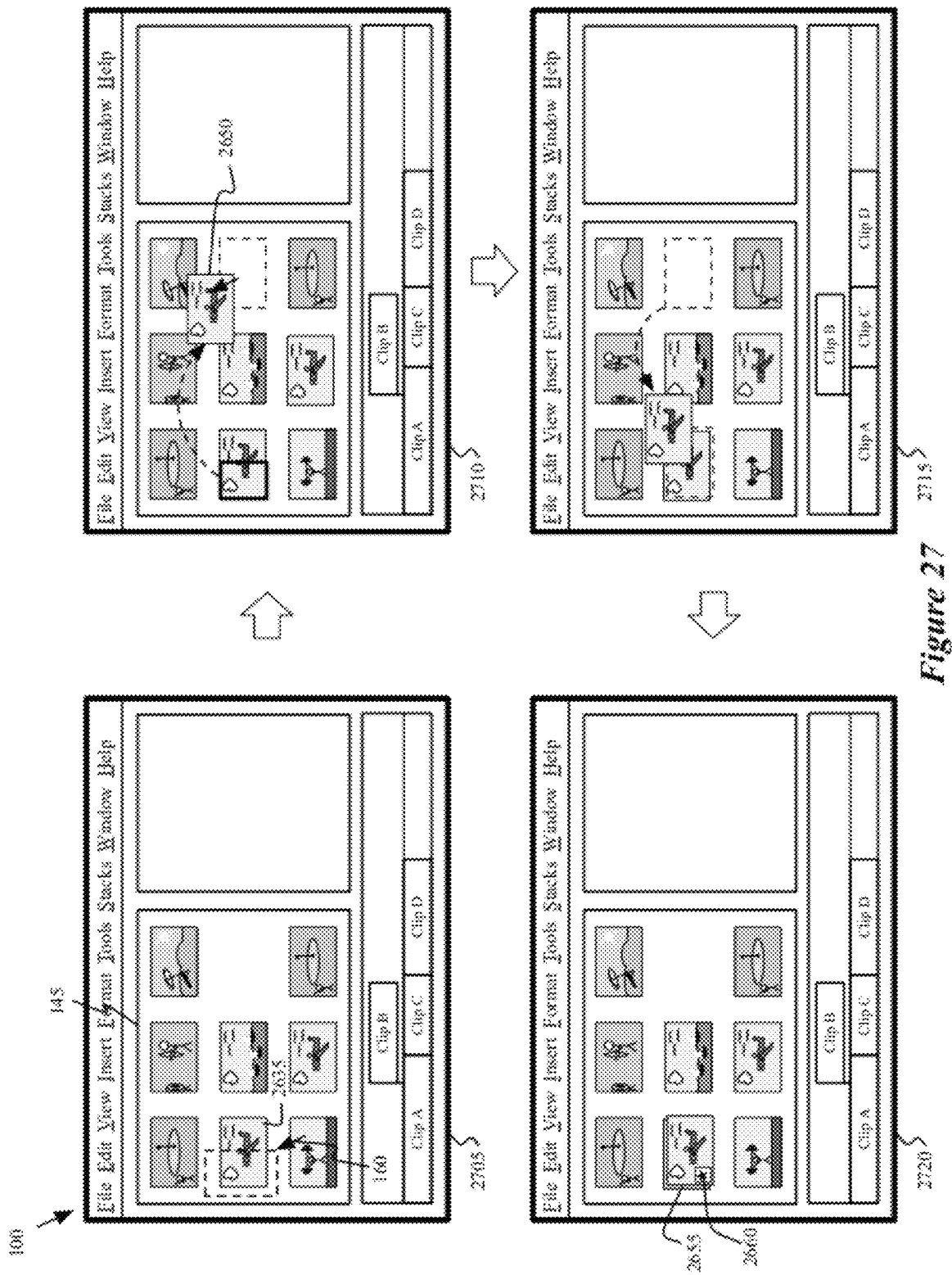
FIG. 27 illustrates creating an audition set in a media library of the GUI of FIG. 1 according to some embodiments of the invention.

FIGS. 26 and 27 illustrate examples of the creation of audition sets in the media library 145 of GUI 100. Specifically, these figures each illustrate a duplication operation performed on a portion of a particular media clip in the media library 145 and an audition set creation operation performed to logically group the particular media clip with the newly created media clip.

FIG. 26 conceptually illustrates the creation of an audition set in the media library 145 of the GUI 100 of some embodiments. In particular, this figure illustrates the GUI 100 at six different stage 2605-2630 that show an edit operation to create a new media clip and audition set creation operation. The first stage 2605 of the GUI 100 illustrates the user selecting a portion 2645 of the media clip 2635 by drawing a selection box 2640 using the cursor 160.

The second stage 2610 shows the GUI 100 with the portion 2645 of the media clip 2635. As shown, the media editing application indicates the selected portion 2645 with a bold rectangle in this example. The selected portion 2645 of the media clip 2635 represents a corresponding duration of the media content represented by the media clip. In particular, the selected portion 2645 represents approximately the first half of the media content represented by the media clip 2635 since approximately the left half of the thumbnail representation of the media clip 2635 is selected. Different embodiments may define the selected portion 2645 of the media clip 2635 differently.

The second stage 2610 also illustrates the selection and movement of the portion 2645 (e.g., through a drag-and-drop operation) to an area in the media library 145 not presently occupied by a media clip. In this example, the selection and dragging of the portion 2645 to an unoccupied area causes a new media clip 2650 to be generated and its representation displayed at the empty area of the media library 145. The media clip 2650 represents the portion of the media content defined by the selected portion 2645 (i.e., the media clip 2650 has the same in point as the media clip 2635 but a different, earlier out point).

The third stage 2615 of the GUI 100 illustrates the display of a new media clip 2650 in the media library 145. This stage also shows the selection of the media clip 2650 through a click operation using the cursor 160. When the user selects media clip 2650, the media editing application displays the thumbnail image that represents the media clip 2650 in the preview display area 140. In some embodiments, however, the preview display area 140 remains unchanged with the selection of a media clip in the media library.

The fourth stage 2620 of the GUI 100 illustrates a selection of a second media clip 2635 in the media library 145 through a click operation using the cursor 160, similar to the selection of the media clip 2650 in the third stage 2615. The click operation used is such that media clip 2650 also remains selected (e.g., a holding down a key while clicking a cursor controller, touching both thumbnails at the same time on a touchscreen, etc.)

At the fifth stage 2625 of the GUI 100, the user invokes the creation of an audition set. The user invokes the menu 180 with the user selectable "Create Stack" option displayed. As previously described above, selection of the "Create Stack" option creates an audition set that represents a logical grouping of selected media clips (the media clips 2635 and 2650 in this example).

The sixth stage 2630 illustrates the GUI 100 after the creation of an audition set 2655. As shown, the media clips 2635 and 2650 are no longer displayed as individual media clips. Instead, the GUI displays a stack of clips at the previous location of clip 2635. Furthermore, on the top thumbnail of this stack, the GUI displays a user selectable UI item 2660 to indicate that the stack is an audition set. In some embodiments, the user selectable UI item 2660 can be used to open and close a selection area similar to that invoked with the user selectable UI item 190 described above. Some embodiments also display a label that indicates a number of media clips in the audition set.

While FIG. 26 illustrates the media clips of the audition set 2655 stacked on top of one another in an offset manner, some embodiments may display audition sets differently in the media library. For instance, some embodiments display an audition set as a single thumbnail representation without any offset stacking, using an indicator such as item 2660 to indicate to the user that the thumbnail represents an audition set.

FIG. 26 illustrates a creation of the audition set 2655 in the media library 145 by selecting media clips in the media library 145 and selecting an option from a pull-down menu. Some embodiments provide other ways of invoking the audition set creation operation, such as using a hotkey, a keystroke, a series of keystrokes, a combination of keystrokes, or any other appropriate method for invoking a command.

FIG. 27 illustrates another example of the creation of an audition set in the media library 145 of the GUI 100. FIG. 27 illustrates the GUI 100 at four different stages 2705-2720 that show an edit operation and audition set creation operation of some embodiments. The first and second stages 2705 and 2710 are the same as the first and second stages 2605 and 2610 of FIG. 26, in which the user creates a new media clip from a portion of an existing media clip.

The third stage 2715 of the GUI 100 shows the performance of an audition set creation operation. At this stage the user selects and drags the media clip 2650 (e.g., through a drag-and-drop operation) using the cursor 160 towards the media clip 2635 in the media library 145.

The fourth stage 2720 illustrates the GUI 100 after the placement of the media clip 2650 on top of the media clip 2635 to create an audition set 2655. The end result of the GUI 100 is the same as that of stage 2630 of FIG. 26, in that the clips are shown as a stack with an indicator UI item 2660 to indicate the new audition set, and an audition set data structure has been created.

While the examples illustrated in FIGS. 26-27 show only two media clips selected to create an audition set, multiple media clips can be selected and subsequently grouped as an audition set in some embodiments. In some such embodiments, multiple media clips can be selected by holding a keyboard key and performing click operations on each media clip the user wishes to select, or by using the cursor 160 to perform a selection box selection operation. Other embodiments may use other methods for selecting GUI items in the GUI 100 as well, such as touchscreen operations.

Figure 28:
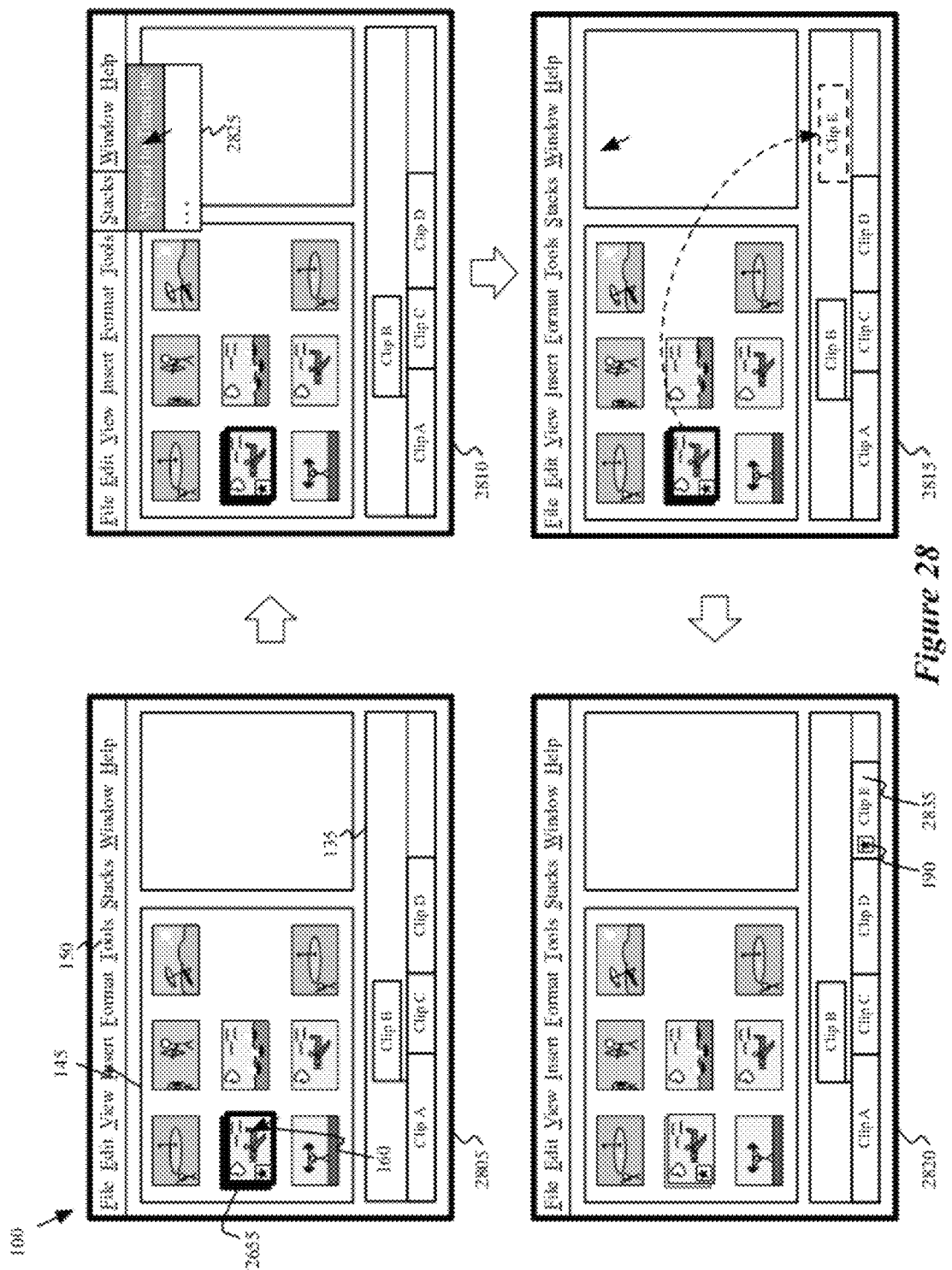
FIG. 28 illustrates adding an audition set to a composite presentation using the GUI of FIG. 1 according to some embodiments of the invention.

As described above, FIGS. 26 and 27 show several examples of the creation of an audition set in the media library 145. Once an audition set has been created in the media library, a user can add the audition set to the composite presentation in the composite display area. FIG. 28 illustrates adding an audition set to a composite presentation through the GUI 100 according to some embodiments of the invention. This figure illustrates the GUI 100 at four different stages 2805-2820 that show the addition of the audition set 2655 to a composite presentation displayed in the composite display area 135.

The first stage 2805 continues from the last stage 2630 of FIG. 26. As shown, this stage illustrates the selection of the audition set 2655 through a click operation using the cursor 160. The GUI 100 indicates the selection of the audition set 2655 by bolding the audition set 2655.

At the second stage 2810, the GUI 100 displays a menu 2825 that includes a user selectable "Append to Timeline" option and other options (not shown). The "Append to Timeline" option appends a selected media clip (the active pick of the audition set 2655 in this example) to the end of the composite presentation. Some embodiments allow the user to invoke the menu 2825 by selecting the "Stacks" option in the menu bar 150 through a click operation (e.g., a cursor click operation, a touch click operation, etc.). Other embodiments provide other ways to invoke the menu 2825. For example, some such embodiments allow the user to invoke the menu 2825 using a hotkey, a keystroke, a series of keystrokes, a combination of keystrokes, or any other method to invoke a menu. The second stage 2810 illustrates the selection of the "Append to Timeline" option through a click operation using the cursor 160.

The third stage 2815 of the GUI 100 conceptually shows the addition of the audition set 2655 (i.e., the active pick of the audition set 2655) to the composite presentation displayed in the composite display area 135. Some embodiments actually display the addition of the audition set or media clip (e.g., an animation of the audition set 2655 moving from the media library 145 to the composite display area 135) upon the selection of the "Append to Timeline" option.

The fourth stage 2820 illustrates the GUI 100 after the addition of the active pick of the audition set 2655 to the composite presentation. The composite display area 135 now displays an audition set 2835, which is the timeline view of the audition set 2655, at the end of the composite presentation after "Clip D." As shown, a user selectable UI item 190 is displayed in the audition set 2835 to visually indicate that it is an audition set. Some embodiments automatically append the media clip or audition set to the end of the composite presentation upon selection of the "Append to Timeline" option. In some embodiments, however, a playhead or other UI item may be used to specify a location in the timeline at which to add the clip or audition set.

Figure 29:
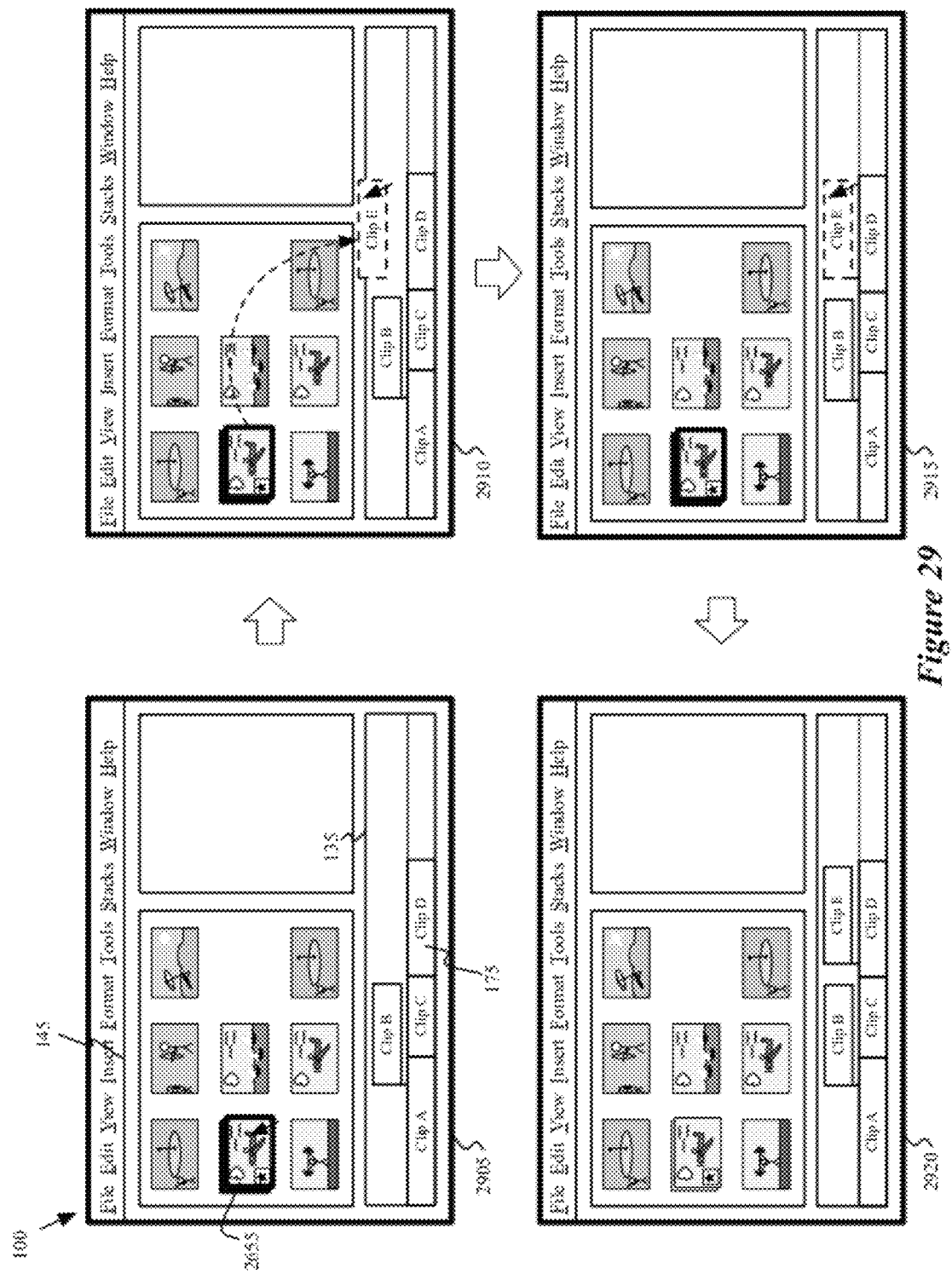
FIG. 29 illustrates adding an audition set to a composite presentation using the GUI of FIG. 1 according to some embodiments of the invention.

FIG. 29 also illustrates the addition of an audition set to a composite presentation using the GUI 100 according to some embodiments of the invention. Rather than adding an audition set to the end of the composite presentation, some embodiments allow the user to add the audition set to any location in the composite presentation. FIG. 29 illustrates the GUI 100 at four different stages 2905-2920 that show the addition of the audition set 2655 to a particular location in the composite presentation using an anchor lane of the composite display area.

The first stage 2905 is the same as the first stage 2805, in which the user selects the audition set 2655. The second stage 2910 shows the user dragging audition set 2655 (e.g., through a drag-and-drop operation) from the media library 145 into the composite display area 135. As shown, when the user drags the audition set 2655, a timeline view representation of the active pick is displayed in the timeline view (i.e., a rectangle with a duration determined by the length of the active pick) to assist the user in placing the audition set 2655 in the composite display area 135. Some embodiments display the audition set 2655 in the audition set 2655's thumbnail view until the thumbnail is within a threshold distance of the composite display area 135. When the user drags the audition set 2655 within the threshold distance, the editing application displays the timeline view.

At the third stage 2915, the GUI 100 illustrates the anchoring of the audition set 2655 to the media clip 175. In some embodiments, when the user brings the representation of the audition set within a threshold distance of the media clip in the composite display area, the audition set 2655 automatically "snaps" to the media clip. With the audition set anchored to the media clip in the composite display area, the user can adjust the position of the audition set by moving it left and right in some embodiments.

The fourth stage 2920 shows the result of the operation to add the audition set to the composite display area. After the user has finished dragging the audition set 2655 into the composite display area 135, the media editing application adds the active pick of the audition set 2655 to the composite presentation at the location shown in the composite display area 135. In some embodiments, this entails modifying a project data file to indicate the inclusion of a particular media clip at a particular time.

II. Previewing an Audition Set

As described above, each of the media clips in an audition set is a candidate for inclusion at a particular location in a composite display area. When the user includes an audition set in the composite presentation, some embodiments only treat one of the video clips as a committed media clip in the composite presentation at any given time. The following section describes various tools of some embodiments that allow the user to examine and evaluate the media clips in an audition set (or single media clips not in an audition set) at a particular location in the composite presentation. For instance, the media editing application of some embodiments allows the user to browse media clips, skim media clips, and preview media clips, among other functionalities.

Many of the examples above show the selection area 192 positioned at a particular location within a GUI (e.g., just above the central compositing lane 155 of the composite display area 135). Some embodiments provide functionality that enables a user to position the selection area 192 at different locations in a GUI. For instance, when the user wishes to preview a portion or all of a composite presentation in the preview display area 140, the user may want to move the selection area 192 so that it does not obstruct the preview display area 140.

Figure 30:
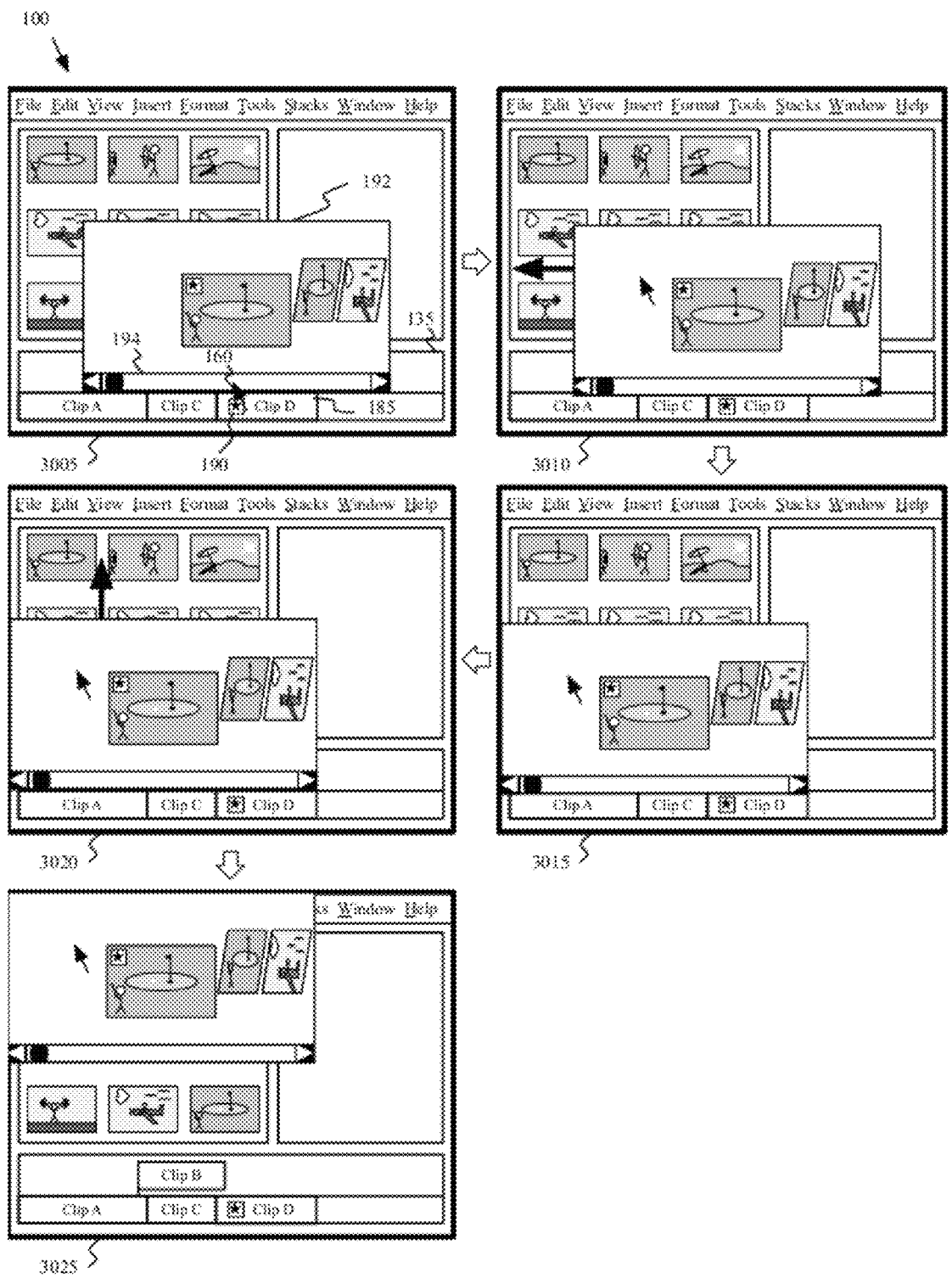
FIG. 30 illustrates moving a selection area using the GUI of FIG. 1 according to some embodiments of the invention.

FIG. 30 illustrates the movement of the selection area 192 within the GUI 100 according to some embodiments of the invention. Particularly, FIG. 30 illustrates the GUI 100 at five different stages 3005-3025 that show several example movements of the selection area 192.

At the first stage 3005, the GUI 100 displays the audition set 185 in the composite display area 135 and the selection area 192. In this example, the user has selected the selectable UI item 190 (e.g., through a cursor click operation using the cursor 160 or a touch operation with a touchscreen device) to invoke the display of the selection area 192.

The second stage 3010 of the GUI 100 illustrates the start of a movement of the selection area 192 to a new location in the GUI 100. In this example, the user moves the selection area 192 by performing a click-and-drag operation using the cursor 160 (or through a touch operation using a touchscreen device) on any region in the selection area not occupied by a media clip or the scroll bar 194. As shown by the large arrow, the user is in the process of moving the cursor 160 to the left after selecting the selection area 192 at the present location of the cursor 160.

The third stage 3015 illustrates the selection area 192 moved to the left of its previous position. At this stage, the user may have completed the click-and-drag operation (e.g., by releasing a cursor click operation or removing a finger from a touchscreen), or may still be in the middle of the click and drag operation.

The fourth and fifth stages 3020 and 3025 illustrate another movement of the selection area 192 in the GUI 100. Specifically, the user moves the selection area 192 up from its position in the third stage 3015 in a similar manner to that used to move the selection area 192 in the second and third stages 3010 and 3015. As shown in the fifth stage 3025, the GUI 100 now displays the selection area 192 in its upper left corner.

While FIG. 30 describes one method for moving the selection area 192 in the GUI 100, other embodiments may provide other ways to move the selection area 192. For example, some embodiments allow the user to enable and disable (e.g., toggle) a positioning mode (e.g., by using a hotkey, keystroke, combination of keystrokes, or selection from a pop-up or pull-down menu, etc.). When the positioning mode is enabled, the user can move the selection area 192 by using keystrokes, such as arrow key inputs. Once the user has moved the selection area 192 to a desired location, the user can disable the positioning mode (e.g., by using a similar hotkey, keystroke, combination of keystrokes, or selection from a pop-up or pull-down menu, etc.) to set the position of the selection area 192 at its desired location.

FIG. 30 illustrates the movement of the selection area 192 within perimeter of the GUI 100. However, some embodiments allow the user to move some or all of the selection area beyond the perimeter of the GUI. As mentioned above, the user may wish to move the selection area when it obstructs an area of the GUI that the user desires to view. Additionally, some embodiments provide other techniques for modifying the display of the selection area, such as resizing the area.

A. Selecting an Active Pick for an Audition Set

In some embodiments, the user can change the active pick of an audition set by selecting another media clip in the audition set to replace the current active pick (e.g., through the selection area). A user may wish to change the active pick of an audition set for different reasons. For example, several media clips within an audition set may be different takes of one particular shot of a movie. By allowing the user to create an audition set that includes these several media clips, the user can examine the different takes and select the one the user wants to use in the movie. The auditioning feature then allows the user to select a different take from the audition set at any time in case the user changes his mind.

Figure 31:
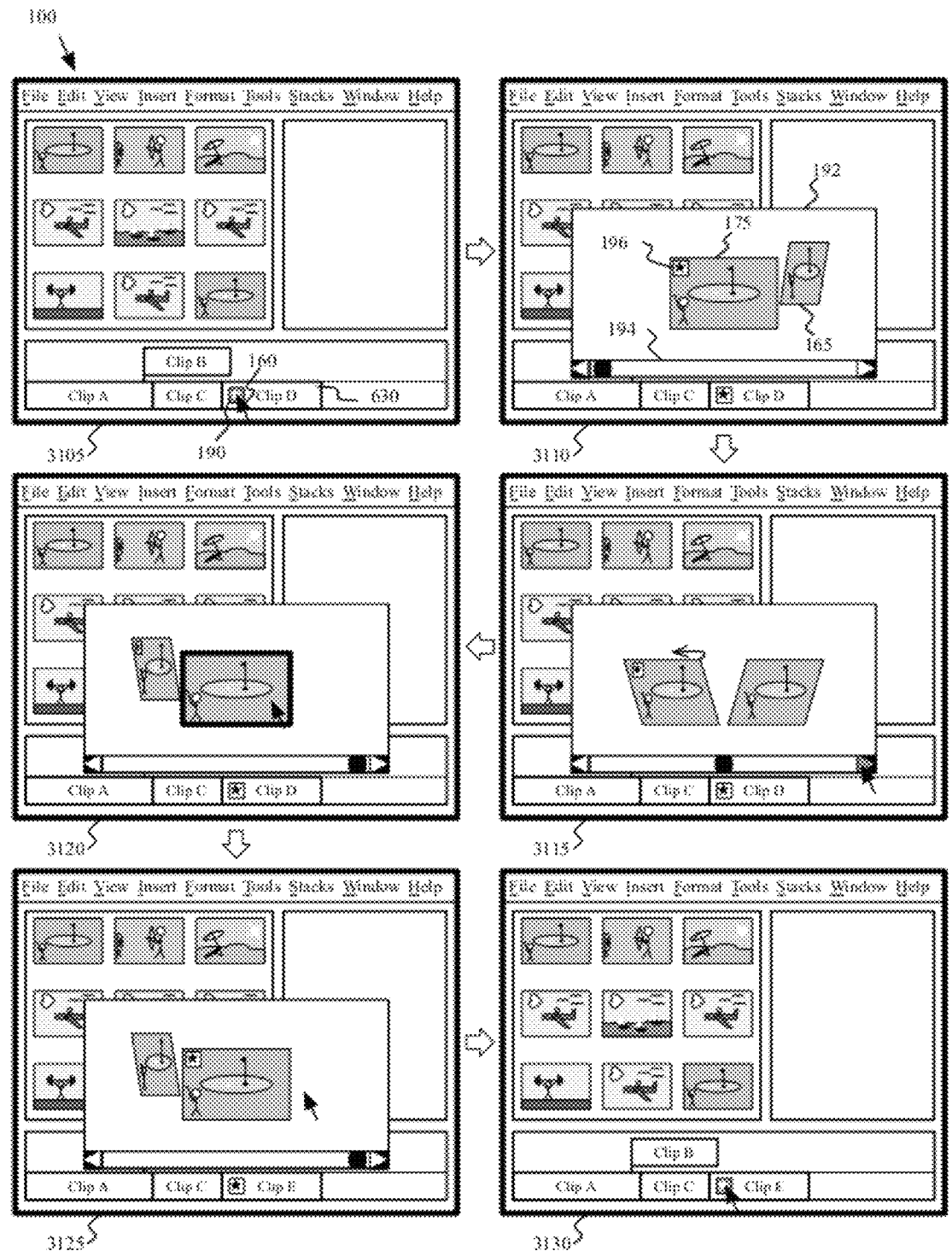
FIG. 31 illustrates selecting an active pick for an audition set using the GUI of FIG. 1 according to some embodiments of the invention.

FIG. 31 illustrates changing the active pick for an audition set using the GUI 100 of some embodiments. In particular, this figure illustrates the GUI 100 at six different stages 3105-3130 of the active pick selection operation. For this example, the GUI 100 continues from the last stage 620 illustrated in FIG. 6, at which an audition set 630 is created. At the first stage 3105 of the GUI 100, the user selects the selectable audition set indicator UI item 190 through a click operation using the cursor 160, as shown by a change in the appearance of the user selectable UI item 190.

The second stage 3110 illustrates the GUI 100 after the selection of the user selectable UI item 190. As shown, the GUI 100 displays (i.e., opens) the selection area 192 (that includes the scroll bar 194). The selection area 192 displays the two media clips of the selected audition set, clips 165 and 175. The graphical representation of media clip 175 includes an active pick indicator 196 to indicate that it is presently the active pick of the audition set 630.

In some embodiments, the media editing application automatically displays the selection area 192 in the GUI 100 upon receiving a selection of the user selectable UI item 190 (e.g., through the illustrated cursor click operation, a touch click operation, etc.). Some embodiments provide other mechanisms for invoking the display of the selection area 192. For example, some of these embodiments allow the user to invoke the selection area 192 using a hotkey, a keystroke, a series of keystrokes, a combination of keystrokes, an option selected from a pop-up or pull-down menu, a different touch operation for a touchscreen device, or any other appropriate method to invoke the display of the selection area 192. Some embodiments animate the opening of the selection area (e.g., by showing the selection area opening out of the selected media clip representation.

At the third stage 3115, the user is in the process of scrolling through media clips 165 and 175 in the selection area 192. In particular, this stage shows the selection of the right arrow of the scroll bar 194 by the user through a click operation using the cursor 160, as shown by a change in the appearance of the right arrow. The user is scrolling through the media clips 165 and 175 from right to left, as indicated by the arrow over clip 175 pointing to the left, and the indicator in the scroll bar 194 is also changing positions accordingly. As shown in this stage, some embodiments animate the movement of the media clips through the center of the selection area, as in this case the size of the representation of media clip 175 is decreasing while the size of the representation of media clip 165 increases. Although this example illustrates the use of the arrows of the scroll bar 194 to scroll through the media clips displayed in the selection area 192, in some embodiments the user may also use the indicator of the scroll bar 194 to scroll through the media clips displayed in the selection area 192, as previously mentioned above.

The fourth stage 3120 of the GUI 100 illustrates the selection area 192 with media clip 165 now centered in the display. At this stage, the user selects the media clip 165 as the active pick of the audition set 630 through a click operation (e.g., single-click, double-click, etc.) using the cursor 160.

The fifth stage 3125 of the GUI 100 illustrates the selection area 192 after the user has selected the media clip 165 as the active pick of the audition set 630 (e.g., by the cursor click operation described above, a touchscreen operation such as a single or double tap of the media clip representation, etc.). As shown, the media editing application now displays indicator 196 on the media clip 165 instead of on the media clip 175 to indicate the new active pick selection. In some embodiments, the media editing application also modifies a data structure for the audition set 630 to refer to media clip 165 as the active pick for the set.

The sixth stage 3130 illustrates the GUI 100 no longer displaying the selection area 192. In this case, the user has selected the user selectable UI item 190 in order to close the selection area 192 (e.g., with a cursor click operation, a touch click operation, etc.). Other embodiments allow the user to close the selection area differently—e.g., through a hotkey, a keystroke, a series of keystrokes, a combination of keystrokes, an option selected from a pop-up or pull-down menu, selection of a "close window" item displayed within the selection area, etc.

The stages 3105-3130 of FIG. 31 illustrate an active pick selection operation performed by scrolling through the media clips of an audition set displayed in the selection area 192 and selecting one of the media clips as the active pick of the audition set. Some embodiments enable the user to perform a scroll and selection operation. For instance, some such embodiments allow the user to use a hotkey, a keystroke (e.g., right arrow, left arrow), a series of keystrokes, a combination of keystrokes (e.g., command-shift-right arrow, command-shift-left arrow), an option selected from a pop-up or pull-down menu, a touch operation for a touchscreen device, or other methods to simultaneously scroll in one direction and select the next media clip in such direction as the active pick of the audition set 630.

FIG. 31 illustrates an exemplary series of operations for selecting an active pick for the audition set 630. However, one of ordinary skill in the art will recognize that a user can use many different types of operations to select an active pick for an audition set. For example, the user can scroll through the media clips displayed in the select area any number of times before selecting a media clip to be the active pick of the audition set. Some embodiments allow the user to select (e.g., by clicking with a cursor or touching on a touchscreen) a media clip representation that is not centered in the selection area in order to select the media clip as an active pick. Some embodiments allow the user to select an active pick without opening the selection area. For instance, a user might be able to select an audition set and then use a keystroke or key combination to cycle through the media clips as active picks for the audition set.

As previously noted above, the characteristics and attributes of an active pick of an audition set are used when the audition set interacts with the media editing application (e.g., when the media editing application renders the composite presentation of which the audition set is a part). As different media clips have different durations, the size of the representation of the audition set in the display area may be different with different media clips selected as the active pick for the set.

Figure 32:
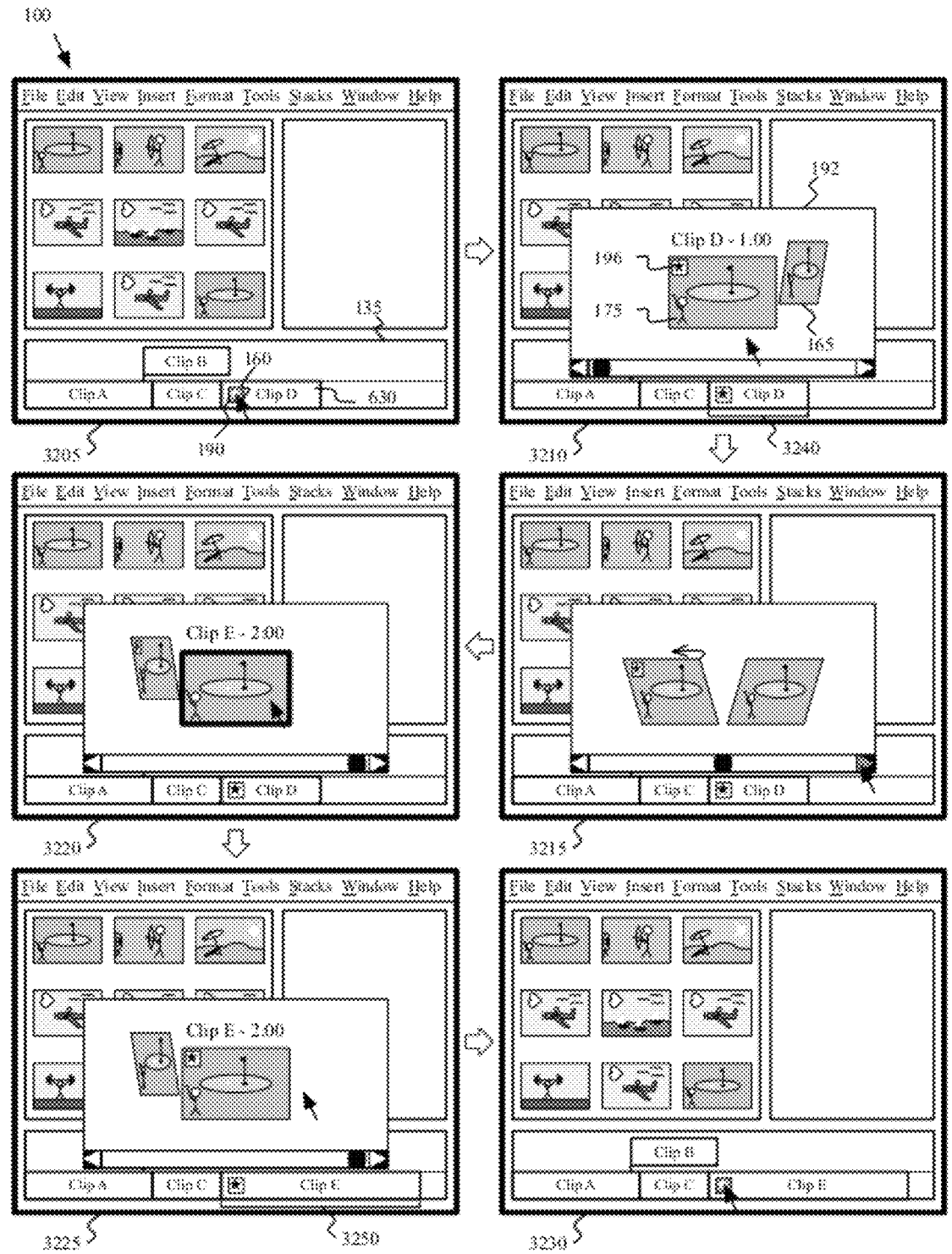
FIG. 32 illustrates selecting an active pick for an audition set using the GUI of FIG. 1 according to some embodiments of the invention.

FIG. 32 illustrates an example of the display of such differently-sized graphical representations when the active pick of an audition set changes. Specifically, FIG. 32 illustrates the GUI 100 at six different stages 3205-3230 that show the selection of a new active pick for an audition set. The first stage 3205 is the same as the first stage 3105 of FIG. 31. That is, this stage of the GUI 100 continues from the last stage 620 illustrated in FIG. 6 and shows the selection of the user selectable UI item 190 through a click operation using the cursor 160.

The second stage 3210 is similar to the second stage 3110 of FIG. 31 except the selection area 192 displays a label specifying the name and duration of the media clip displayed at or near the center of the selection area 192. As shown, the media clip 175 is named "Clip D" and has a duration of one minute. The indicator 196 is also displayed on the media clip 175 to indicate that it is the active pick of the audition set 630. Since the media clip 175 is the active pick, the media editing application uses the duration of the media clip 175 to determine the horizontal length 3240 of the audition set 630 in the composite display area 135. In other words, the horizontal length 3240 of the audition set 630 represents a duration of one minute in the composite display area 135.

The third stage 3215 is the same as the third stage 3115 illustrated in FIG. 31, which shows the user scrolling through the media clips 165 and 175 in the selection area 192. The fourth stage 3220 of the GUI 100 is similar to the fourth stage 3120 of FIG. 31 except that the selection area 192 displays the name and duration of the media clip 165, which is displayed at or near the middle of the selection area 192. As shown, media clip 165 is named "Clip E" and has a duration of two minutes. At this stage, the user selects the media clip 165 as the active pick of the audition set 630 through a click operation (e.g., single-click, double-click, etc.) using the cursor 160.

The fifth stage 3225 is similar to the fifth stage 3125 shown in FIG. 31 in that this stage illustrates the selection area 192 after the user has selected the media clip 165 as the active pick of the audition set 630 (e.g., by the cursor click operation described above, a touchscreen operation such as a single or double tap of the media clip representation, etc.). As shown, the media editing application now displays indicator 196 on the media clip 165 instead of on the media clip 175 to indicate the new active pick selection. In some embodiments, the media editing application also modifies a data structure for the audition set 630 to refer to media clip 165 as the active pick for the set. In addition, the GUI now displays the audition set 630 with a new horizontal length 3250 in the composite display area 135. As the duration of media clip 165 is twice that of media clip 175, the length of the audition set's representation in the composite display area has doubled.

The sixth stage 3230 is the same as the sixth stage 3130 of FIG. 31. This stage illustrates that the GUI no longer displays the selection area 192, as a result of the user selecting the user selectable UI item 190 (e.g., with a cursor click operation, a touch click operation, etc.).

B. Skimming a Media Clip in an Audition Set

Figure 33:
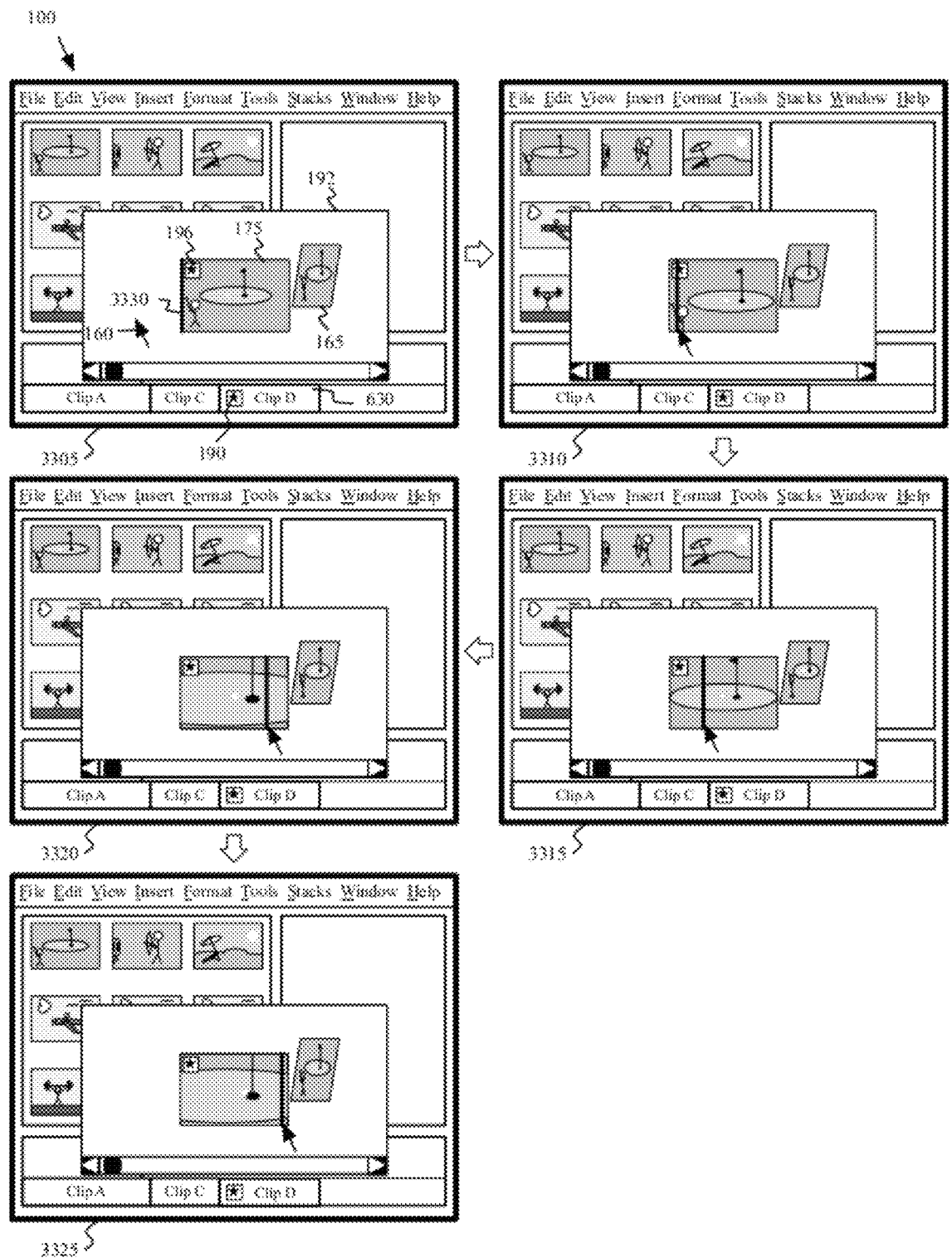
FIG. 33 illustrates skimming a media clip of an audition set using the GUI of FIG. 1 according to some embodiments of the invention.

In addition to the ability to select an active pick within the selection area, some embodiments provide the user with the ability to skim through media clips displayed in the selection area. Skimming, in some embodiments, involves dragging a playhead through the representation of a video clip so as to view different images (i.e., frames or fields) of the video clip. FIG. 33 illustrates a user skimming a media clip of the audition set 630 through the GUI 100 according to some embodiments of the invention. In particular, this figure illustrates the GUI 100 at five different stages 3305-3325 of an example skimming operation.

In this example, the first stage 3305 continues after the last stage 620 of FIG. 6, in which the audition set 630 was created. At the first stage 3305 of the GUI 100, the GUI displays the selection area 192, which has been invoked through a selection (e.g., a cursor click operation, touch click operation, etc.) of the user selectable UI item 190, as described above by reference to FIG. 1. As shown, the selection area 192 displays the media clips 165 and 175. The selection area indicator 196 and a playhead 3330 (also referred to as a scrubber bar) are displayed over the representation of the media clip 175.

The horizontal position of the playhead 3330 along the media clip 175 indicates the chronological position within the media content of media clip 175 of the image presently displayed (e.g., skimmed). As described above, the media content of a media clip is defined by in and out points in a source media file in some embodiments. In this example, the playhead 3330 positioned along the left side of the media clip 175 indicates that the first image in the video clip 175 is presently displayed in the thumbnail representation of the clip. Some embodiments, on the other hand, skim through a media clip from right to left (i.e., the playhead at the right edge indicates the beginning of the clip). Some embodiments display the playhead for the user to use in the skimming operation whenever a video clip is displayed in the center of the selection area, while other embodiments only display the playhead in response to user input (e.g., a hotkey or combination of keystrokes, the user performing a click-and-drag operation over the displayed clip representation, etc.).

The second stage 3310 of the GUI 100 illustrates the user beginning to skim through the media clip 175. As shown, the user moves the playhead 3330 across the media clip 175 using the cursor 160 (e.g., by performing a click-and-drag operation on the playhead 3330 or otherwise moving the cursor over the representation of the media clip 175). Since the playhead 3330 is positioned near the left side of media clip representation 175, the media clip representation 175 displays an image from near the beginning of its media content. This image is similar to the image displayed in the first stage 3305 (e.g., the first frame of the media content) except that the scene of the golfer and the golf ball rolling towards the hole is zoomed in slightly and the golf ball is closer to the hole.

The third through fifth stages 3315-3325 illustrate the user continuing to skim through the media clip 175 using the cursor 160. At stage 3315, the playhead 3330 is positioned about one third of the way from the left side of the media clip 175. At stage 3320, the playhead is positioned about four fifths of the way across the media clip representation 175, and at stage 3325 the playhead has nearly reached the right edge of the media clip representation 175. These stages show that the video clip progresses as the user skims through, with the images being further zoomed in and the golf ball closer to the hole at each subsequent stage.

While FIG. 33 shows the user skimming through the media clip 175 from the start to the end of the media, one of ordinary skill will realize that the user need not skim through a media clip monotonically. That is, the user can skim back and forth through the clip (e.g., to replay a portion of the clip multiple times).

C. Previewing a Media Clip in an Audition Set

Figure 35:
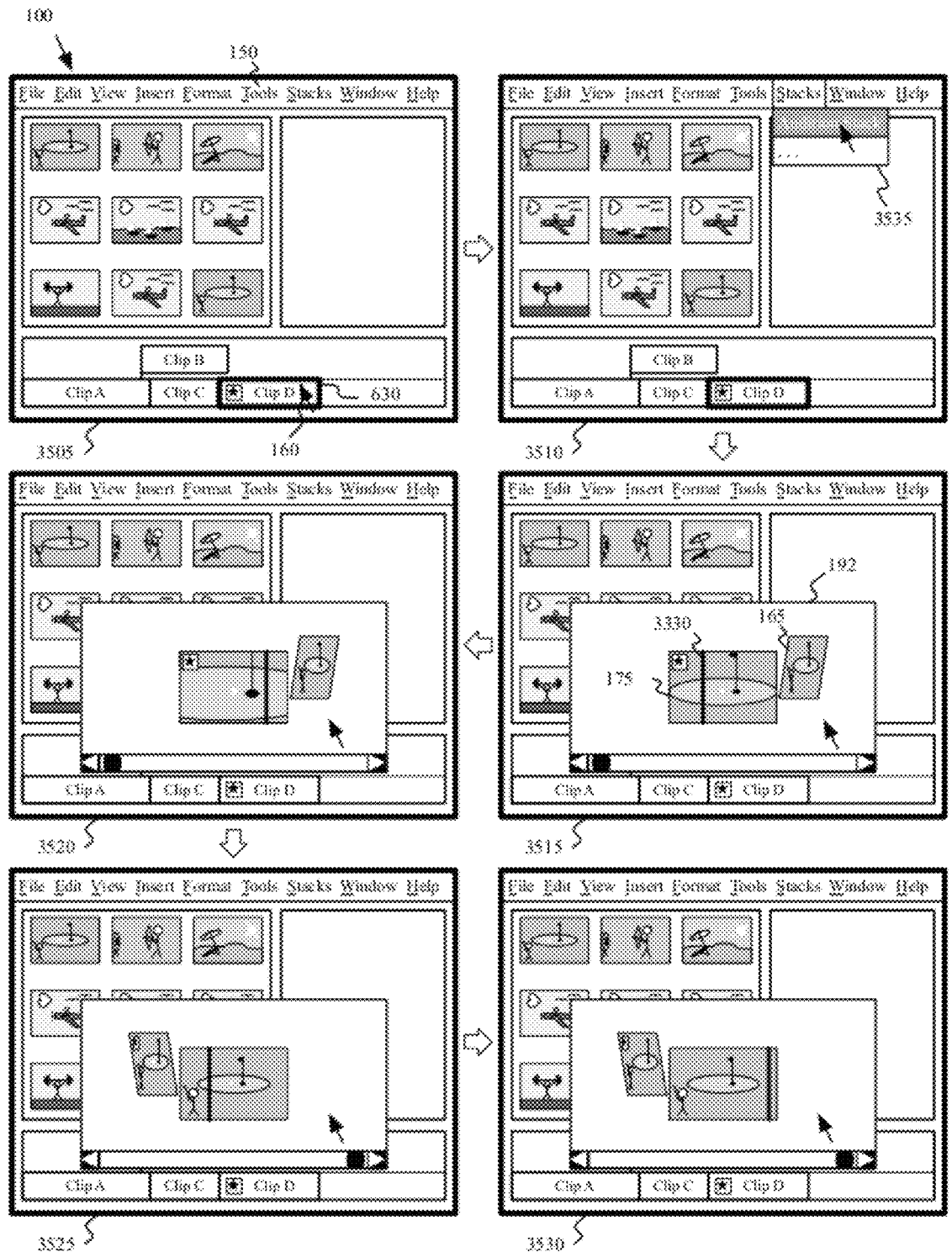
FIG. 35 illustrates automatically previewing an audition set using the GUI of FIG. 1 according to some embodiments of the invention.
Figure 36:
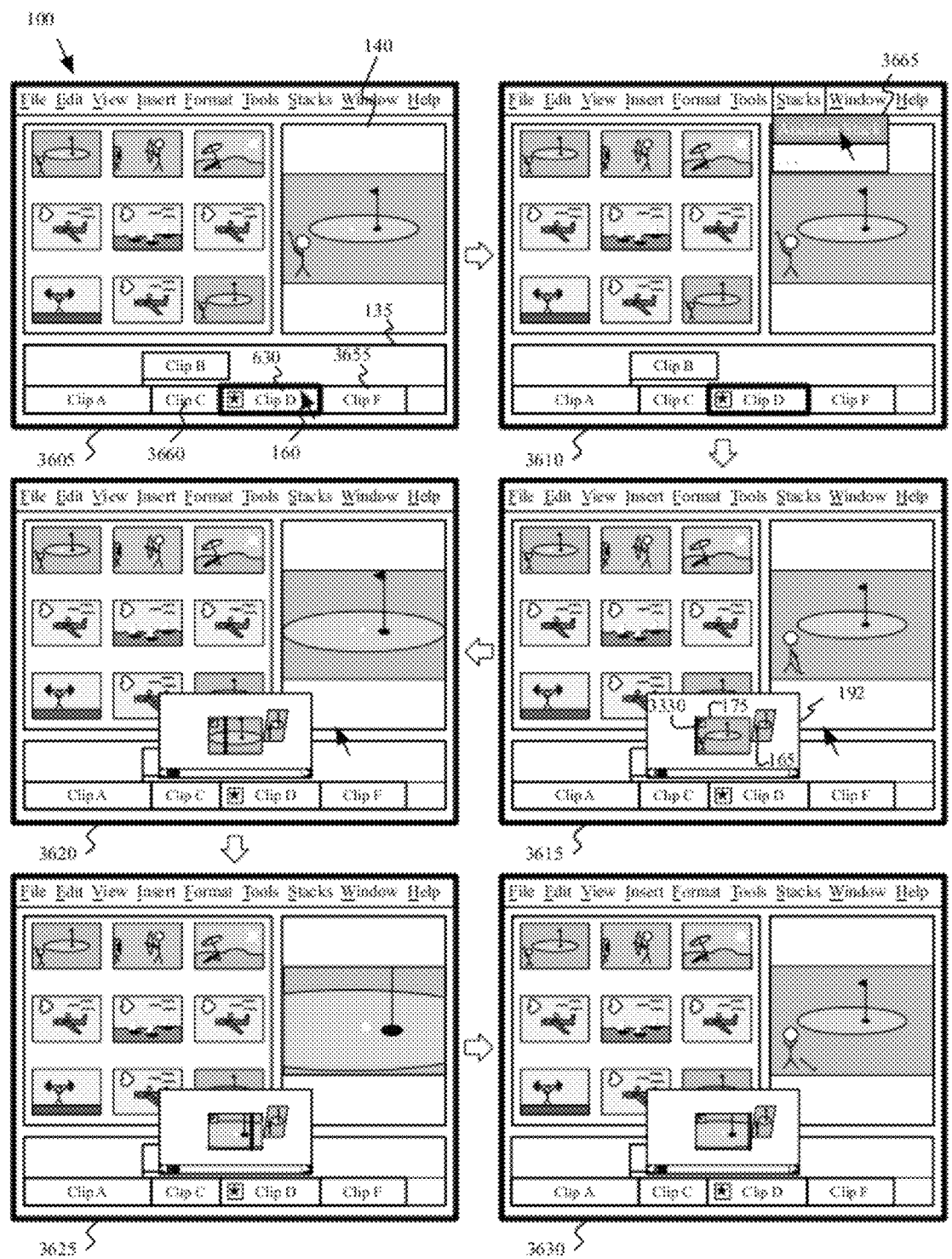
FIGS. 36 and 37 illustrate auditioning an audition set using the GUI of FIG. 1 according to some embodiments of the invention.
Figure 37:
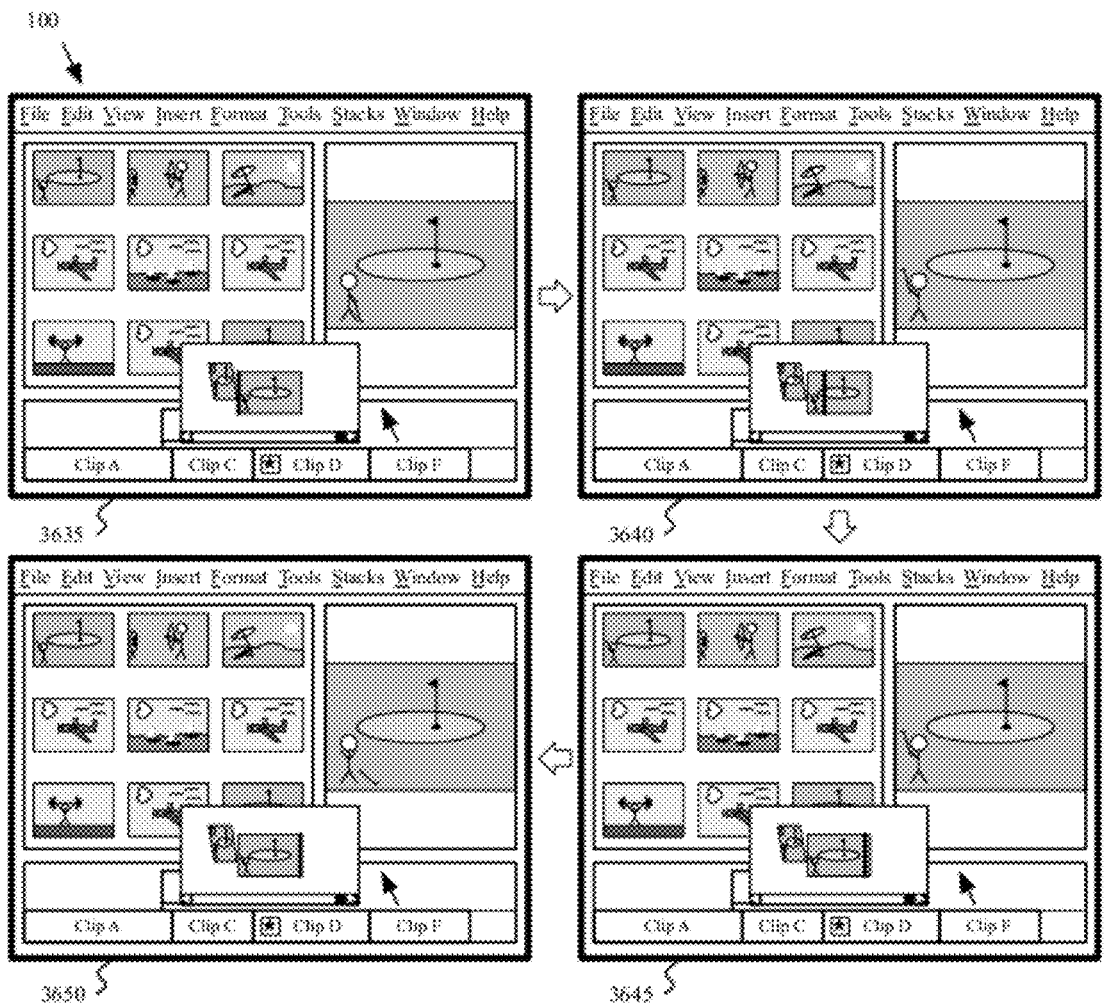

As mentioned above, the media editing application of some embodiments enables the user to preview a media clip in an audition set. That is, within the thumbnail representation of the media clip shown in the selection area, the media editing application plays the content of the media clip. The following figures illustrate examples of such a previewing feature provided by some embodiments. In particular, FIG. 34 illustrates an example of a manual previewing feature and FIGS. 35-37 illustrate several examples of an automatic previewing feature.

Figure 34:
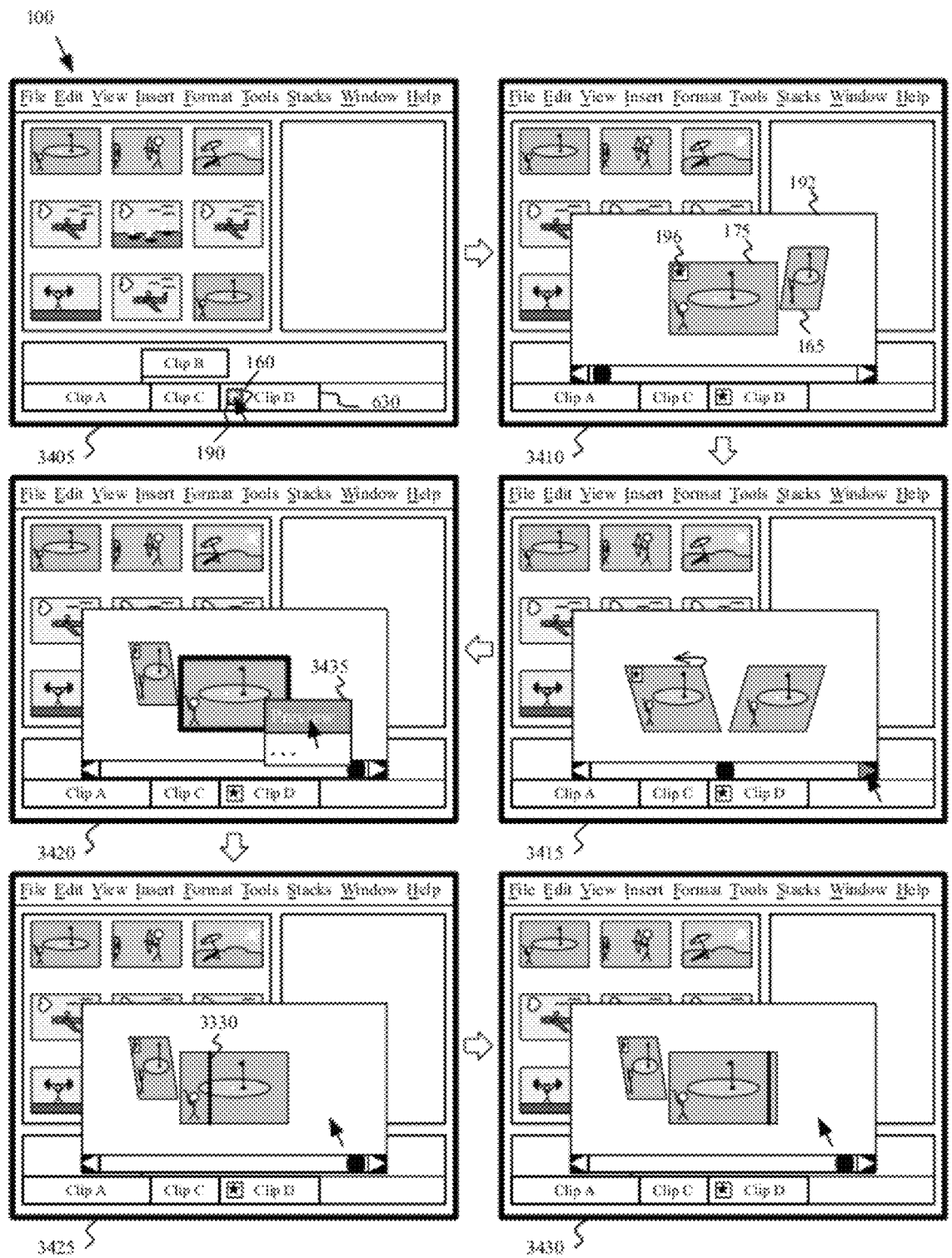
FIG. 34 illustrates manually previewing a media clip in an audition set using the GUI of FIG. 1 according to some embodiments of the invention.

As stated, FIG. 34 illustrates the manual preview of a media clip in an audition set according to some embodiments of the invention. This figure illustrates the GUI 100 at six different stages 3405-3430 that show a preview of a media clip of the audition set 630 in the selection area 192.

The first three stages 3405-3415 are the same as the first three stages 3105-3115, respectively, as illustrated in FIG. 31. These stages show a selection of the user selectable UI item 190 to invoke the display of the selection area 192 and the user scrolling through the media clips to place the media clip 165 in the selection area 192. With the media clip 165 located in the center of the selection area 192, the user of the media editing application selects the media clip (e.g., through a click operation such as a cursor click or a touch click). In this example, the media content of the media clip 165 is a video of a golf ball rolling towards a hole after a golfer has hit the golf ball.

At the fourth stage 3420, the GUI 100 displays a menu 3435 that includes a user selectable "Preview" option and other user selectable options (not shown). Selection of the "Preview" option invokes a preview of a selected media clip in the selection area 192 (the media clip 165 in this example). Some embodiments automatically display the menu 3435 when the user selects a media clip in the selection area 192 in a particular manner (e.g., through a particular option such as a right click or specific touchscreen operation). However, some embodiments provide other ways to invoke the menu 3435. For instance, some such embodiments allow the user to invoke the menu 3435 using a hotkey, a keystroke, a series of keystrokes, a combination of keystrokes, or any other appropriate method to invoke a menu. As shown, the fourth stage 3420 illustrates the selection of the "Preview" option through a click operation using the cursor 160. The media editing application starts previewing the media clip 165 shortly after the selection of the "Preview" option.

The fifth stage 3425 illustrates the GUI 100 as the media editing application previews the media clip 165 in the selection area 192. As mentioned above, the horizontal position of the playhead 3330 along the media clip 165 indicates the chronological position of the media content of the media clip 165 presently displayed (i.e., how far in the duration of the media clip the presently displayed video frame is located). The media content of the media clip 165 displayed within the media clip 165 shows the golf ball rolling closer to the hole.

The sixth stage 3430 illustrates the GUI 100 at a later time as the preview of the media clip 165 is nearly complete. As such, the GUI 100 now displays the playhead 3330 at a position closer to the right side of the media clip 165 than in the previous stage 3425. The frame of the video clip 165 displayed within the graphical representation of the media clip shows the golf ball about the roll into the hole.

FIG. 34 illustrates the manual preview of a particular single media clip in an audition set. In addition, some embodiments provide a feature that automatically previews each of the media clips in an audition set in order to allow the user to see how each of the media clips will appear in the composite presentation. The following FIGS. 35-37 conceptually illustrate different examples of such an automatic previewing feature.

FIG. 35 illustrates automatically previewing an audition set using the GUI 100 according to some embodiments of the invention. Specifically, this figure illustrates the GUI 100 at six different stages 3505-3530 that show the automatic preview of the media clips in the audition set 630.

In this example, the user previews two different candidate shots (the media clip 165 and 175) of one scene for inclusion in the composite presentation. Specifically, the media content of the media clip 175 shows a golf ball rolling towards a hole, after a golfer has hit the golf ball, with the camera gradually zooming in on the hole as the golf ball rolls towards the hole. The media content of the media clip 165 shows a similar scene except that the shot does not zoom in on the hole.

The first stage 3505, in this example, continues from the last stage 620 shown in FIG. 6, at which the audition set 630 was created. This stage of the GUI 100 illustrates the selection of the audition set 630 through a click operation using the cursor 160, as indicated by the bolding of the border of the audition set 630.

At the second stage 3510, the GUI 100 displays a menu 3535 that includes a user selectable "Audition Stack" option along with other user selectable options (not shown). Selection of the "Audition Stack" option invokes the automatic previewing of the media clips in a selected audition set. Some embodiments display the menu 3535 when the user selects the "Stacks" option in the menu bar 150 through a click operation (e.g., a cursor click operation, a touch click operation, etc.). Some embodiments also provide other ways to invoke the menu 3535. For example, some such embodiments allow the user to invoke the menu 3535 using a hotkey, a keystroke, a series of keystrokes, a combination of keystrokes, or any other method to invoke a menu. As shown, the second stage 3510 also illustrates the user selecting the "Audition Stack" option through a click operation using the cursor 160. The media editing application automatically starts the previewing of the media clips of the audition set 630 shortly after the selection of the "Audition Stack" option.

The third stage 3515 illustrates the GUI 100 during the preview of the media clip 175. As shown, the GUI 100 displays the selection area 192, which displays the media clips 165 and 175 of the audition set 630. When the user selects the "Audition Stack" option, some embodiments automatically open the selection area to preview the different media clips in the selected audition set. At this stage, the playhead 3330 is positioned approximately a third of the way through the media clip 175. As mentioned above, the horizontal position of the playhead 3330 along the media clip 175 indicates the chronological position in the media clip of the media content (e.g., video image) presently displayed. The frame of media clip 175 presently displayed within the thumbnail representation shows the scene mentioned above, with the camera zoomed in on hole and the golf ball rolling closer towards the hole.

The fourth stage 3520 illustrates the GUI 100 further along the preview of the media clip 175. At this stage the playhead 3330 is now positioned closer to the right side of the media clip 175 than in the previous stage 3515. In addition, the video image displayed within the representation of media clip 175 shows the scene further zoomed in on the hole with the golf ball closer to the hole. After completion of the preview of the media clip 175, the media editing application automatically starts the preview of the next media clip (the media clip 165) in the selection area 192.

At the fifth stage 3525, the GUI 100 is now previewing the media clip 165. Similar to media clip 175 in the previous stages, the playhead 3330 is positioned on the media clip 165 to indicate the chronological position in the media clip 165 of the presently displayed video image. As shown, the image displayed within the media clip 165 shows the golf ball rolling towards the hole after the golfer has hit the golf ball. In this media clip, the camera does not zoom in on the golf ball.

The sixth stage 3530 illustrates the GUI 100 further along the preview of the media clip 165. At this stage the playhead 3330 is now positioned closer to the right side of the media clip 165 than in the previous stage 3525. In addition, the video image displayed within the representation of media clip 165 shows the golf ball closer to the hole. As the audition set 630 only includes two media clips (clips 165 and 175), after completing the preview of the second media clip the preview is complete. Some embodiments automatically close the selection area after completing the preview.

In the preview shown in FIG. 35, the media editing application illustrates each of the media clips of an audition set previewed once. Some embodiments terminate the automatic preview feature after each of the media clips have been previewed once, while other embodiments continue to cycle through and automatically preview the media clips until an event occurs. Examples of such events include user input to stop the automatic previewing, a threshold number of cycles through the clips being reached, or a time limit being reached.

FIGS. 36 and 37 illustrate an example of a different automatic previewing feature of some embodiments that plays each clip in an audition set with a pre-roll and post-roll. FIGS. 36 and 37 illustrate the GUI 100 at ten different stages 3605-3650 that show the automatic previewing of the media clips in the audition set 630 with the pre-roll and post-roll feature in the preview area of the GUI 100.

When previewing a media clip, some embodiments include a portion of the composite presentation immediately preceding the media clip (also referred to as "pre-roll") and immediately following the media clip (also referred to as "post-roll"). In this manner, the user can view the transitions before and after the media clip to give context to the user with which to evaluate each media clip in the audition set at the location in the composite presentation of the audition set. Some embodiments specify these portions in terms of an amount of time (e.g., 10 seconds, 20 second, 30 seconds, etc.) that may be defined by default or by the user through a preference settings option of the media editing application. As in FIG. 35, the user in this example previews two different candidate shots (the media clips 165 and 175) of one scene for inclusion in the composite presentation.

Referring back to FIG. 36, the first stage 3605 shows the GUI 100 at a stage similar to the stage 620, after the creation of the audition set 630, except that the composite presentation displayed in the composite display area 135 also includes a media clip 3655 placed after the audition set 630. This stage illustrates the selection of the audition set 630 through a click operation using the cursor 160.

At the second stage 3610, the GUI 100 displays a menu 3665 that includes a user selectable "Audition Stack" option along with other user selectable options (not shown). The menu 3665 is similar to the menu 3535 except that the "Audition Stack" option invokes an automatic previewing of the media clips in the audition set 630 with the pre-roll and post-roll clip portions described above. In addition, unlike in FIG. 35, the media editing application displays the preview in the preview display area 140 as well as the selection area 192. As shown, the second stage 3610 also illustrates the user selecting the "Audition Stack" option through a click operation using the cursor 160.

The third stage 3615 of the GUI 100 illustrates the display of the pre-roll for the preview of the media clip 175 in the audition set 630. In particular, the preview display area 140 displays the pre-roll (e.g., an end portion of the media content of the media clip 3660), which shows the golfer before hitting the golf ball towards the hole. The GUI 100 also now displays the selection area 192. In some embodiments, as shown, the media editing application displays the selection area 192 shortly after the selection of the "Audition Stack" option.

As shown, the media editing application displays the playhead 3330 over the representation of media clip 175 in the selection area 192. As mentioned above, the horizontal position of the playhead 3330 along the media clip 175 indicates the chronological position of the currently displayed video image within the media clip 175. Because the current video image is from the pre-roll rather than the media clip 175 itself, the playhead 3330 is positioned at the left side of the media clip 175 and the first video image of the media clip 175 is displayed within the its thumbnail representation.

As mentioned above, some embodiments allow the user to move or resize the selection area. In this example, the user has resized (i.e., decreased the size) the selection area 192 so that it does not obstruct the preview display area 140. In some cases, the user might move the selection area rather than resizing it. Some embodiments, on the other hand, do not display the selection area during the automatic previewing of the media clips in the audition set, or automatically modify the size or location of the selection area so that the preview display area remains unobstructed.

In the fourth stage 3620, the preview of the pre-roll has finished and the GUI 100 displays the preview of media clip 175. As shown, the preview display area 140 displays a zoomed-in video image of the hole as the golf ball rolls towards it. Since the preview now shows the media content of the media clip 175, the media editing application displays the same video image within the thumbnail representation of the media clip 175 in the selection area 192. In addition, the position of the playhead 3330 displayed on the media clip 175 corresponds to the chronological position of this video image in the media clip 175.

The fifth stage 3625 illustrates the GUI 100 further along the preview of the media clip 175. At this stage, the playhead 3330 is now positioned closer to the right side of the media clip 175 than in the previous stage 3620. In addition, the video image displayed within the representation of media clip 175 shows the scene further zoomed in on the hole with the golf ball closer to the hole.

At the sixth stage 3630, the GUI 100 now displays the post-roll for the preview of the media clip 175, having completed the preview of the media clip itself. Thus, the preview display area 140 now displays a video image from the beginning portion of the media clip 3655, which shows the golfer's reaction to the golf ball rolling into the hole. Similar to during the preview of the pre-roll, the playhead 3330 is positioned at the right side of the media clip 175 and the last frame of the media clip 175 is displayed within its thumbnail representation in selection area 192.

The seventh stage 3635 illustrated in FIG. 37 shows the GUI 100 after the media editing application has completed the post-roll for the media clip 175 and started the preview of the media clip 165. Because the media clip 165 is a candidate for the same position in the composite presentation as the media clip 175, at this stage the media editing application displays the same pre-roll as displayed for the media clip 175. As such, the GUI 100 displays the same video image in preview display area 140 as at stage 3615.

At the eighth stage 3640, the preview of the pre-roll has finished again and the GUI 100 displays the preview of media clip 165. As shown, the preview display area 140 displays the golf ball rolling towards the hole. Since the preview now shows the media content of the media clip 165, the media editing application displays the same video image within the thumbnail representation of the media clip 165 in the selection area 192. In addition, the position of the playhead 3330 displayed on the representation of media clip 165 corresponds to the chronological position of this video image in the media clip 165.

The ninth stage 3645 illustrates the GUI 100 further along the preview of the media clip 165. At this stage, the playhead 3330 is now positioned closer to the right side of the media clip 165 than in the previous stage 3640. In addition, the video image displayed in the preview display area 140 (and within the clip representation for media clip 165) shows the scene with the golf ball closer to the hole.

At the tenth stage 3650, the GUI 100 now displays the post-roll for the preview of the media clip 165, having completed the preview of the media clip itself. Because the media clip 165 is a candidate for the same position in the composite presentation as the media clip 175, at this stage the media editing application displays the same post-roll as displayed for the media clip 175. As such, the GUI 100 displays the same video image in preview display area 140 as at stage 3630.

FIGS. 36 and 37 illustrate automatically previewing media clips in an audition set with the pre-roll and post-roll features and displaying the preview in the preview display area 140. However, the automatic preview does not necessarily have to include all of these features. For example, some embodiments may display the preview in the preview display area 140 but do not preview the pre-roll and post-roll. Other embodiments may include different combinations of these features in implementing the automatic previewing. Moreover, for the manual previewing of a media clip that was described above by reference to FIG. 34, some embodiments utilize one or more of these features (e.g., the pre- and post-roll, the preview display area, etc.).

Figure 38:
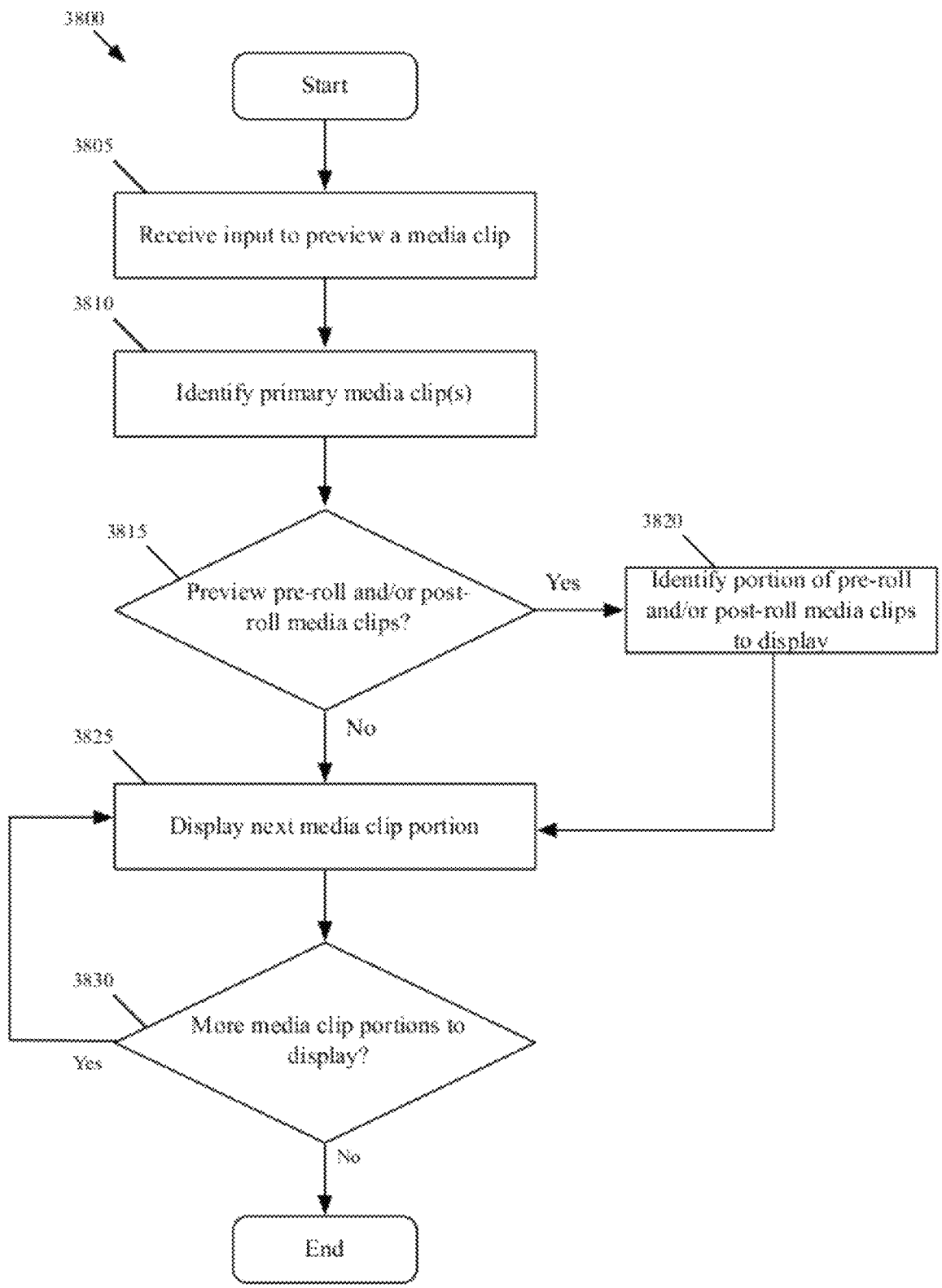
FIG. 38 conceptually illustrates a process of some embodiments for previewing a media clip.

The preceding figures illustrate several examples of previewing media clips in a selection area of some embodiments. FIG. 38 conceptually illustrates a process 3800 of some embodiments for previewing a media clip. As shown, the process 3800 begins by receiving (at 3805) input to preview a media clip. The input can be received from a selection of an option from a pop-up menu in some embodiments, as illustrated in FIG. 34. Some embodiments receive the input from a selection of an option from pull-down menu, as shown in FIGS. 35 and 36. The selection input may be from a cursor controller (e.g., a click input), through a touchscreen (e.g., touching a menu option), from a keyboard, etc.

Next, the process 3800 identifies (at 3810) the primary media clip or clips to preview. The primary media clip in some embodiments is a media clip that is selected through a selection area, as shown in FIG. 34. In some embodiments, the primary media clip is automatically selected by a media editing application when a user invokes an automatic previewing feature, such as those shown in FIGS. 35 and 36. As mentioned above, a media clip of some embodiments can be video clips, audio clips, audio and video clips, sequences of media clips, effect clips, etc. When the identified media clip is a sequence of more than one media clip, the process identifies the multiple media clips in the sequence.

The process 3800 then determines (at 3815) whether to preview a pre-roll and/or post-roll media clip portion. As described above, some embodiments preview media clips without a pre-roll or a post-roll while some embodiments preview media clips with such features in order to allow the user to view the transitions before and after the primary media clip. When the process determines to include the pre-roll and post-roll clip portions in the preview, the process 3800 identifies (at 3820) a portion of the pre-roll and/or post-roll media clip to display. As previously mentioned, some embodiments use a defined amount of time (e.g., 10 seconds, 20 seconds, 30 seconds, etc.) for the portion of the pre-roll and/or post-roll. For the pre-roll media clip portion, the process uses the out point of the preceding media clip and the defined amount of time to identify a portion of a source media file to play as the pre-roll. For the post-roll portion, the process uses the in point of the following media clip and the defined amount of time to identify a portion of a source media file to play as the post-roll.

Next, the process 3800 displays (at 3825) a next media clip portion. The media clip portion may be a pre-roll portion, a primary media clip, or a post-roll portion. When a pre-roll is used, the process first displays the pre-roll clip portion. Otherwise, the process displays the first primary media clip. As noted above, when the media clip is a sequence, there may be multiple primary media clips that are subsequently displayed.

As shown in FIGS. 34-37, some embodiments display the clip portion in a selection area and/or separate preview display area of a GUI in some embodiments. To display a media clip, the process 3800 of some embodiments accesses the media clip's data structure to identify in and out points in a source file and retrieves video images from the media clip's source file based on the in and out points.

The process 3800 then determines (at 3830) whether any more media clip portions remain for display. When more media clips remain, the process 3800 returns to 3825 to display the next media clip portion. As discussed, the process may cycle through 3825 multiple times to display the pre-roll clip portion, one or more primary media clips, and the post-roll clip portion. Once the process displays all of the media clips, the process 3800 ends.

As described above, some embodiments preview each media clip in an audition set, either with or without the pre-roll and post-roll. In such a situation, some embodiments perform process 3800 for each of the media clips in the audition set.

Many of the examples illustrated above in this section describe different techniques (e.g., skimming, previewing, previewing with pre-roll and/or post-roll, etc.) that allow a user to examine and/or evaluate media clips in an audition set. In some embodiments, when the user has decided which of the media clips in the audition set the user would like to use at the location of the audition set in the composite presentation, the user can manually remove (e.g., using in any of the methods described above by reference to FIGS. 16 and 17) all the other media clips in the audition set except the media clip that the user wishes to use in the composite presentation. When the audition set only contains the desired media clip, the user can delete the audition set and the desired media clip replaces the audition set at the location of the audition set in the composite presentation. In addition, some embodiments allow the user to automatically delete the audition set, as described in detail below.

D. State Diagram for GUI with Selection Area

Figure 39:
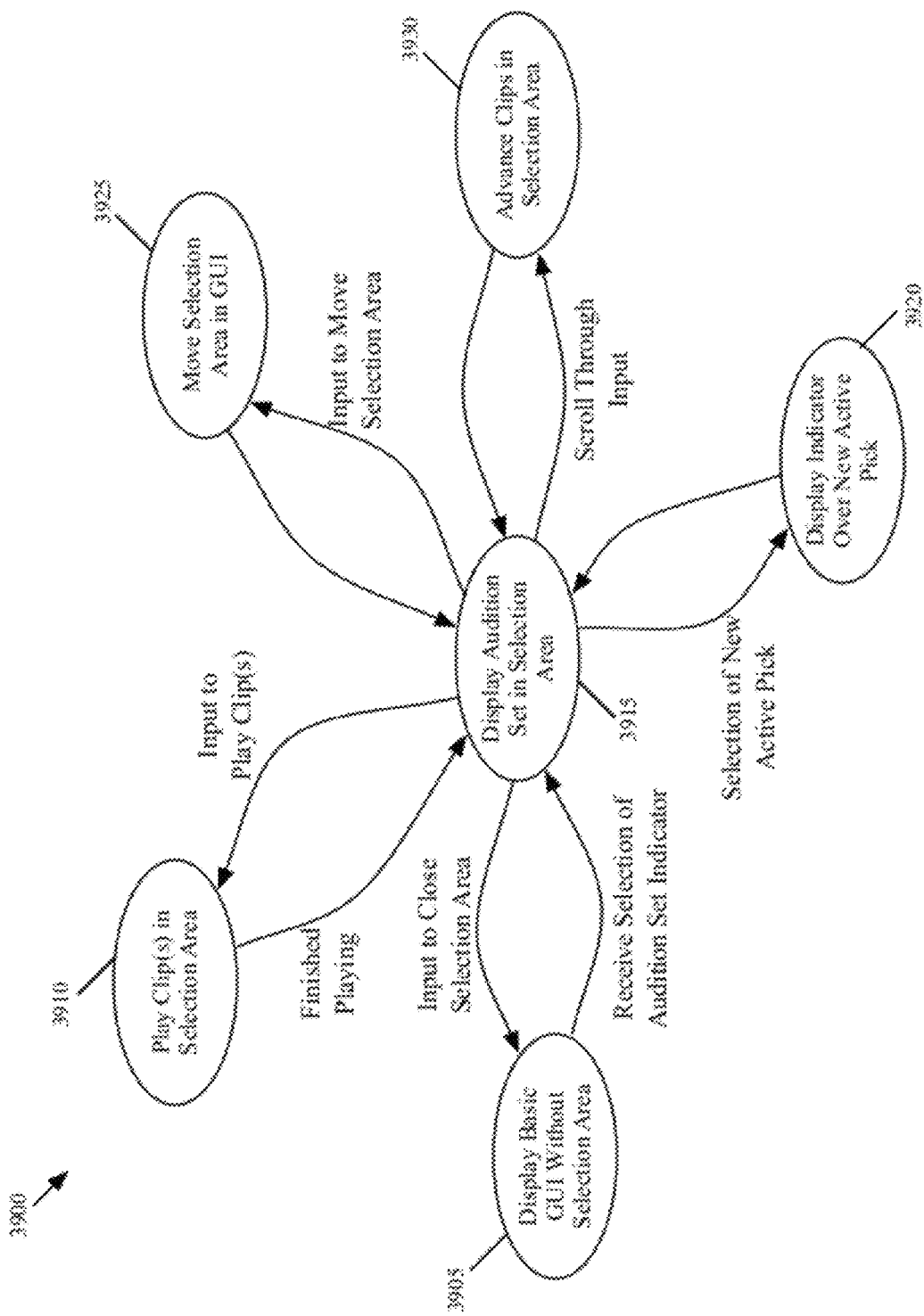
FIG. 39 conceptually illustrates a state diagram that shows the various states and transitions between those states for a GUI of a media editing application in some embodiments.

The examples discussed above in this section describe various user interactions with a GUI of a media editing application of some embodiments. FIG. 39 conceptually illustrates a state diagram 3900 that shows various states and transitions between those states for the GUI 100 of a media editing application of some embodiments. Specifically, FIG. 39 illustrates various states and transitions for the GUI 100 of some embodiments for user interaction with a selection area that displays an audition set. One of ordinary skill in the art will recognize that the various actions represented by states and transitions of FIG. 39 are only a subset of the possible actions that can be performed in the GUI 100 of some embodiments.

As shown in this figure, the media editing application displays the GUI 100 without a selection area (at 3905). The last stage 620 shown in FIG. 6 illustrates an example of the display of a GUI of some embodiments in this state.

As shown in the stage 620 of FIG. 6, the GUI may display an audition set in the composite display area without displaying a selection area. At this stage, the GUI only displays the graphical representation of the active pick in the composite display area. However, the user may wish to view the media clips in the audition set. In such cases, the user selects the user selectable audition set UI item (e.g., item 190) to invoke the display of the selection area. When the user performs the selection, the GUI transitions to state 3915 to display the media clips in the audition set within the selection area. With the GUI in the state 3915, the user can close the selection area by selecting the audition set UI item (e.g., by using a click control, such as a cursor click control or a touch click control, a hotkey, a keystroke, a series of keystrokes, a combination of keystrokes, an option selected from a pop-up or pull-down menu, etc.), at which point the GUI 100 transitions back to the state 3905 and no longer displays the selection area.

At the state 3915, the GUI displays the selection area. One example of such a GUI state is the GUI 100 at the fourth stage 120 of FIG. 1. In this stage, the selection area 192 displays the media clips 165-175, which are the candidate media clips for inclusion at a particular location in a composite display area.

When the GUI is in the state 3915, the user can scroll through the media clips that are displayed in the selection area. The user may use scroll arrows displayed in the selection area (e.g., by clicking a cursor controller with the cursor over the scroll arrow, by touching the scroll arrow, etc.) or may use other scroll input (e.g., swipes on a touchscreen or touchpad, using a scroll wheel on a mouse, a hotkey or series of keystrokes, etc.). When the user provides such scroll input, the GUI transition to state 3930

At the state 3930, the GUI of some embodiments modifies the layout of the media clips displayed in the selection area based on the scroll input. For instance, when the user provides a scroll-left input, the GUI scrolls through the media clips displayed in the selection area to the left a particular amount. Similarly, when the user provides a scroll-right input, the GUI scrolls the media clips displayed in the selection area to the right a particular amount. Stages 3110-3120 of FIG. 31 illustrate an example of scrolling through media clips in the selection area. As illustrated here, some embodiments animate the scrolling between media clips. When the user has stopped entering scroll input, the GUI 100 transitions back to the state 3915.

Through the selection area that the GUI of some embodiments displays in the state 3915, the user can select a new active pick of the audition set displayed in the selection area (e.g., by using a click operation with a cursor controller, touchscreen, etc., by using keyboard input such as a hotkey, keystroke, series of keystrokes, combination of keystrokes, etc., by selecting an option from a pop-up or pull-down menu, etc.). When the user provides such input, the GUI transitions to state 3920. At this state, the GUI displays an indicator (e.g., the indicator 196 as shown in FIG. 1) on the newly selected active pick. With the indicator displayed in the graphical representation of the new active pick, the GUI returns to the state 3915.

The user can also move the selection area when the GUI 100 is in the state 3915. FIG. 30 shows one method for the user to provide input to move the selection area 192 of some embodiments by selecting an open area of the selection area and moving it (e.g., with a cursor, through a touchscreen, etc.). When the user provides input to move the selection area, the GUI transitions to state 3925. At this state, the GUI modifies the position of the selection area based on the input provided by the user. When the user has stopped providing input to move the selection area (e.g., the user has completed a click-and-drag operation on the selection area), the GUI 100 transitions back to the state 3915.

A user may also preview one or more media clips displayed in the selection area. When the user provides input to play a media clip (e.g., by selecting a drop-down or pop-up menu option through a cursor controller or touchscreen, by typing a hotkey or set of keystrokes, etc.), the GUI 100 transitions to state 3910. The stages 3420-3430 illustrated in FIG. 34 show one example of previewing a media clip in the selection area of some embodiments. Some embodiments perform process 3800 at state 3910 in order to play a media clip.

One of ordinary skill will recognize that the examples shown in the preceding section are merely one illustration of how the media editing application of some embodiments displays the media clips of an audition set in a selection area. For instance, other information could be displayed along with the media clips, such as media clips names, media clip durations, etc.

In addition, the transitions between states of the GUI 100 need not be limited to those shown in FIG. 39. For instance, some embodiments include a transition from the state 3920 to the state 3905 when a user selects a new active pick. In other words, selecting a new active pick through the selection area of some embodiments causes the selection area to close (i.e., the GUI 100 no longer displays the selection area). Furthermore, as shown above, some embodiments allow the user to skim through a media clip at a different state of the GUI.

III. Editing an Audition Set

The media editing application of some embodiments provides users with the ability to perform a variety of edit operations in order to create a composite media presentation. Examples of such edit operations include trim operations (e.g., ripple, roll, slip, and slide operations), move operations, add and delete operations, etc. as well as keyword operations, marker operations, and other operations that simplify the editing process without actually modifying the composite presentation. In some embodiments, these operations may not only be performed on individual media clips but also applied to audition sets.

A. Operations to Edit an Audition Set

One type of edit for media clips involves moving a media clip within the composite display area. As with a media clip, users can also move an audition set within the composite display area in some embodiments. As described above, some embodiments treat the active pick of an audition set as part of the composite presentation. In some such embodiments, when a user moves an audition set within the composite display area, the media editing application moves the active pick of the audition set within the composite presentation.

Figure 40:
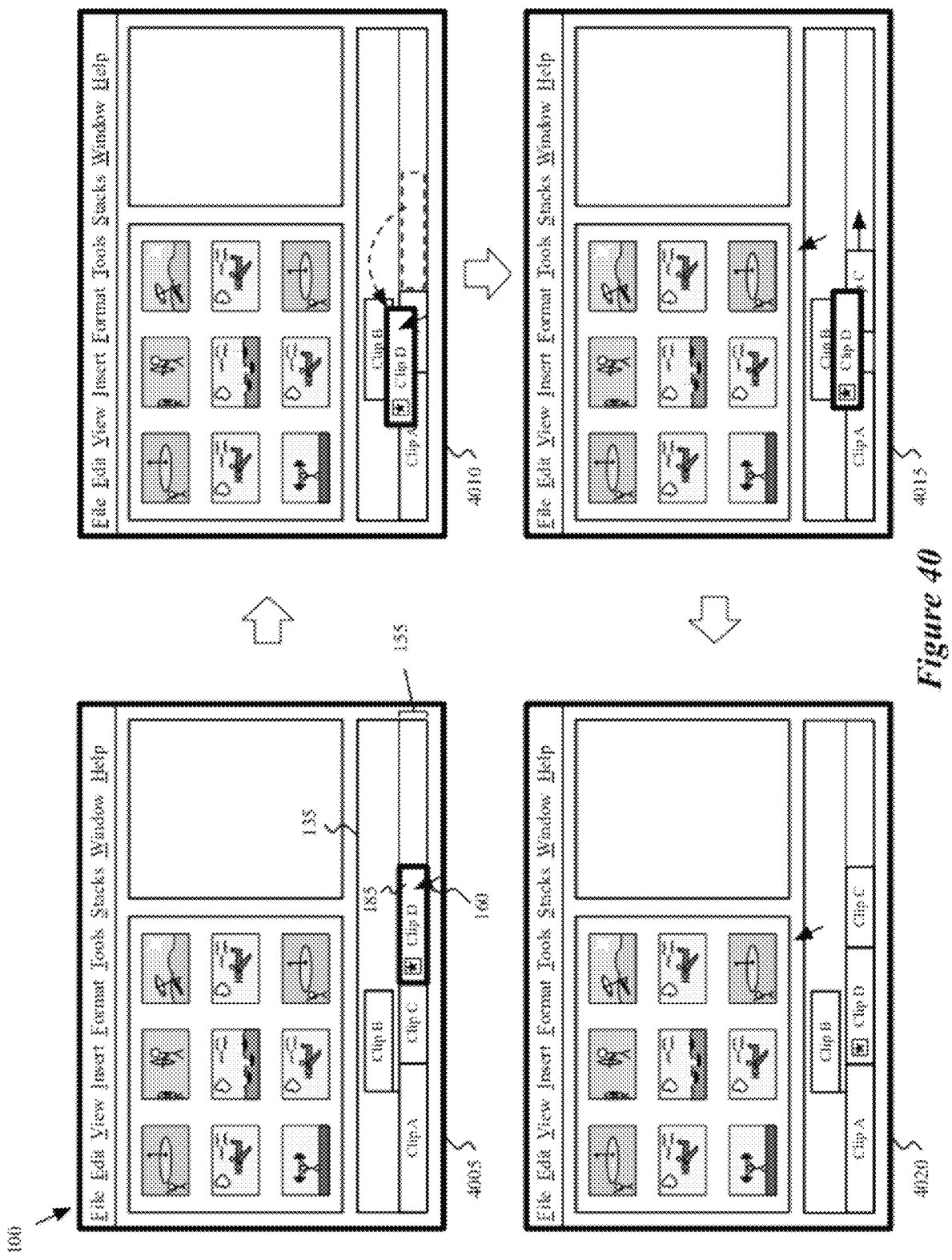
FIG. 40 illustrates moving an audition set within a composite display area using the GUI of FIG. 1 according to of some embodiments of the invention.
Figure 41:
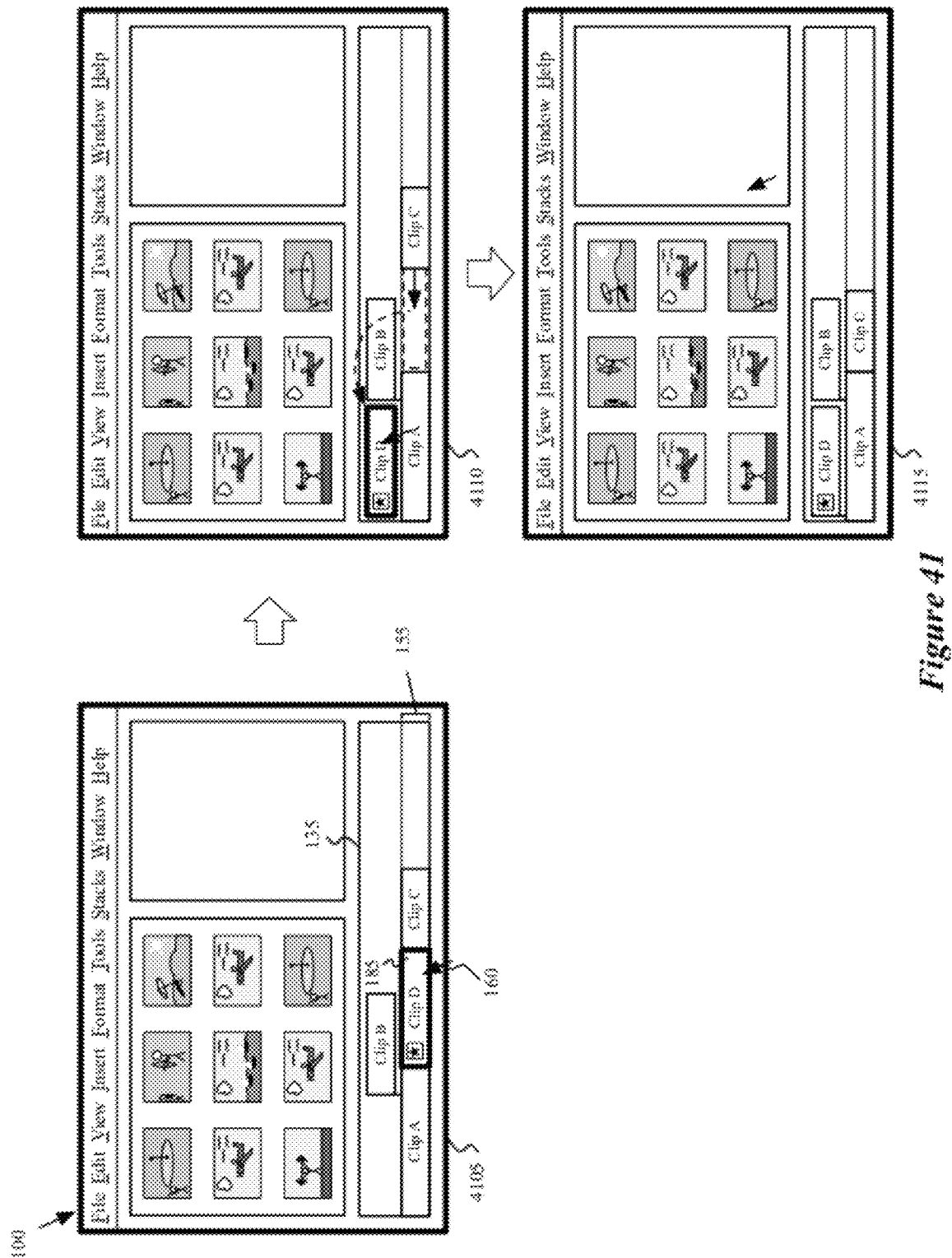
FIG. 41 illustrates moving an audition set within a composite display area using the GUI of FIG. 1 according to of some embodiments of the invention.
Figure 42:
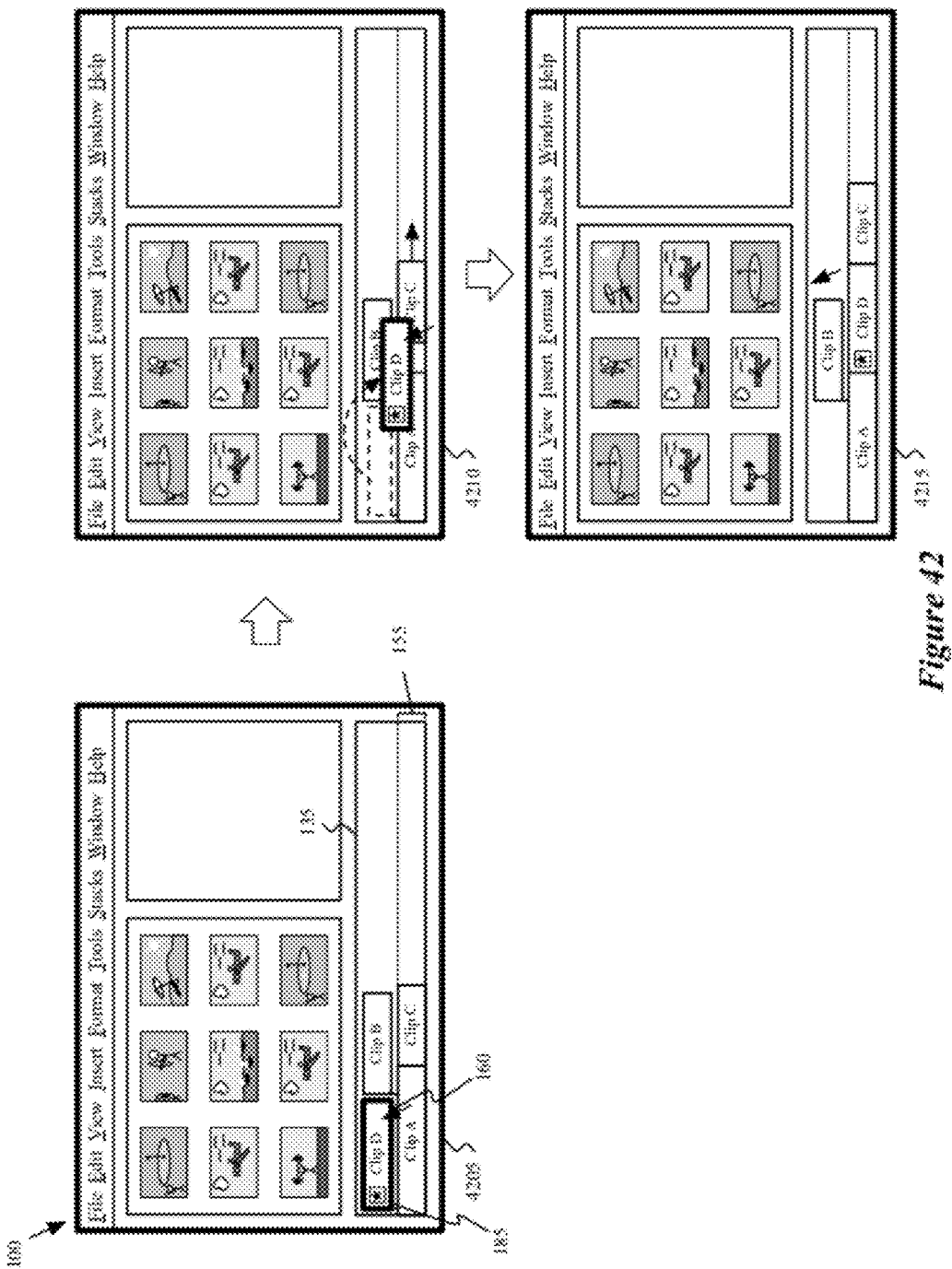
FIG. 42 illustrates moving an audition set within a composite display area using the GUI of FIG. 1 according to of some embodiments of the invention.

The following FIGS. 40-42 illustrate various examples of a user moving an audition set within the composite display area 135 in order to modify a composite presentation to which the active pick of the audition set belongs. FIG. 40 illustrates an example of the movement of an audition set within the central compositing lane 155 of the composite display area 135. In particular, FIG. 40 illustrates the GUI 100 at four different stages 4005-4020 in which a user moves the audition set 185 from a first location to a second location in the timeline of the composite presentation.

At the first stage 4005, the GUI 100 displays the audition set 185 at a particular location in the composite display area 135 after a media clip C in the central compositing lane 155. The creation of audition set 185 was illustrated in FIG. 1. At this stage, the user selects the audition set 185 through a click operation using the cursor 160. The GUI 100 indicates this selection by bolding the border of the representation of audition set 185 in the composite display area.

The second stage 4010 illustrates the user moving the audition set 185 through a click-and-drag operation using the cursor 160 from its location after media clip C to a new location in the central compositing lane 155 between media clip A and media clip C. In various embodiments, the user may perform such a movement with a cursor controller, through a touchscreen, or using other input devices.

In the third stage 4015, the GUI 100 shows the media clip C moving to the right in order to create space for the audition set 185 in the central compositing lane 155 as the user places the audition set 185 between the media clips A and C. Some embodiments provide a feature that automatically moves abutting media clips in anticipation of a particular media clip being dropped between the abutting media clips. For instance, some such embodiments automatically move such clips when a particular media clip (or audition set) being moved by a user is within a threshold distance of an edge at which two media clips in the central compositing lane are abutting (i.e., an edit point within the central compositing lane). When the particular media clip is within the threshold distance of an edit point, the media editing application automatically moves the abutting media clips horizontally apart in order to create space for the user to place the particular media clip in the central compositing lane 155 at that location. The third stage 4015 illustrates an example of this automatic feature as an arrow indicates the automatic movement of the media clip C to the right to create space for the audition set 185 in the central compositing lane 155.

The fourth stage 4020 illustrates the GUI 100 after completion of the movement of the audition set 185 within the central compositing lane 155. As shown, the audition set 185 is now located between the media clips A and C in the composite display area 135. In terms of the composite presentation, the active pick of the audition set 185 is now chronologically after the media clip A and before the media clip C. While the media clip A remains in the same location as before the move, media clip C has been moved to a later time in the composite presentation. Some embodiments modify project data that defines the composite presentation to reflect this change as well as the change in media clip D's (the active pick of audition set 155) location in the timeline.

FIG. 40 illustrated a movement within the central compositing lane of the composite display area. Some embodiments allow the user to move media clips and/or audition sets freely between the central compositing lane and an anchor lane, between locations in the anchor lanes, etc. FIG. 41 illustrates an example of the movement of an audition set from the central compositing lane 155 to an anchor lane in the composite display area 135. This figure illustrates the GUI 100 at three different stages 4105-4115 that show the user moving the audition set 185 and anchoring the audition set to a media clip.

In this example, the first stage 4105 continues from the last stage 4020 of FIG. 40, as shown by the arrangement of the media clips in the composite display area 135 with audition set 185 between media clip A and media clip C in the central compositing lane 155. At this stage, the user selects the audition set 185 through a click operation using the cursor 160, as indicated by the bolding of the border of the representation of audition set 185.

The second stage 4110 shows the user moving the audition set 185 through a click-and-drag operation using the cursor 160 from its location between media clip A and media clip C to a new location in an anchor lane above clip A. In various embodiments, the user may perform such a movement with a cursor controller, through a touchscreen, or using other input devices. As mentioned above, some embodiments automatically move two abutting media clips apart when a user places a media clip in between the two abutting media clips. Similarly, some embodiments provide a feature that automatically moves two media clips together when a user removes another media clip located between the two media clips. Some such embodiments determine when a user has moved a particular media clip a threshold distance from its prior location in the central compositing lane 155. When the user moves the particular media clip beyond the threshold distance, the media editing application automatically moves the media clips abutting each side of the particular media clip together to fill the open space in the central compositing lane 155. The second stage 4110 illustrates this feature as an arrow indicates the automatic movement of the media clip C to the left to fill the open space left by the audition set 185.

The third stage 4115 illustrates the GUI 100 after completion of the movement of the audition set 185 from the central compositing lane 155 to an anchor lane in the composite display area 135. As shown, the audition set 185 is now anchored to the media clip A in an anchor lane of the composite display area 135. As described above, some embodiments anchor a particular media clip (or audition set) onto another media clip (or audition set) when the user moves the particular media clip within a threshold distance of the other media clip. In the composite presentation, the active pick of the audition set 185 (media clip D) is now positioned concurrently with a portion of the media clip A and the media clip C follows the media clip A. Some embodiments modify project data that defines to reflect the changes in the position of media clips C and D.

FIG. 42, on the other hand, illustrates an example of the movement of an audition set from a position in an anchor lane to a position in the central compositing lane of the composite display area. This figure illustrates the GUI 100 at three different stages 4205-4215 that show the user moving the audition set 185 from its position anchored to media clip A into a position in the central compositing lane 155.

In this example, the first stage 4205 continues from the last stage 4105 of FIG. 41, as shown by the arrangement of the media clips in the composite display area 135 with the audition set 185 anchored to media clip A. As shown in this stage of the GUI 100, the user selects the audition set 185 through a click operation using the cursor 160, as indicted by the bolding of the border of the audition set 185.

The second stage 4210 shows the user moving the audition set 185 through a click-and-drag operation using the cursor 160 from its location anchored to media clip A to a new location in the central compositing lane 155 between media clip A and media clip C. In various embodiments, the user may perform such a movement with a cursor controller, through a touchscreen, or using other input devices. As described above by reference to FIG. 40, some embodiments provide a feature that automatically moves abutting media clips in anticipation of a particular media clip being dropped between the abutting media clips. For instance, some such embodiments automatically move such clips when a particular media clip (or audition set) being moved by a user is within a threshold distance of an edge at which two media clips (or audition sets) in the central compositing lane are abutting (i.e., an edit point within the central compositing lane). When the particular media clip is within the threshold distance of an edit point, the media editing application automatically moves the abutting media clips horizontally apart in order to create space for the user to place the particular media clip in the central compositing lane 155 at that location. The second stage 4210 illustrates an example of this automatic feature as an arrow indicates the automatic movement of the media clip C to the right to create space for the audition set 185 in the central compositing lane 155.

The third stage 4215 illustrates the GUI 100 after completion of the movement of the audition set 185 from the anchor lane to the central compositing lane 155 in the composite display area 135. As shown, the audition set is no longer anchored to media clip A and instead sits between media clip A and media clip C in the central compositing lane 155. While the media clip A remains in the same location as before the move, media clip C has been moved to a later time in the composite presentation. Some embodiments modify project data that defines the composite presentation to reflect this change as well as the change in media clip D's (the active pick of audition set 155) location in the timeline.

The several examples discussed above describe moving an audition set to and from various positions in a composite display area of some embodiments by dragging the audition set within the composite display area. Other embodiments provide other ways to move the audition set. For instance, some such embodiments provide a cut and paste operation for moving the audition set to different places in the composite display area. Moreover, instead of moving an audition set within the composite display area, some embodiments allow a copy (e.g., duplicate) of the audition set to be made and placed in the composite display area.

Figure 43:
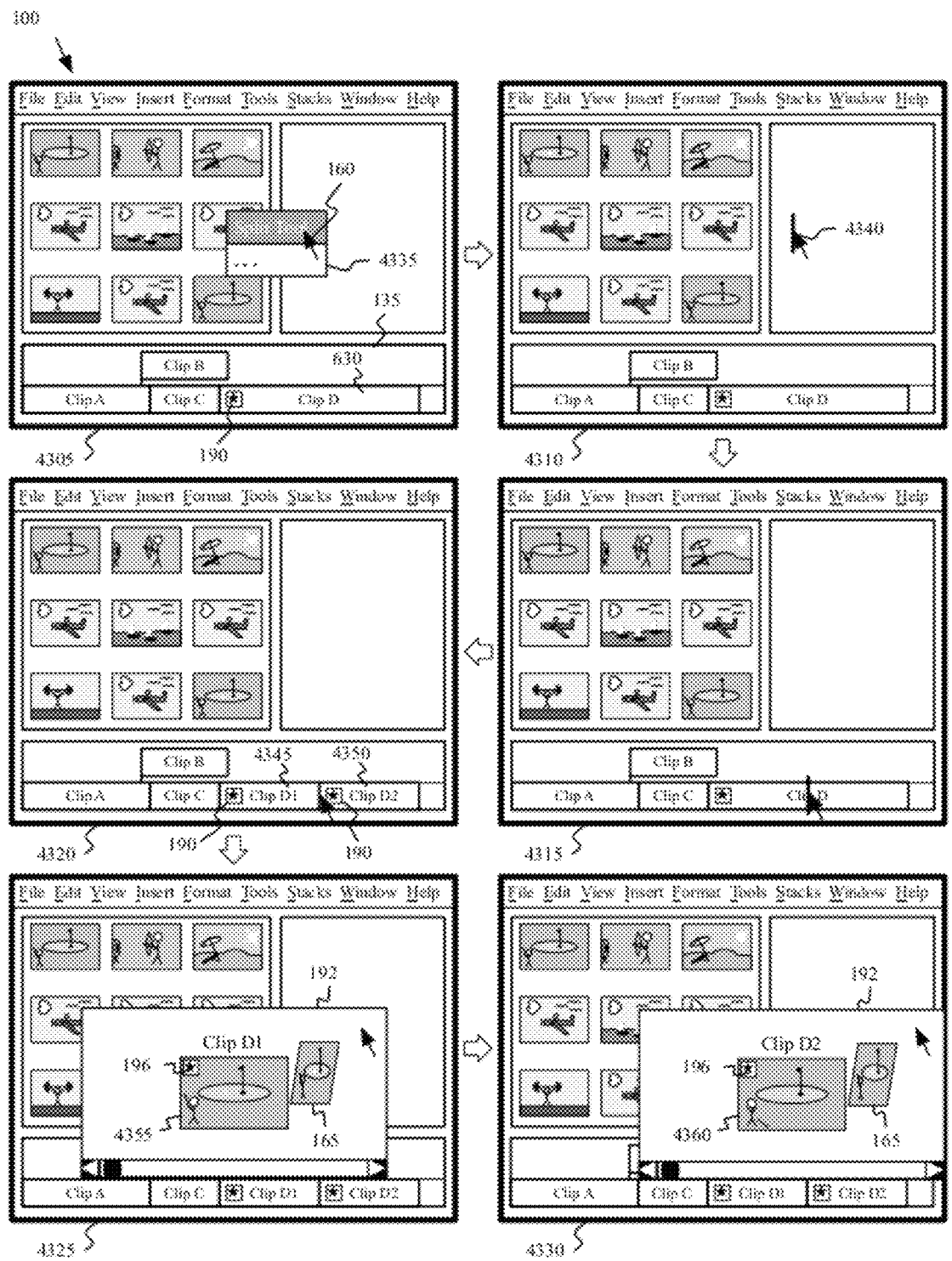
FIG. 43 illustrates splitting a media clip of an audition set using the GUI of FIG. 1 according to some embodiments of the invention.

Another edit operation that can be performed on an audition set in some embodiments is a split edit operation (also referred to as a cut edit operation, razor blading, blading, etc.). FIG. 43 illustrates a split edit operation performed on an audition set using the GUI 100 according to some embodiments of the invention. Specifically, this figure illustrates the GUI 100 at six different stages 4305-4330 that show a split edit operation of some embodiments performed on an audition set.

The GUI 100 in this figure continues from the last stage 620 illustrated in FIG. 6, at which point an audition set 630 is created. For purposes of clarity and explanation, the horizontal display length of the audition set 630 is displayed differently in the composite display area 135 for this example. At the first stage 4305, the GUI 100 displays a menu 4335 that includes a user selectable "Split" option along with other user selectable options (not shown). The "Split" option invokes an edit tool of some embodiments for performing a split edit operation. In some embodiments, the user invokes the menu 4335 by performing a click operation (e.g., a cursor click or a touch click). Other embodiments provide other ways to invoke the menu 4335. For example, some of these embodiments allow the user to invoke the menu 4335 using a hotkey, a keystroke, a series of keystrokes, a combination of keystrokes, an option from a pop-up or pull-down menu, or any other appropriate method to invoke a menu. The first stage 4305 also shows the user selecting the "Split" option through a click operation using the cursor 160.

In the second stage 4310, the GUI 100 displays a splitting tool 4340. In some embodiments, the GUI 100 displays the splitting tool 4340 in place of the cursor 160 when the user selects the "Split" option in the menu 4335. In this example, the user invokes the split edit operation on an audition set in the composite display area 135 by performing a click operation (e.g., a cursor click or a touch click) on the audition set using the splitting tool 4340.

At third stage 4315 of the GUI 100, the user invokes the split edit operation on the audition set 630 through a click operation using the splitting tool 4335. As shown in this stage, the split edit operation is invoked at the point in the audition set 630 indicated by the splitting tool 4335.

The fourth stage 4320 shows the GUI 100 after the completion of the split edit operation on the audition set 630. As illustrated in this stage, the GUI 100 no longer displays the audition set 630 in the composite display area 135. Instead, the GUI 100 displays audition sets 4345 and 4350 in its place. This is indicated by the audition sets 4345 and 4350 each displaying the user selectable UI item 190. As shown, the GUI 100 no longer displays the splitting tool 4340 and displays the cursor 160 in its place. In some embodiments, the GUI 100 automatically displays the cursor 160 in place of the splitting tool 4340 upon completion of split edit operation (e.g., after the user has performed a click operation on the audition set 630).

In this example, when the user invokes the split edit operation on the audition set 630, the media editing application splits the active pick of the audition set 630 (the media clip 175 in this example) at the point indicated by the splitting tool 4340 into two media clip 4355 and 4360 and creates the audition sets 4345 and 4350. Each of the audition sets 4345 and 4350 includes all the media clips in the audition set 630 except the active pick of the audition set 630 when the split edit operation was performed on the audition set 630 (the media clip 175 in this example). Each of the audition sets 4345 and 4350 includes one of the split media clips 4355 and 4360, which is set as the active pick of its respective audition set. In this example, the audition set 4345 includes the media clip 4355, which is set as its active pick. Similarly, the audition set 4350 includes the media clip 4360, which is set as its active pick. In some embodiments, when the split edit operation is invoked, the media editing application creates the data structures for the media clips 4345 and 4350 with in and out points that correspond to the point of the split edit operation. The media editing application also creates data structures for the audition sets 4345 and 4350 in some such embodiments.

The fifth and sixth stages 4325 and 4330 each illustrate the GUI 100 displaying the selection area 192 of each of the audition sets 4345 and 4350. The user invokes the selection area 192 for each audition set 4345 and 4350 by selecting the corresponding audition set's UI item 190 through a click operation (e.g., a cursor click or a touch click) or using any of the methods previously mentioned above. As shown in the fifth stage 4325, the selection area 192 for the audition set 4345 displays the media clips 4355 and 165, which are the media clips included in the audition set 4345. Similarly, at the sixth stage 4330 of the GUI 100, the selection area 192 for the audition set 4350 displays the media clips 4360 and 165, which are the media clips included in the audition set 4350.

While FIG. 43 illustrates a split edit operation using the splitting tool 4340, in some embodiments, the GUI 100 does not display the splitting tool 4340 when the "Split" option is selected. Rather, the GUI 100 continues to display the cursor 160 and the user can perform the split edit operation on the audition set 630 in a similar fashion illustrated in FIG. 43. Furthermore, FIG. 43 shows the split edit operation invoked through a selection of a pop-up menu. Some embodiments allow the split edit operation to be invoked in different ways, such as using a hotkey, a keystroke, a series of keystrokes, a combination of keystrokes, a selection through a pull-down menu, or any other method of invoking a edit operation.

Several of the above examples (e.g., FIGS. 8 and 12) describe applying an effect to one media clip in the audition set. However, some embodiments of the media editing application allow the user to add a particular effect to all the media clips of an audition set.

Figure 44:
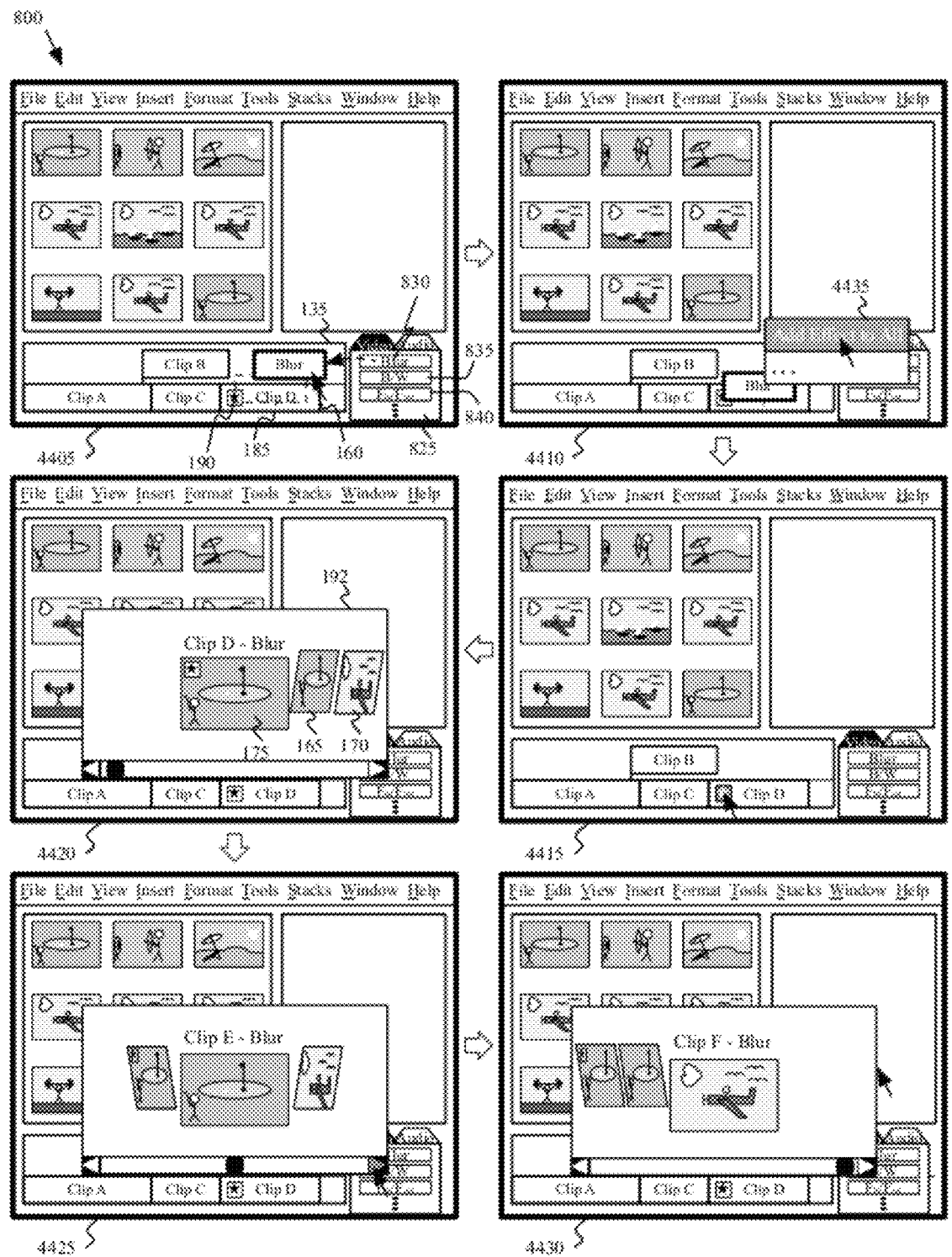
FIG. 44 illustrates applying an effect to media clips of an audition set using the GUI of FIG. 8 according to some embodiments of the invention.

FIG. 44 illustrates applying an effect to the media clips of an audition set using the GUI 800 according to some embodiments of the invention. This figure illustrates the GUI 800 at six different stages 4405-4430 that show an effect applied to all the media clips of the audition set 185.

As shown in the first stage 4405, the composite display area 135 displays the audition set 185, which is created in a similar fashion as described above by reference to FIG. 1. Similar to FIG. 8, the "Video" tab was selected in this example to display the video effects items 830-840 in the effects panel 825, as shown in this stage. The first stage 4405 also illustrates the user selecting the effect item 830 and dragging it onto the audition set 185 (e.g., through a drag-and-drop operation) in a similar fashion illustrated in FIG. 8. In some embodiments of the media editing application, the GUI 4405 displays a menu 4435 when the user has finished dragging the effect item 830 onto the audition set 185 (e.g., the user performs the drop portion of a drag-and-drop operation).

The second stage 4410 shows the GUI 4410 displaying a menu 4435 that includes a user selectable "Add Effect to All" option and other user selectable options (not shown) as well. The "Add Effect to All" option applies one or more effects associated with a selected effect item ("blur" for the effect item 830 in this example) to all the media clips in a selected audition set (the audition set 185 in this example) when the option is selected. This stage also shows the user selecting the "Add Effect to All" option through a click operation using the cursor 160.

In the third stage 4415, the media editing application has applied the effect associated with the effect item 830 ("blur") to all the media clips in the audition set 185. This stage also shows the user selecting the user selectable UI item 190 through a click operation using the cursor 160 in order to invoke the display of the selection area 192.

The fourth stage 4420 of the GUI 800 displays the selection area 192. As shown, the selection area 192 displays media clips 165-175. As mentioned above, some embodiments display a label above a media clip in the selection area 192. In some of these embodiments, the label for a media clip that has an effect applied to it is specified with the name of the effect appended to the name of the media clip. As such, the labels for the respective media clips displayed in the fourth through sixth stages 4420-4430 specify such names. Specifically, the label for the media clip 175 displayed in the fourth stage 4420 is "Clip D—Blur," the label for the media clip 165 displayed in fifth stage 4425 is "Clip E—Blur," and the label for the media clip 170 displayed in the sixth stage 4430 is "Clip F—Blur."

Although the figure above illustrates an effect applied to all the media clips in an audition set, the effect does not necessarily have to be applied to all the media clips in some embodiments. For instance, some embodiments may apply the effect to every media clip except the active pick. Some embodiment may apply the effect to only the media clips that are versions (i.e., duplicates).

Moreover, in some embodiments, the user may be required to use input modifiers when performing the effect operation described above. For example, while selecting and dragging an effect item onto a media clip, some embodiments may require the user to press and hold a hotkey, a keystroke, a combination of keystrokes, etc. In some embodiments, the user may be required to only press (and not hold) such input modifiers. Other embodiments may require other types of input modifiers to perform the effect operation described above. In this manner, the media editing application of some embodiment is able to differentiate among different effect operations, such as the operations described in FIG. 12 and FIG. 44, that the user wishes to perform and thus present the correct options to the user (e.g., displaying the correct menu options).

Figure 45:
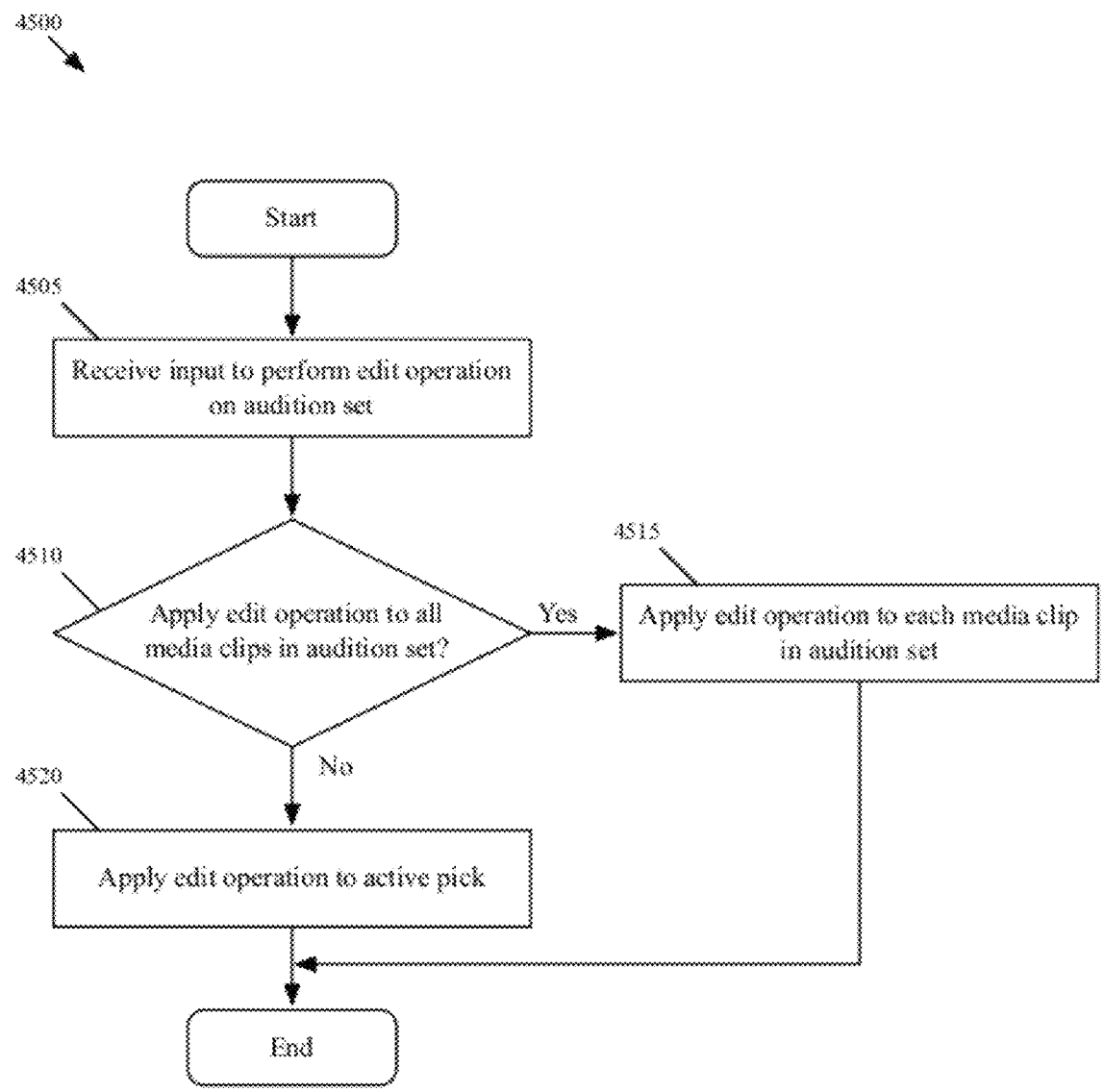
FIG. 45 conceptually illustrates a process of some embodiments for performing an edit operation to an audition set.

The above figures in this section illustrate a number of different edit operations that a user can perform on an audition set. FIG. 45 conceptually illustrates a process 4500 of some embodiments for performing an edit operation to an audition set. The process 4500 starts by receiving (at 4505) input to perform an edit operation on an audition set. The input may be received through a composite display area when a user edits the audition set displayed in the composite display area (e.g., a move edit as shown in FIGS. 40-42, a trim edit, adding an audition set to or removing an audition set from the composite display area, etc.). Other inputs may involve a user dragging an effects item onto an audition set (e.g., as shown in FIG. 44), selecting a menu option (e.g., as shown in FIG. 43), or other editing input. Such editing input may be received through various operations performed with a cursor controller, a touchscreen, etc.

Next, the process 4500 determines (at 4510) whether to apply the edit operation to all the media clips in the audition set. As described above, some operations (e.g., trim operations, move operations, etc.) are applied only to the active pick of an audition set. Other operations (e.g., application of an effect) may be applied to either just the active pick or all media clips in the audition set.

When the edit is to be applied to all of the media clips in the audition set, the process 4500 applies (at 4515) the edit operation to each media clip in the audition set. In some embodiments, this entails the process 4500 modifying the data structure of each of the media clips and/or the data structure of the audition set based on the edit operation. FIG. 44 illustrates an example of an edit operation that is applied to each of the media clips in the audition set. Specifically, FIG. 44 shows an effect applied to each of the media clips in the audition set. As another example, some embodiments allow a user to apply a trim edit operation to modify the in and/or out points of each media clip in a set by a particular amount of time. In such cases, the process 4500 modifies the in and out points of each of the media clips in the audition set based on the trim edit operation. After the process 4500 applies the edit operation to each media clip in the audition set, the process 4500 ends.

On the other hand, when the edit is not to be applied to all of the media clips in the audition set, the process 4500 applies (at 4520) the edit operation to the active pick of the audition set. In these instances, the process 4500 modifies the data structure of the active pick and/or the data structure of the audition set based on the edit operation. FIGS. 40-42 show several examples of an edit operation that is applied to only the active pick of the audition set. In those figures, an audition set is moved from one location in the composite display area to another location in the composite display area. When the audition set is moved to a new location in the composite display area, some embodiments modify the data structure of the active pick and/or the audition set to reflect the audition set's new location in the composite display area.

Another type of edit operation that is applied only to the active pick of an audition set is shown in FIG. 43. In that example, the media editing application applies a split or blade edit operation to only the active pick of the audition set. Additional and/or different edit operations that are applied only to the active pick of an audition set are provided in some embodiments. Examples of such edit operations include a trim edit, ripple edit, roll edit, etc. After the process 4500 applies the edit operation to the active pick, the process 4500 ends.

B. Deleting an Audition Set

Different embodiments provide different methods for deleting or removing an audition set from a composite presentation. For instance, some embodiments allow the user to delete the audition set (e.g., using a hotkey, a keystroke, a series of keystrokes, a combination of keystrokes, an option selected from a pop-up or pull-down menu, or any other appropriate method) as the user typically would a media clip in the composite presentation. As another example, when the user is finished evaluating the media clips in an audition set and has decided which media clip in the audition set to include in the composite presentation, some embodiments provide an operation that sets the active pick of an audition set as the committed media clip in the composite presentation (also referred to as a "finalize" operation) and deletes the audition set.

Figure 46:
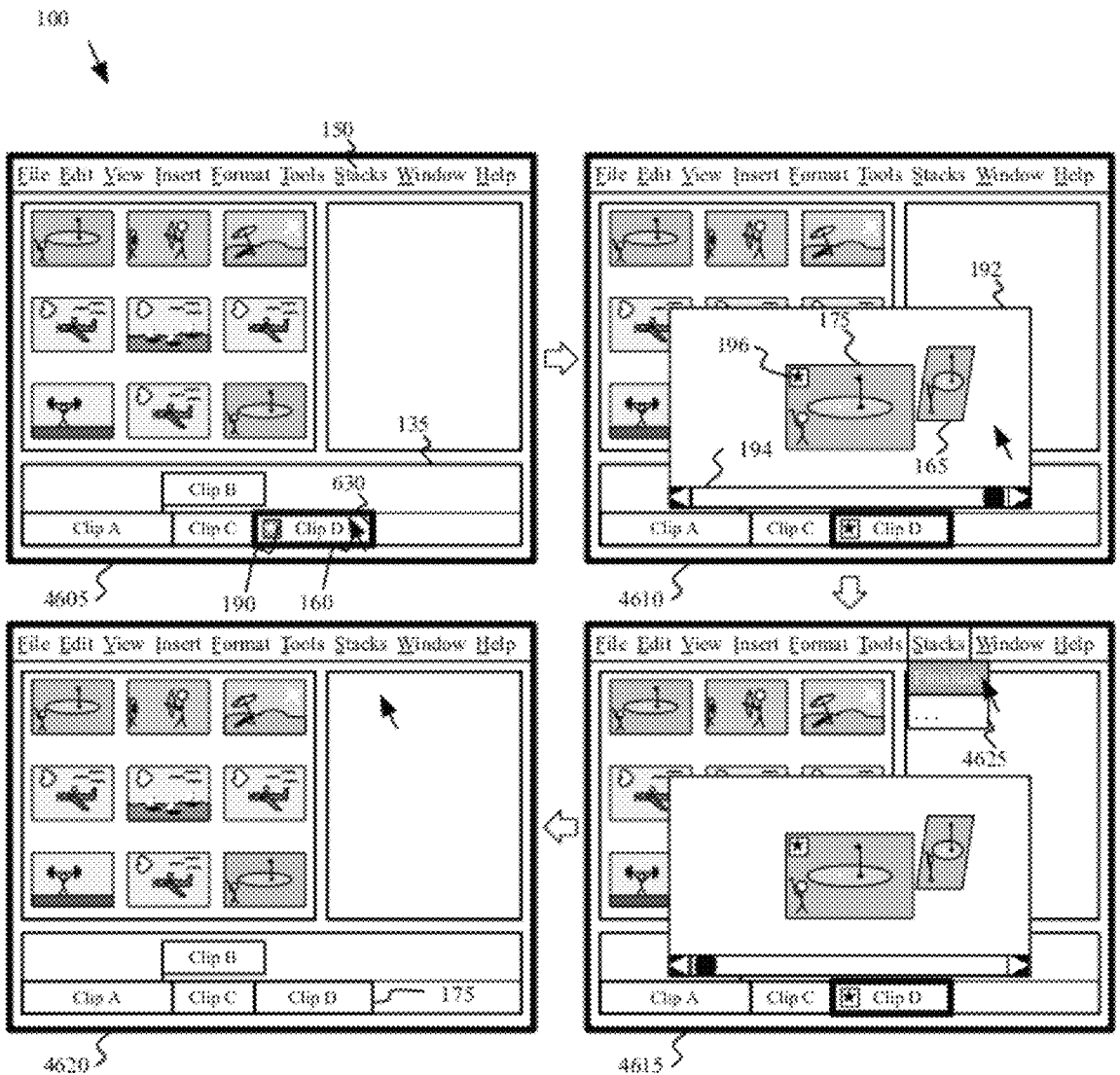
FIG. 46 illustrates deleting an audition set to a composite presentation using the GUI of FIG. 1 according to some embodiments of the invention.

FIG. 46 illustrates an example of such a finalize operation. In particular, FIG. 46 illustrates the GUI 100 at four different stages 4605-4620 that show a media clip of an audition set being committed to a composite presentation and the deletion of the audition set.

For this example, the first stage 4605 continues from the last stage 620 of FIG. 6. As shown, this stage illustrates the user selecting the audition set 630 through a click operation using the cursor 160. After the audition set 630 has been selected, the user selects the user selectable UI item 190 through a click operation using the cursor 160 to invoke the display of the selection area 192. The user may wish to display the selection area 192 to check that the active pick of the audition set the media clip that the user wishes to commit to the composite presentation. As mentioned above, the media editing application of some embodiments automatically displays the selection area 192 when the UI item 190 is selected.

At the second stage 4610, the GUI 100 displays the selection area 192. As shown, the media clip 165 and the media clip 175 ("Clip D") are displayed in the selection area 192. In addition, the indicator 196 is displayed on the media clip 175 to indicate that it is the active pick of the audition set 630.

The third stage 4615 of the GUI 100 displays a menu 4625 that includes a user selectable "Finalize" option as well as other user selectable options (not shown). The "Finalize" option invokes the operation to commit the active pick of the audition set 630 to the composite presentation and delete the audition set 630. In this example, the user invokes the menu 4625 by selecting the "Stacks" option in the menu bar 150 through a click operation using the cursor 160. In some embodiments, other methods are provided for invoking the menu 4625 as well. For instance, some such embodiments allow the user to invoke the menu 4625 using a hotkey, a keystroke, a series of keystrokes, a combination of keystrokes, or any other method to invoke a menu. The third stage 4615 also illustrates the user selecting the "Finalize" option through a click operation using the cursor 160.

The fourth stage 4620 illustrates the GUI 100 after the active pick of the audition set 630 (the media clip 175) has been committed to the composite presentation and the audition set 630 has been deleted. Since the audition set 630 has been deleted, the user selectable UI item 190 is no longer displayed and the media clip 175 has replaced the audition set 630 in the composite presentation, as illustrated in the composite display area 135.

FIG. 46 describes a particular series of operations for committing the active pick of the audition set 630 to the composite presentation and deleting the audition set 630. However, other embodiments do not necessarily perform all of these operations to commit the active pick to the composite presentation and delete the audition set 630. For example, some such embodiments do not select the UI item 190 to display the selection area 192. In such cases, the user selects the audition set 630 and then selects the "Finalize" option in the menu 4625 to commit the active pick of the audition set 630 to the composite presentation and delete the audition set 630.

Figure 47:
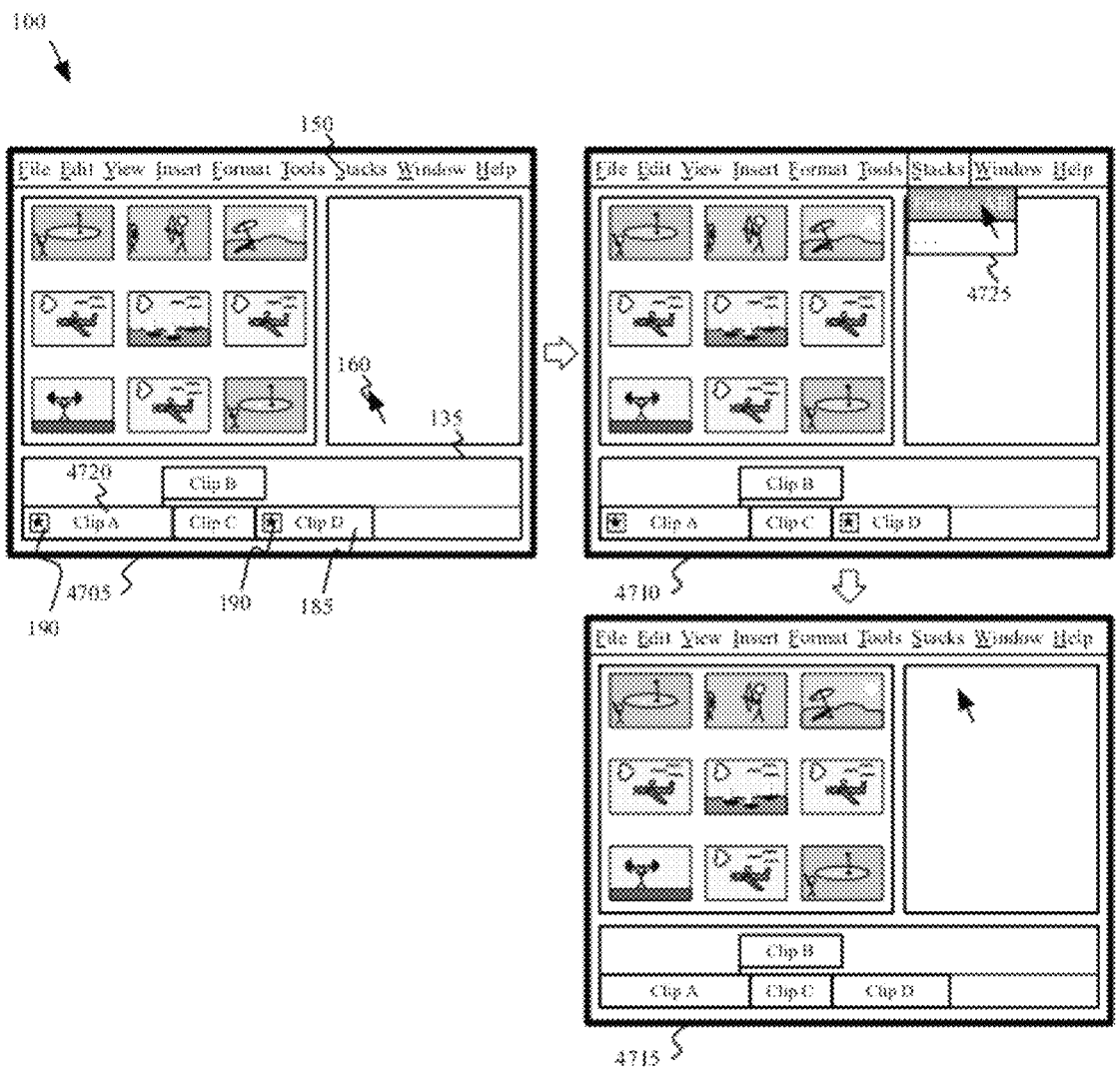
FIG. 47 illustrates deleting an audition set to a composite presentation using the GUI of FIG. 1 according to some embodiments of the invention.

Instead of performing a "finalize" operation on an audition set in a composite presentation, the user of the media editing application may wish to commit the active picks of all the audition sets in the composite presentation and delete all of the audition sets. FIG. 47 illustrates an example of such an operation. As shown, FIG. 47 illustrates the GUI 100 at three different stages 4705-4715 that show an operation that performs a "finalize" operation on all of the audition sets in a composite presentation.

As shown in the first stage 4705, the composite presentation that is displayed in the composite display area 135 includes an audition set 4720 and the audition set 185, as indicated by the display of the user selectable UI item 190 on each audition set. The audition set 4720 can be created in the same or similar manner as many of the embodiments for creating an audition set described above.

At the second stage, the GUI 100 displays a menu 4725 that includes a user selectable "Finalize All" option and other user selectable options (not shown). The "Finalize All" option invokes an operation that commits to the composite presentation each of the active picks of all the audition sets in the composite presentation and deletes all the audition sets. Some embodiments display the menu 4725 when the user selects the "Stacks" option in the menu bar 150 (e.g., through a click operation such as a cursor click or a touch click). However, other embodiments provide other ways for the user to invoke the menu 4725. For example, some such embodiments allow the user to invoke the menu 4725 using a hotkey, a keystroke, a series of keystrokes, a combination of keystrokes, or any other appropriate method to invoke a menu. As shown, the second stage 4710 shows the user selecting the "Finalize All" option through a click operation using the cursor 160.

The third stage 4715 illustrates the GUI 100 after the active picks of all the audition sets in the composite presentation have been committed to the composite presentation and all the audition sets have been deleted. As shown, the user selectable UI items 190 are no longer displayed, indicating that that audition sets 4720 and 185 have been deleted. Also, Clip A has replaced the audition set 4720 and Clip D has replaced the audition set 185 in the composite presentation as illustrated in the composite display area 135.

The FIGS. 46 and 47 describe above show different methods for deleting audition sets in the composite display area 135. As mentioned above, some embodiments allow the user to create audition sets in the event library 145. As such, some of these embodiments also allow the user to delete audition sets in the media library 145. The following figure illustrates one such example.

Figure 48:
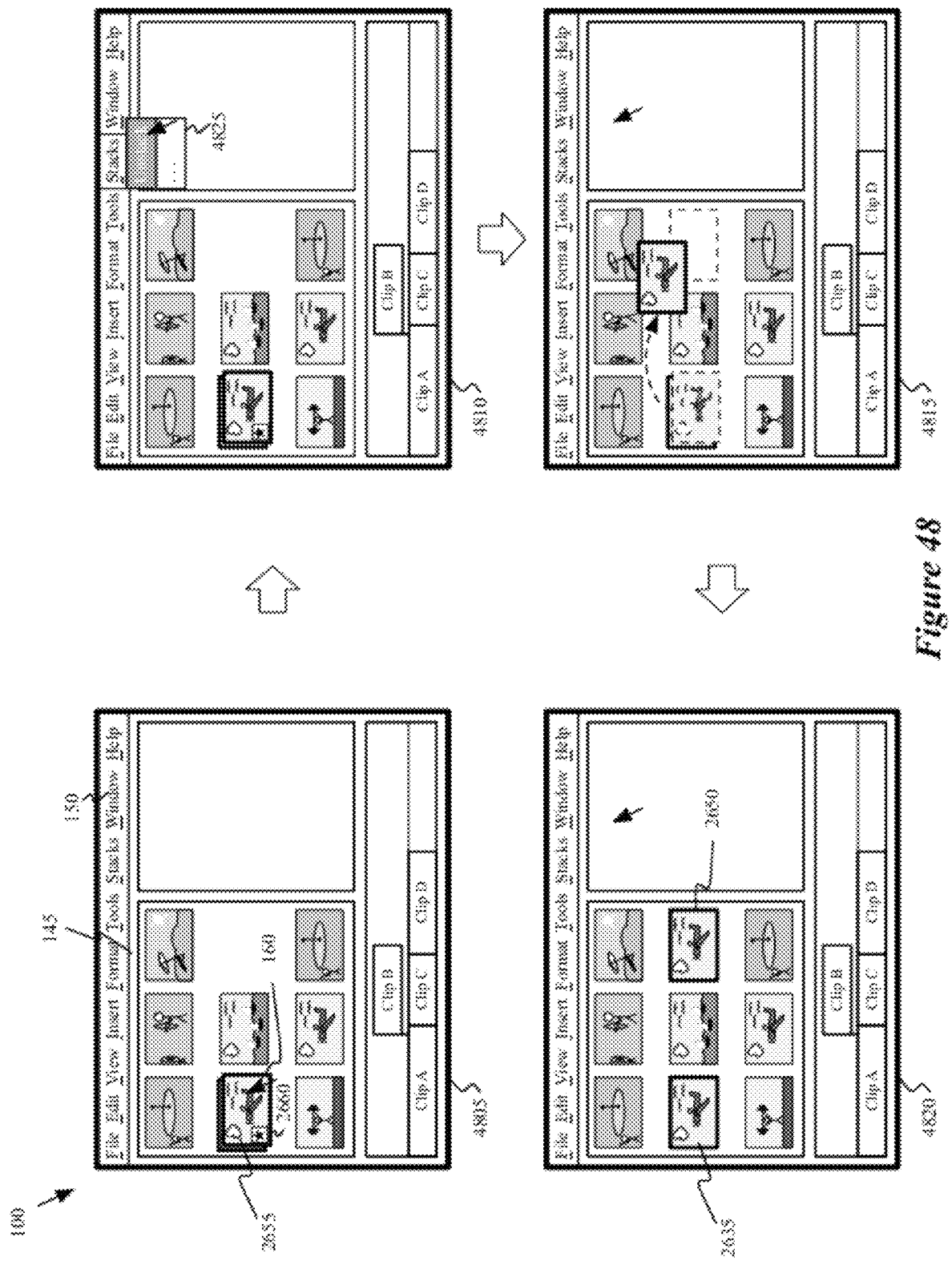
FIG. 48 illustrates deleting an audition set using the GUI of FIG. 1 according to some embodiments of the invention.

FIG. 48 illustrates deleting an audition set using the GUI 100 of some embodiments. In particular, this figure illustrates the GUI 100 at four different stages 4805-4820 that show the deletion of an audition set in the media library 145 (also referred to as unstacking) in some embodiments.

In this example, the first stage 4805 of the GUI 100 continues from the last stage 2630 illustrated in FIG. 26. This stage of the GUI 100 shows the user selecting the audition set 2655 in the media library 145 through a click operation using the cursor 160.

At the second stage 4810, the GUI 100 displays a menu 4825 that includes a user selectable "Unstack" option and other options (not shown). For this example, the "Unstack" option invokes a command to delete the audition set 2655 and place the media clips in the audition set 2655 at individual positions in the media library 145. In some embodiments, the user invokes the menu 4825 by selecting the "Stacks" option in the menu bar 150. Other embodiments provide other ways for the user to invoke the menu 4825. For example, some such embodiments allow the user to invoke the menu 4825 using a hotkey, a keystroke, a series of keystrokes, a combination of keystrokes, or any other appropriate method to invoke a menu. The second stage 4810 also shows the user selecting the "Unstack" option through a click operation using the cursor 160.

The third stage 4815 shows the GUI 100 after the invocation of the delete operation. As shown, an animation is being displayed that shows the media editing application, in response to the invocation of the delete operation, automatically moving the media clip 2650 to an area in the media library 145 that is not occupied by another media clip. Other animations that show the deletion of the audition set are possible. Some embodiments may not even display an animation (i.e., the media clip 2655 will just be displayed in an empty area in the media library 145) of the delete operation.

At the fourth stage 4820 of the GUI 100, the delete operation is completed. As shown, the media clips 2635 and 2650 are no longer displayed as media clips stacked on top of each other, but, instead, are displayed at individual locations in the media library 145. In addition, the user selectable UI item 2660 is not longer displayed in the media clip 2650. This stage also shows the media clips 2635 and 2650 still selected, as indicated by the bolded borders of each of the media clips. In some embodiments, the media clips 2635 and 2650 do not remain selected after the completion of the delete operation.

While FIG. 48 illustrates the deletion of a single audition set in the media library 145, some embodiments allow the user to select multiple audition sets in the media library 145 before invoking the delete operation. In some of these embodiments, the media clips in the selected audition sets would each be moved to an area in the media library 145 that is not occupied by another media clip.

Figure 49:
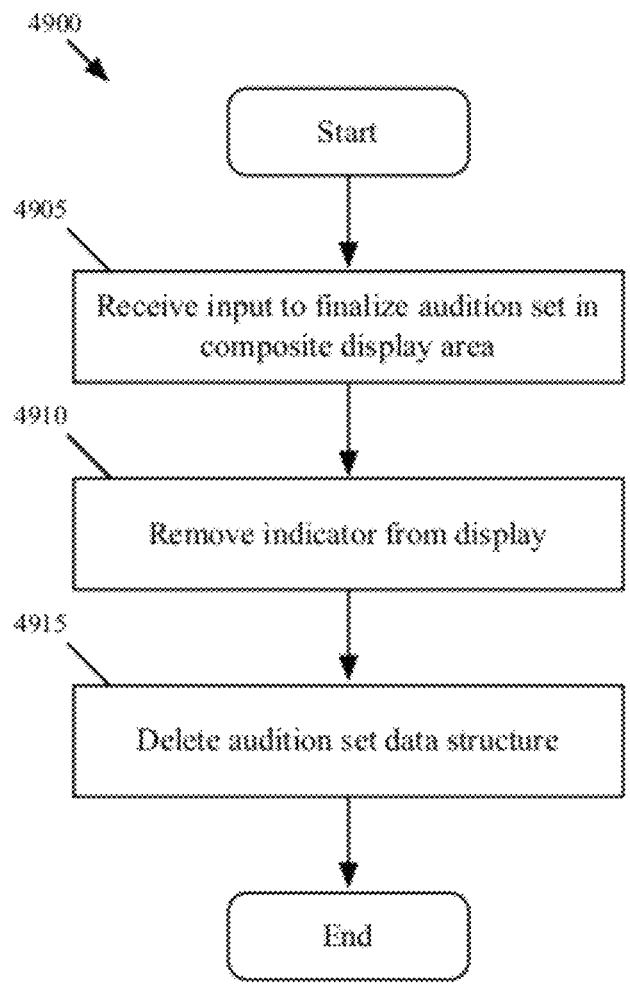
FIG. 49 conceptually illustrates a process of some embodiments for deleting an audition set.

The above subsection describes various techniques for deleting, or finalizing, an audition set. FIG. 49 conceptually illustrates a process 4900 for finalizing an audition set. As shown, the process begins by receiving (at 4905) input to finalize an audition set in the composite display area. In some embodiments, a user provides such input through the selection of an item from a menu (e.g., through a cursor controller selection, a touchscreen selection, etc.), a hotkey or other keystroke input, etc.

The process removes (at 4910) any audition set indicator from the display of the graphical representation of the audition set. Rather than displaying an audition set, the GUI 100 now displays a media clip representation of the active pick of the audition set. When the audition set is located in the media library, some embodiments unstack the display of the audition set and display each of the media clips from the set separately.

The process also deletes (at 4915) the data structure for the audition set, then ends. When the audition set data structure is defined by references to separate data structures for each of the media clips, this simply involves deleting the audition set data structure. When the media clip information (e.g., in and out points in the source media file) is stored as part of the audition set data structure, some embodiments create separate data structures for each of the individual media clips.

IV. Software Architecture

Figure 50:
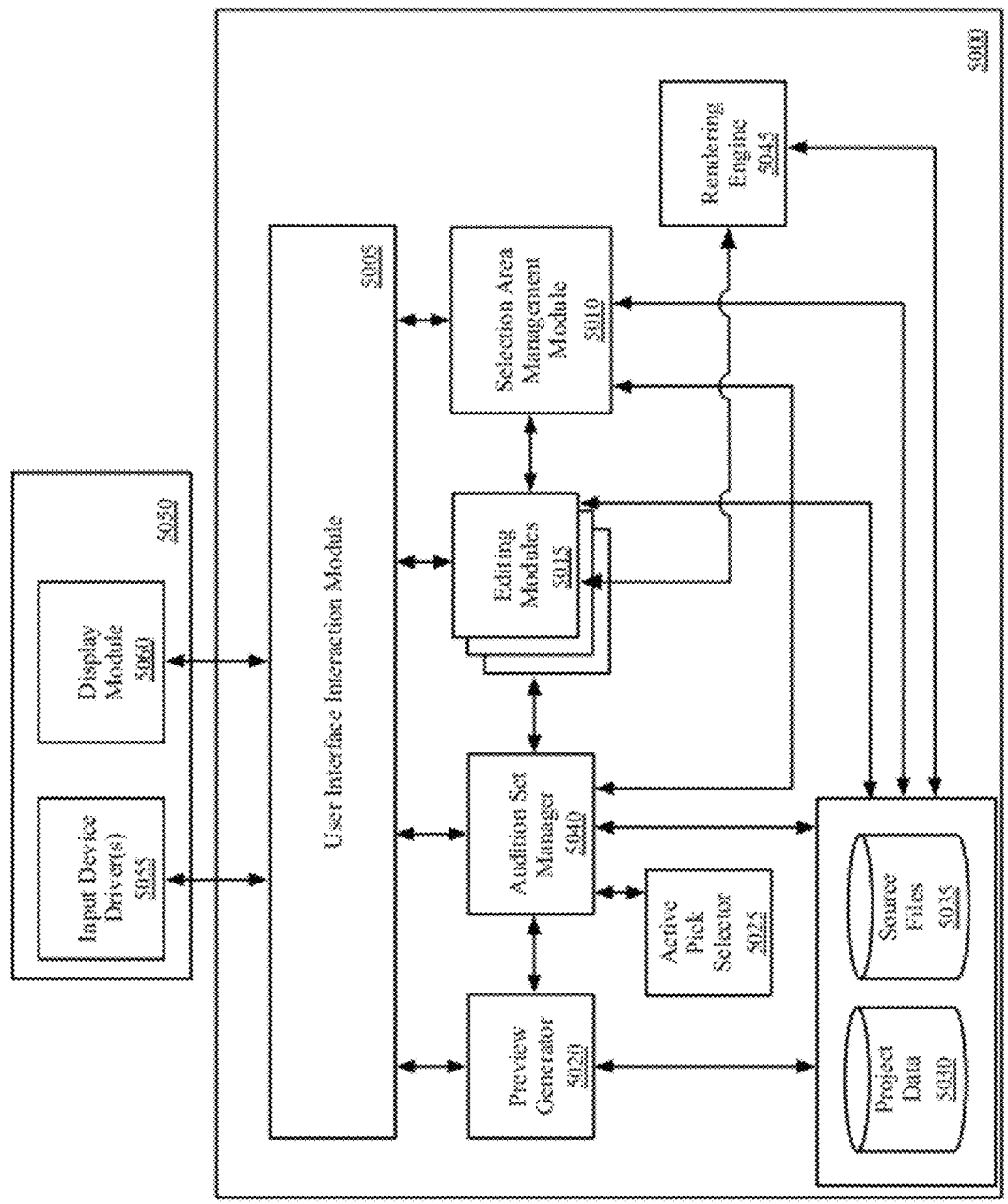
FIG. 50 conceptually illustrates the software architecture of a media editing application of some embodiments.

In some embodiments, the processes described above are implemented as software running on a particular machine, such as a computer or a handheld device, or stored in a computer readable medium. FIG. 50 conceptually illustrates the software architecture of a media editing application 5000 of some embodiments. In some embodiments, the media editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

As shown, the media editing application 5000 includes a user interface (UI) interaction module 5005, a selection area management module 5010, a set of editing modules 5015, a preview generator 5020, an active pick selector 5025, an audition set manager 5040, and a rendering engine 5045. The media editing application 5000 also includes project data 5030 and source files 5035. In some embodiments, the source files 5035 store the media content (e.g. text, audio, image, and video content) data of media clips. The project data 5030 stores data structures for sequences, media clips, audition sets, etc. that include references to media content data stored as .mov, .avi, .jpg, .png, mp3, way, txt, etc. files in the source files 5035. In some embodiments, storages 5030 and 5035 are all stored in one physical storage. In other embodiments, the storages are in separate physical storages. In some cases, for example, the source files 5035 may be stored across multiple hard drives, network drives, etc.

FIG. 50 also illustrates an operating system 5050 that includes input device driver(s) 5055 and display module 5060. In some embodiments, as illustrated, the input device drivers 5055 and display module 5060 are part of the operating system 5050 even when the media editing application is an application separate from the operating system 5050.

The input device drivers 5055 may include drivers for translating signals from a keyboard, mouse, touchpad, tablet, touch screen, etc. A user interacts with one or more of these input devices, which send signals to their corresponding device driver. The device driver then translates the signals into user input data that is provided to the UI interaction module 5005.

The present application describes a graphical user interface that provides users with numerous ways to perform different sets of operations and functionalities. In some embodiments, these operations and functionalities are performed based on different commands that are received from users through different input devices (e.g., keyboard, track pad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch-screen device. In some embodiments, with touch control, a user can directly manipulate objects by interacting with the graphical user interface that is displayed on the display of the touch-screen device. For instance, a user can select a particular object in the graphical user interface by simply touching that particular object on the display of the touch-screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 5060 translates the output of a user interface for a display device. That is, the display module 5060 receives signals (e.g., from the UI interaction module 5005) describing what should be displayed and translates these signals into pixel information that is sent to the display device. The display device may be an LCD, plasma screen, CRT monitor, touch screen, etc.

The UI interaction module 5005 of the media editing application 5000 interprets the user input data received from the input device drivers 5055 and passes it to various modules, including the selection area management module 5010, the audition set manager 5040, the editing modules 5015, and the preview generator 5020. The UI interaction module also manages the display of the UI and outputs this display information to the display module 5060. This UI display information may be based on information from the selection area management module 5010, the audition set manage 5040, etc., or directly from input data (e.g., when a user moves an item in the UI that does not affect any of the other modules of the media editing application 5000).

The audition set manager 5040 receives the various audition set commands (e.g., to create an audition set, add a media clip to an audition set, remove a media clip from audition set, delete an audition set, etc.) and creates and/or modifies the data structures for the audition sets. The audition set manager 5040 stores this audition set information in the project data 5030 in some embodiments. In addition, the audition set manager 5040 receives audition set editing commands (e.g., split, trim, etc.) and determines which of the media clips in the audition set should be edited by the editing modules 5015.

The active pick selector 5025 chooses an active pick from a set of clips in an audition set. The active pick selector is used by the audition set manager 5040 anytime the audition set manager needs to choose an active pick for an audition set (e.g., when creating a new audition set, adding a clip to an audition set, or deleting the current active pick of an audition set). The active pick selector chooses the active pick, enabling the audition set manager 5040 to modify the data structure for the audition set to identify the active pick.

The selection area management module 5010 manages the display of the selection area of some embodiments. The selection area management module 5010 generates the selection area using information in the data structure for an audition set stored in the project data 5030 and passes this display information to the UI interaction module 5005 for incorporation into the user interface. The selection area management module 5010 also receives user input from the UI interaction module 5005 to modify the selection area (e.g., scroll through media clips, skim through a media clip, preview a media clip, move the selection area, resize the selection area, etc.).

The editing modules 5015 receive the various editing commands (trimming, splitting, and applying effect to media clips, audition sets, and sequences, creating sequences, etc.) and create and modify the project data 5030 describing the affected media clips, audition sets, and sequences in the composite display area and/or media library.

The preview generator 5020 enables the output of audio and video from the media editing application so that a user can preview clips or composite sequences. The preview generator 5020 uses the project data and the source media to send display instructions to the UI interaction module 5005, which incorporates the preview into the user interface.

The rendering engine 5045 enables the storage or output of a composite media presentation using the media editing application 5000. The rendering engine 5045 receives data from the editing modules 5015 and/or storages 5030 and 5035 and, in some embodiments creates a composite media presentation from the source files 5035. The composite media presentation can be stored in one of the illustrated storages or a different storage.

While many of the features have been described as being performed by one module (e.g., the audition set manager 5040 or the preview generator 5020), one of ordinary skill would recognize that the functions might be split up into multiple modules. Similarly, the functions described as being performed by multiple different modules might be performed by a single module in some embodiments (e.g., the active pick selector 5025 might be part of the audition set manager 5040.

V. Computer System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 51:
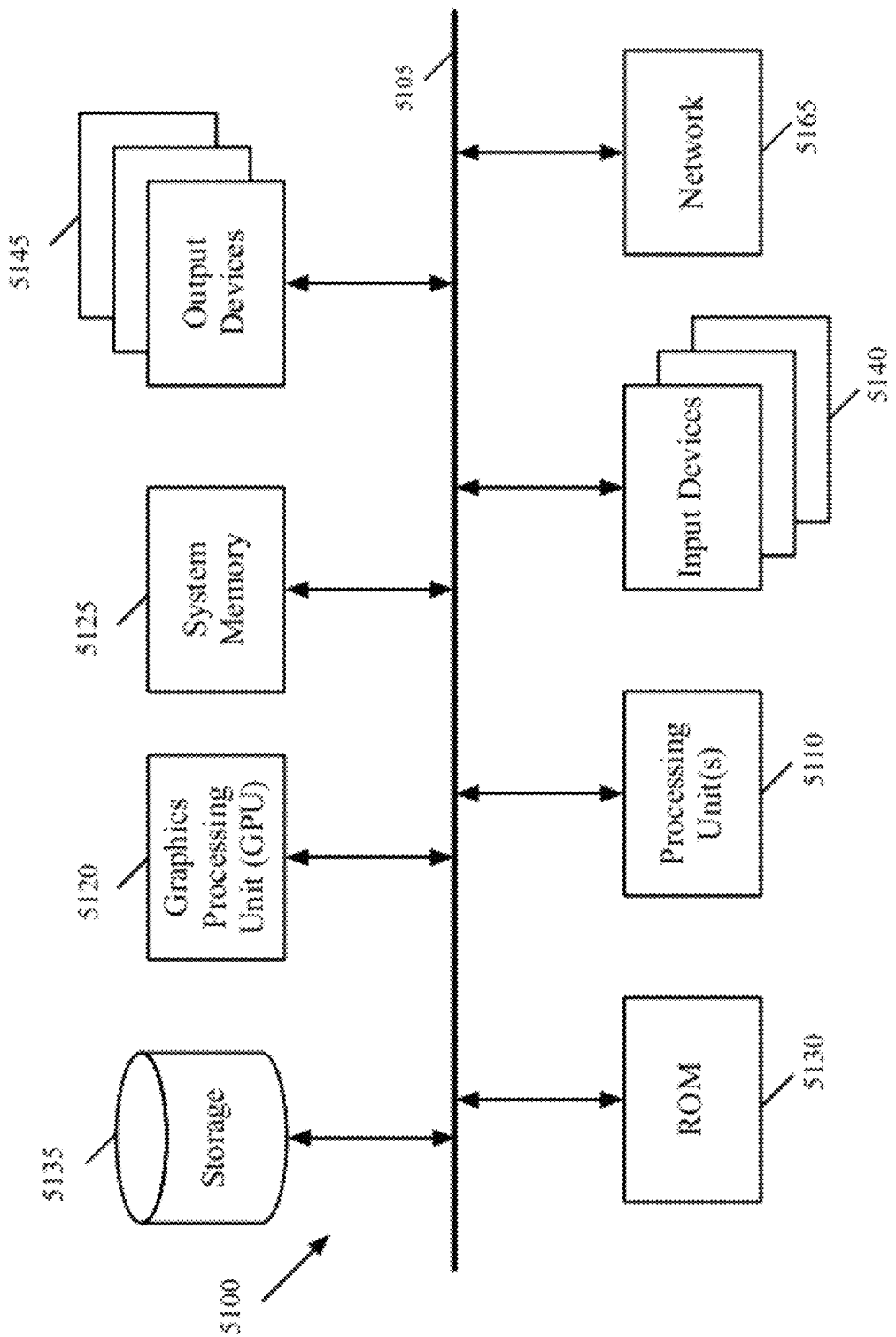
FIG. 51 conceptually illustrates a computer system with which some embodiments of the invention are implemented.

FIG. 51 conceptually illustrates an electronic system 5100 with which some embodiments of the invention are implemented. The electronic system 5100 may be a computer, phone, PDA, or any other sort of electronic device. Such an electronic system includes various types of computer readable media and interfaces for various other types of computer readable media. Electronic system 5100 includes a bus 5105, processing unit(s) 5110, a graphics processing unit (GPU)

5120, a system memory 5125, a read-only memory 5130, a permanent storage device 5135, input devices 5140, and output devices 5145.

The bus 5105 collectively represents all system, peripheral, and chipset buses that communicatively connect the numerous internal devices of the electronic system 5100. For instance, the bus 5105 communicatively connects the processing unit(s) 5110 with the read-only memory 5130, the GPU 5120, the system memory 5125, and the permanent storage device 5135.

From these various memory units, the processing unit(s) 5110 retrieve instructions to execute and data to process in order to execute the processes of the invention. The processing unit(s) may be a single processor or a multi-core processor in different embodiments. Some instructions are passed to and executed by the GPU 5120. The GPU 5120 can offload various computations or complement the image processing provided by the processing unit(s) 5110. In some embodiments, such functionality can be provided using CoreImage's kernel shading language.

The read-only-memory (ROM) 5130 stores static data and instructions that are needed by the processing unit(s) 5110 and other modules of the electronic system. The permanent storage device 5135, on the other hand, is a read-and-write memory device. This device is a non-volatile memory unit that stores instructions and data even when the electronic system 5100 is off. Some embodiments of the invention use a mass-storage device (such as a magnetic or optical disk and its corresponding disk drive) as the permanent storage device 5135.

Other embodiments use a removable storage device (such as a floppy disk, flash drive, or ZIP® disk, and its corresponding disk drive) as the permanent storage device. Like the permanent storage device 5135, the system memory 5125 is a read-and-write memory device. However, unlike storage device 5135, the system memory is a volatile read-and-write memory, such a random access memory. The system memory stores some of the instructions and data that the processor needs at runtime. In some embodiments, the invention's processes are stored in the system memory 5125, the permanent storage device 5135, and/or the read-only memory 5130. For example, the various memory units include instructions for processing multimedia clips in accordance with some embodiments. From these various memory units, the processing unit(s) 5110 retrieve instructions to execute and data to process in order to execute the processes of some embodiments.

The bus 5105 also connects to the input and output devices 5140 and 5145. The input devices enable the user to communicate information and select commands to the electronic system. The input devices 5140 include alphanumeric keyboards and pointing devices (also called "cursor control devices"). The output devices 5145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 51, bus 5105 also couples electronic system 5100 to a network 5165 through a network adapter (not shown). In this manner, the computer can be a part of a network of computers (such as a local area network ("LAN"), a wide area network ("WAN"), or an Intranet, or a network of networks, such as the Internet. Any or all components of electronic system 5100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 9, 15, 18, 38, 45, and 49) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. A non-transitory machine readable medium storing a media-editing application which when executed by at least one processing unit creates a composite media presentation, the media-editing application comprising sets of instructions for:

placing a plurality of committed media clips in a composite display area to specify a description of the composite presentation;

organizing media clips in an organizer display area by stacking media clips that should be grouped together on to of each other in the organizing display area;

creating, in response to receiving a request to move a particular stack of media clips to a particular location in the composite display area, an audition set at the particular location in the composite display area from the particular stack of media clips; and automatically setting one of the clips of the audition set as a committed clip in the description of the composite presentation and the remaining media clips of the audition set as candidate media clips for inclusion at the particular location in the composite display area but not committed for inclusion in the description of the composite presentation.

2. The non-transitory machine readable medium of claim 1, wherein one and only one media clip in the audition set is committed at any given time to the composite display area for inclusion in the description of the composite presentation, wherein the application further comprises a set of instructions for iteratively selecting a different media clip in the audition set as the committed media clip for inclusion in the description of the composite presentation.

3. The non-transitory machine readable medium of claim 1, wherein the application further comprises a set of instructions for copying the audition set and placing the copy of the audition set at another location in the composite display area in order to add the copy to the composite presentation.

4. The non-transitory machine readable medium of claim 1, wherein the application further comprises a set of instructions for performing a finalize operation that discards the audition set at the particular location but maintains at the particular location the committed media clip from the audition set.

5. The non-transitory machine readable medium of claim 1, wherein the audition set is a first audition set, wherein the application further comprises a set of instructions for splitting the first audition set into second and third audition sets.

6. The non-transitory machine readable medium of claim 5, wherein the second audition set includes a portion of the committed media clip of the first audition set while the third audition set includes a different portion of the committed media clip of the first audition set.

7. The non-transitory machine readable medium of claim 6, wherein the second and third audition sets each includes all candidate media clips from the first audition set.

8. The non-transitory machine readable medium of claim 1, wherein each of the plurality of committed clips in the composite display area has a particular length associated with a duration of the clip that is included in the composite presentation, wherein the length of the audition set's committed media clip represents a duration in the composite presentation that is allocated to the audition set.

9. The non-transitory machine readable medium of claim 1, wherein the application further comprises sets of instructions for:

receiving a selection of the audition set in the composite display area; and displaying an audition display area for the audition set, the audition display area a window within the media-editing application for displaying a graphical representation of the committed media clip and candidate media clips as a navigable display of media clips.

10. The non-transitory machine readable medium of claim 1, wherein the application further comprises sets of instructions for:

receiving a selection of the audition set in the composite display area; and displaying, in an audition set display area, a pop up of graphical representations of each media clip in the audition set as thumbnails of a single video image from each of the media clips in the audition set.

11. A method for creating a composite media presentation, the method performed by an electronic device, the method comprising:

placing a plurality of committed media clips in a composite display area to specify a description of the composite presentation;

organizing media clips in an organizer display area by stacking media clips that should be grouped together on top of each other in the organizing display area;

in response to receiving a request to move a particular stack of media clips to a particular location in the composite display area, creating an audition set at the particular location in the composite display area from the particular stack of media clips; and automatically setting one of the clips of the audition set as a committed clip in the description of the composite presentation and the remaining media clips of the audition set as candidate media clips for inclusion at the particular location in the composite display area but not committed for inclusion in the description of the composite presentation.

12. The method of claim 11 further comprising:

displaying each media clip as a thumbnail image of the media clip in the organizer display area; and displaying the stacked media clips as one thumbnail image of one of the media clips in the stack of media clips in the organizer display area.

13. The method of claim 12, wherein the media clips are video clips, the thumbnail images are thumbnail images of video images, and the thumbnail image for a stacked group of video clips is a thumbnail image of a video image of one of the video clips in the stacked group.

14. The method of claim 11 further comprising, for each stack of media clips, displaying only one clip on top of the stacked group and the other clips upon the opening of the stack of media clips.

15. The method of claim 11, wherein the top clip of the particular stack of media clips is set as the committed clip in the description of the composite presentation.

16. The method of claim 11 further comprising differentiating, in the organizer display area, a graphical display of individual media clips from a graphical display of a stacked group of media clips.

17. The method of claim 11 further comprising moving the audition set from the particular location to another location in the composite display area in order to move the audition set within the composite presentation.

18. The method of claim 11 further comprising:

copying the audition set; and placing the copy of the audition set at another location in the composite display area in order to add the copy to the composite presentation.

19. The method of claim 11 further comprising applying one effect to all media clips within the audition set.

20. A system comprising:

a set of processing units for executing sets of instructions;

a memory for storing a program which when executed by at least one of the processing units creates a composite media presentation using a media editing application, the program comprising sets of instructions for:

placing a plurality of committed media clips in a composite display area to specify a description of the composite presentation;

organizing media clips in an organizer display area by stacking media clips that should be grouped together on top of each other in the organizing display area;

creating, in response to receiving a request to move a particular stack of media clips to a particular location in the composite display area, an audition set at the particular location in the composite display area from the particular stack of media clips; and automatically setting one of the clips of the audition set as a committed clip in the description of the composite presentation and the remaining media clips of the audition set as candidate media clips for inclusion at the particular location in the composite display area but not committed for inclusion in the description of the composite presentation.

21. The system of claim 20, wherein the program further comprises a set of instructions for displaying a prompt to a user to inquire whether the user wishes to create the stack of media clips as an audition set before receiving the request to move the particular stack of media clips, wherein the set of instructions for creating the audition set comprises a set of instructions for creating the audition set only when the user responds in the affirmative to the prompt.

22. The system of claim 20, wherein one and only one media clip in the audition set is committed at any given time to the composite display area for inclusion in the description of the composite presentation, wherein the program further comprises a set of instructions for iteratively selecting a different media clip in the audition set as the committed media clip for inclusion in the description of the composite presentation.

23. The system of claim 20, wherein the program further comprises sets of instructions for:

receiving a selection of the audition set in the composite display area; and displaying an audition display area for the audition set, the audition display area a window within the media-editing application for displaying a graphical representation of the committed media clip and candidate media clips as a navigable display of media clips.

24. The system of claim 20, wherein the program further comprises a set of instructions for copying the audition set and placing the copy of the audition set at another location in the composite display area in order to add the copy to the composite presentation.

25. The system of claim 20, wherein the program further comprises a set of instructions for performing a finalize operation that discards the audition set at the particular location but maintains at the particular location the committed media clip from the audition set.

26. The system of claim 20, wherein the program further comprises sets of instructions for:

receiving a selection of the audition set in the composite display area; and displaying, in an audition set display area, a pop up of graphical representations of each media clip in the audition set as thumbnails of a single video image from each of the media clips in the audition set.

27. The system of claim 20, wherein each of the plurality of committed clips in the composite display area has a particular length associated with a duration of the clip that is included in the composite presentation, wherein the length of the audition set's committed media clip represents a duration in the composite presentation that is allocated to the audition set.

28. The system of claim 20, wherein the program further comprises a set of instructions for applying an effect to the committed clip.

29. The system of claim 28, wherein the effect is one of a blur effect, a fade in and fade out effect, and a black and white effect.

* * * * *